United States Patent
Masuura et al.

(10) Patent No.: US 9,361,704 B2
(45) Date of Patent: Jun. 7, 2016

(54) IMAGE PROCESSING DEVICE, IMAGE PROCESSING METHOD, IMAGE DEVICE, ELECTRONIC EQUIPMENT, AND PROGRAM

(75) Inventors: Takeshi Masuura, Kanagawa (JP); Masaru Matsuura, Kanagawa (JP); Naoki Kuzuya, Tokyo (JP)

(73) Assignee: SONY CORPORATION, Tokyo (JP)

( * ) Notice: Subject to any disclaimer, the term of this patent is extended or adjusted under 35 U.S.C. 154(b) by 106 days.

(21) Appl. No.: 14/237,464

(22) PCT Filed: Aug. 1, 2012

(86) PCT No.: PCT/JP2012/069613
§ 371 (c)(1),
(2), (4) Date: Feb. 6, 2014

(87) PCT Pub. No.: WO2013/024703
PCT Pub. Date: Feb. 21, 2013

(65) Prior Publication Data
US 2014/0185882 A1     Jul. 3, 2014

(30) Foreign Application Priority Data
Aug. 15, 2011   (JP) ................................ 2011-177406

(51) Int. Cl.
*G06T 7/20*      (2006.01)
*H04N 5/232*     (2006.01)

(52) U.S. Cl.
CPC . *G06T 7/202* (2013.01); *G06T 7/20* (2013.01); *G06T 7/2006* (2013.01); *G06T 7/2013* (2013.01); *H04N 5/23254* (2013.01); *H04N 5/23267* (2013.01)

(58) Field of Classification Search
None
See application file for complete search history.

(56) References Cited

U.S. PATENT DOCUMENTS 5,237,405 A * 8/1993 Egusa et al. ............... 348/208.1
6,741,652 B1 * 5/2004 Kondo et al. ............ 375/240.24
(Continued)

FOREIGN PATENT DOCUMENTS

| JP | 05-289159 | 11/1993 |
| JP | 2004-015376 A | 1/2004 |
| JP | 2006-222933 A | 8/2006 |

OTHER PUBLICATIONS

International Search Report issued Oct. 30, 2012 for International Application No. PCT/JP2012/069613.
(Continued)

*Primary Examiner* — Utpal Shah
(74) *Attorney, Agent, or Firm* — Chip Law Group; Pramod Chintalapoodi

(57) ABSTRACT

This technique relate to an image processing device, an image processing method, an imaging device, an electronic equipment, and a program which can provide a technique to execute a highly accurate global motion search process which is robust to a local moving subject, an illumination intensity change, and the like.
The image processing device includes: an image segmentation unit configured to make an image to be processed into plural divided images; a divided image selection unit configured to select a divided image, in which reliability of a motion search process is equal to or greater than a threshold value or reliability is relatively high, from the plural divided images; a first motion search processing unit configured to a motion search process for each divided image; and a second motion search processing unit configured to execute a motion search process for an entire image, in which an image segmentation is not performed, based on information of the motion search process for the selected divided image by the first motion search processing unit.

20 Claims, 25 Drawing Sheets

(56) References Cited

U.S. PATENT DOCUMENTS

| | | | |
|---|---|---|---|
| 2007/0040805 A1* | 2/2007 | Mellot | 345/166 |
| 2007/0154066 A1* | 7/2007 | Lin et al. | 382/103 |
| 2008/0056613 A1* | 3/2008 | Hatanaka et al. | 382/284 |
| 2009/0074071 A1* | 3/2009 | Nagumo et al. | 375/240.16 |
| 2009/0153680 A1* | 6/2009 | Shibata | 348/208.6 |
| 2009/0169059 A1* | 7/2009 | Kleinjohann et al. | 382/107 |
| 2009/0232216 A1* | 9/2009 | Kurata | 375/240.16 |
| 2012/0105718 A1* | 5/2012 | Ono et al. | 348/447 |
| 2012/0269451 A1* | 10/2012 | Luo et al. | 382/236 |

OTHER PUBLICATIONS

Lucas, B.D. et al., "An Iterative Image Registration Technique with an Application to Stereo Vision", International Joint Conference on (IJCAI), 1981. pp. 674-679.

* cited by examiner

FIG. 8

⟨FIRST EMBODIMENT⟩

(A)

| DVx[0] DVy[0] | DVx[2] DVy[2] |
|---|---|
| DVx[1] DVy[1] | DVx[3] DVy[3] |

$$K[0] = |DVx[0]-DVx[1]| + |DVy[0]-DVy[1]| \quad (@: m=1)$$
$$\phantom{K[0] =} + |DVx[0]-DVx[2]| + |DVy[0]-DVy[2]| \quad (@: m=2)$$
$$\phantom{K[0] =} + |DVx[0]-DVx[3]| + |DVy[0]-DVy[3]| \quad (@: m=3)$$
$$K[1] = |DVx[1]-DVx[0]| + |DVy[1]-DVy[0]| \quad (@: m=0)$$
$$\phantom{K[1] =} + |DVx[1]-DVx[2]| + |DVy[1]-DVy[2]| \quad (@: m=2)$$
$$\phantom{K[1] =} + |DVx[1]-DVx[3]| + |DVy[1]-DVy[3]| \quad (@: m=3)$$
$$K[2] = |DVx[2]-DVx[0]| + |DVy[2]-DVy[0]| \quad (@: m=0)$$
$$\phantom{K[2] =} + |DVx[2]-DVx[1]| + |DVy[2]-DVy[1]| \quad (@: m=1)$$
$$\phantom{K[2] =} + |DVx[2]-DVx[3]| + |DVy[2]-DVy[3]| \quad (@: m=3)$$
$$K[3] = |DVx[3]-DVx[0]| + |DVy[3]-DVy[0]| \quad (@: m=0)$$
$$\phantom{K[3] =} + |DVx[3]-DVx[1]| + |DVy[3]-DVy[1]| \quad (@: m=1)$$
$$\phantom{K[3] =} + |DVx[3]-DVx[2]| + |DVy[3]-DVy[2]| \quad (@: m=2)$$

(B)

| K[0] | K[2] |
|---|---|
| K[1] | K[3] |

K[2] ∧ K[3] ∧ K[1] ∧ K[0]

(C) SORTING PROCESS  K[2] → K[3] → K[1] → K[0]
  T[0] = 2 → T[1] = 3 → T[2] = 1 → T[3] = 0

(D) DIVIDED IMAGE SELECTION  Dn[0] = T[0] = 2
  AND Dn[1] = T[1] = 3

IMAGE PROCESSING DEVICE, IMAGE PROCESSING METHOD, IMAGE DEVICE, ELECTRONIC EQUIPMENT, AND PROGRAM

TECHNICAL FIELD

A technique disclosed in this description relates to an image processing device, an image processing method, an imaging device, an electronic equipment, and a program. More specifically, it is related to a technique for performing a motion vector search (ME: Motion Estimation) to estimate an amount of global motion between images in an image sequence (also referred to as a "global motion search process").

BACKGROUND ART

Block matching is well known as the most typical method for motion estimation. In order to estimate a global motion amount between plural images (typically two images including one current image and one reference image) in an image sequence, basically a weight average of motion vectors (MV: Motion Vector, also referred to as "local MV"), which are generated for each divided block, over the entire image is taken. In this case, the robustness may be improved by reducing the weight of block having less unreliable local MV (for example, see Japanese Patent Application Laid-Open No. 5-289159 and Japanese Patent Application Laid-Open No. 2006-222933). However, the method for executing block matching is not efficient in general since a large amount of computational resource of block matching to obtain the motion vector MV for each block is required.

As another motion estimation method, there is motion estimation for the entire image. As a motion estimation method for the entire image, LK method (Lucas-Kanade method) is known (see An Iterative Image Registration Technique with an Application to Stereo Vision", B. D. Lucas, T. Kanade, Intl. Joint Conf. on AI, pp. 674-679, 1981, also referred to as Non-Patent Document 1). When the LK method for the entire image is used, a global motion search process GME with good calculation efficiency can be performed, compared to block matching.

On the other hand, as a motion estimation method to improve robustness, it is known that an image segmentation (also referred to as a screen segmentation) is executed (See Japanese Patent Application Laid-Open No. 2004-015376). In the method executing this image segmentation, input image is divided into plural images and motion estimation is executed for each divided image. By weighting motion vectors MV, which are calculated for each divided image based on reliability of the divided image, the robustness can be improved.

CITATION LIST

Patent Documents

Patent Document 1: Japanese Patent Application Laid-Open No. 5-289159
Patent Document 2: Japanese Patent Application Laid-Open No. 2006-222933
Patent Document 3: Japanese Patent Application Laid-Open No. 2004-015376

Non-Patent Document

Non-Patent Document 1: "An Iterative Image Registration Technique with an Application to Stereo Vision", B. D. Lucas, T. Kanade, Intl. Joint Conf. on AI, pp. 674-679, 1981

SUMMARY OF THE INVENTION

Problems to be Solved by the Invention

However, although the LK method can execute a global motion search process GME with considerably greater calculation efficiency comparing to block matching, since the LK method for the entire image does not calculate a local MV, the robustness cannot be improved. Non-Patent Document 1 discloses that an image segmentation is executed, a motion search process is executed using the LK method, an outlier elimination is executed for the motion search process result, and a motion search process for the entire image is executed; however, there is still a difficulty in view of the accuracy. Further, in the method for executing the image segmentation, weighting is performed for each divided image, the reliability of all pixels in the divided image which is determined that its reliability is low. When there is a highly reliable pixel in the divided image which is determined that its reliability is low, since information of the highly reliable pixel is made to have low reliability by weighting the divided image, even though the pixel actually has high reliability, its information is not effectively used in the motion estimation so that the accuracy of the motion estimation is lowered as a result.

Thus, this disclosure has an object to provide a technique that can execute a global motion search process which is robust to local moving subjects, illumination intensity changes, and the like and has high accuracy. Preferably, the object is further to provide a technique that can execute a global motion search process which is robust local moving subjects, illumination intensity changes, and the like and has high accuracy as maintaining high calculation efficiency.

Solutions to Problems

An image processing device according to a first aspect of this disclosure includes: an image segmentation unit configured to make an image to be processed into plural divided images; a divided image selection unit configured to select, from plural divided images, a divided image selecting a divided image in which reliability of a motion search process is equal to or greater than a threshold value or reliability is relatively high; a first motion search processing unit configured to execute a motion search process for each divided image; and a second motion search processing unit configured to execute a motion search process for an entire image, on which an image segmentation is not executed, based on information of the motion search process by the first motion search processing unit for a selected divided image. Each image processing device described in claims dependent on the image processing device according to the first aspect of this disclosure specifies further advantageous illustrative examples of the image processing device according to the first aspect of this disclosure.

An image processing method according to a second aspect of this disclosure includes: an image segmentation step making an image to be processed into plural divided images; a divided image selecting method selecting a divided image selecting a divided image, in which reliability of a motion search process is equal to or greater than a threshold value or reliability is relatively high, from the plural divided images; a first motion search process step executing a motion search process for each divided image; and a second motion search process step executing a motion search process for an entire image, in which an image segmentation is not performed, based on information of the motion search process for the selected divided image by the first motion search processing unit.

An imaging device according to a third aspect of this disclosure includes: a solid imaging device; an optical system configured to form an image of a subject image obtained in an imaging area of the solid imaging device; a first storage unit configured to store the image obtained by the solid imaging device; a first signal processing unit configured to execute a predetermined signal processing to the image obtained by the solid imaging device; a second storage unit configured to store the image processed in the first signal processing unit; an image segmentation unit configured to make the image read from the second storage unit into plural divided images; a divided image selection unit configured to select a divided image, in which reliability of a motion search process is equal to or greater than a threshold value or reliability is relatively high, from the plural divided images; a first motion search processing unit configured to execute a motion search process for each divided image; a second motion search processing unit configured to execute a motion search process for an entire image, in which an image segmentation is not executed, based on information of the motion search process for the selected divided image by the first motion search processing unit; and a second signal processing unit configured to a correction process for the image read from the first storage unit, by referring to a result of the motion search process by the second motion search processing unit.

An electronic equipment according to a fourth aspect of this disclosure includes: a first storage unit configure to store an image which is input; a first signal processing unit configured to execute a predetermined signal processing for the input image; a second storage unit configured to store the image processed in the first signal processing unit; an image segmentation unit configured to make the image read from the second storage unit into plural divided images; a divided image selection unit configured to select a divided image, in which reliability of the motion search process is equal to or greater than a threshold value or reliability is relatively high, from plural divided images; a second motion search processing unit configured to execute a motion search process for an entire image, in which an image segmentation is not executed, based on information of the motion search process for the selected divided image by the first motion search processing unit; and a second signal processing unit configured to execute a motion correction process for the image read from the first storage unit, by referring to a result of the motion search process by the second motion search processing unit.

A program according to a fifth aspect of this disclosure causes a computer to function as: an image segmentation unit configured to make an image to be processed into plural divided images; a divided image selection unit configured to select a divided image, in which reliability of a motion search process is equal to or greater than a threshold value or reliability is relatively high, from the plural divided images; a first motion search processing unit configured to a motion search process for each divided image; and a second motion search processing unit configured to execute a motion search process for an entire image, in which an image segmentation is not performed, based on information of the motion search process for the selected divided image by the first motion search processing unit. The program according to this disclosure is preferable to realize the image processing device according to this disclosure with software by using an electric computer (computer). The program may be provided by being stored in a storage medium which is readable by a computer or may be provided by being distributed via a wired or wireless communication method.

To the image processing method according to the second aspect of this disclosure, the imaging device according to the third aspect of this disclosure, the electronic equipment according to the fourth aspect of this disclosure, and the program according to the fifth aspect of this disclosure, the respective configurations, techniques and methods described in the dependent claims of the image processing device according to the first aspect of the disclosure can be applied, and the configurations in which those are applied specify further advantageous illustrative examples.

In short, according to the technique disclosed in this description, an image to be processed is divided into plural images and a first motion search process is executed for each divided image. In other words, motion estimation is executed and motion information such as a motion vector is calculated based on a result of the motion estimation result. Next, a divided image in which reliability of the motion search process is equal to or greater than a predetermined threshold value (high reliability of motion search process) is selected from the plural divided images. Then, in a second motion search process, a motion search process is executed for the entire image, in which an image segmentation is not executed, based on the information of the first motion search process for the selected divided image. In other words, in the second time, the motion estimation is executed for each pixel in the entire image, in which the image segmentation is not executed, based on the information of the first motion search process for the selected divided image which has high reliability, and motion information (motion vector, and the like) for the entire image is calculated based on the result of the motion estimation.

Seen as a whole, since motion estimation with high robustness can be executed by using the image segmentation and the second motion search process including the outlier elimination process based on the first motion search process result can also be executed for the highly reliable divided image, motion estimation which does not waste information can be executed. It is determined whether or not it is a highly reliable pixel, and the motion estimation can be executed without discarding information of the highly reliable pixel (as discarding information of the pixel having reliability which is not high, in contrast). Specifically, although an image segmentation method is used, without executing weighting for each divided image, and a highly reliable pixel is selected based on the motion search process result of the highly reliable divided image, for each pixel in the entire image, the motion estimation is executed using the highly reliable pixel, and the motion information for the entire image can be calculated. A global motion search process with high accuracy can be executed since all the pixels in the divided image which is determined to have low reliability are not determined to have low reliability and information of highly reliable pixels will not be discarded. Since the image segmentation method is used, motion estimation which is robust to local moving subjects, illumination intensity changes, and the like can be executed.

Further, in the image processing device according to the first aspect, the image processing method according to the second aspect, the imaging device according to the third aspect, the electronic equipment according to the fourth aspect, and the program according to the fifth aspect, it is preferable to include the following configurations as preferable aspects. For example, at least one of the respective motion search processing units executes the motion search process using Lucas-Kanade method (LK method). By using the LK method, the motion estimation can be executed with a small calculation amount and the calculation efficiency can be improved. Here, when the LK method is used, it is preferable to further include the following configurations. Firstly, the first motion search processing unit preferably calculates motion information based on an adding calculation result of an addition calculation for the entire divided image executed based on a calculation formula, which is expressed by at least one of pieces of information related to a horizontal direction pixel value variation amount, a vertical direction pixel value variation amount, and a time direction pixel value variation amount for each pixel in each divided image. Further, when executing an addition calculation, for the entire image, based on a calculation formula expressed by at least pieces of information related to the horizontal direction pixel value variation amount, the vertical direction pixel value variation amount, and the time direction pixel value variation amount for each pixel, the second motion search processing unit preferably determines whether it is a highly reliable pixel according to setting condition based on information of the motion search process for the selected divided image by the first motion search processing unit, and executes an addition calculation when the setting condition is satisfied.

Effects of the Invention

Regarding the image processing device according to the first aspect, the image processing method according to the second aspect, the imaging device according to the third aspect, the electronic equipment according to the fourth aspect, and the program according to the fifth aspect, since the image segmentation method is used, motion estimation which is robust to local moving subjects, illumination intensity changes, and the like can be executed. Although the image segmentation is used, motion estimation with high accuracy can be executed since information of a highly reliable pixel is not discarded. Since accurate image correction information can be calculated based on the motion estimation result with high accuracy, an assured image processing can be performed by applying to an image blur correction process, a super-resolution process, and the like. Further, in a preferable aspect, motion estimation, which is robust to local moving subjects, illumination intensity change, and the like and has high accuracy, can be executed as maintaining great calculation efficiency.

BRIEF DESCRIPTION OF DRAWINGS

FIGS. 8(A) to 8(D) are diagrams explaining a relationship between a divided image selected in the divided image selection process illustrated in FIG. 7 and a divided image number.

MODES FOR CARRYING OUT THE INVENTION

Figure 1:
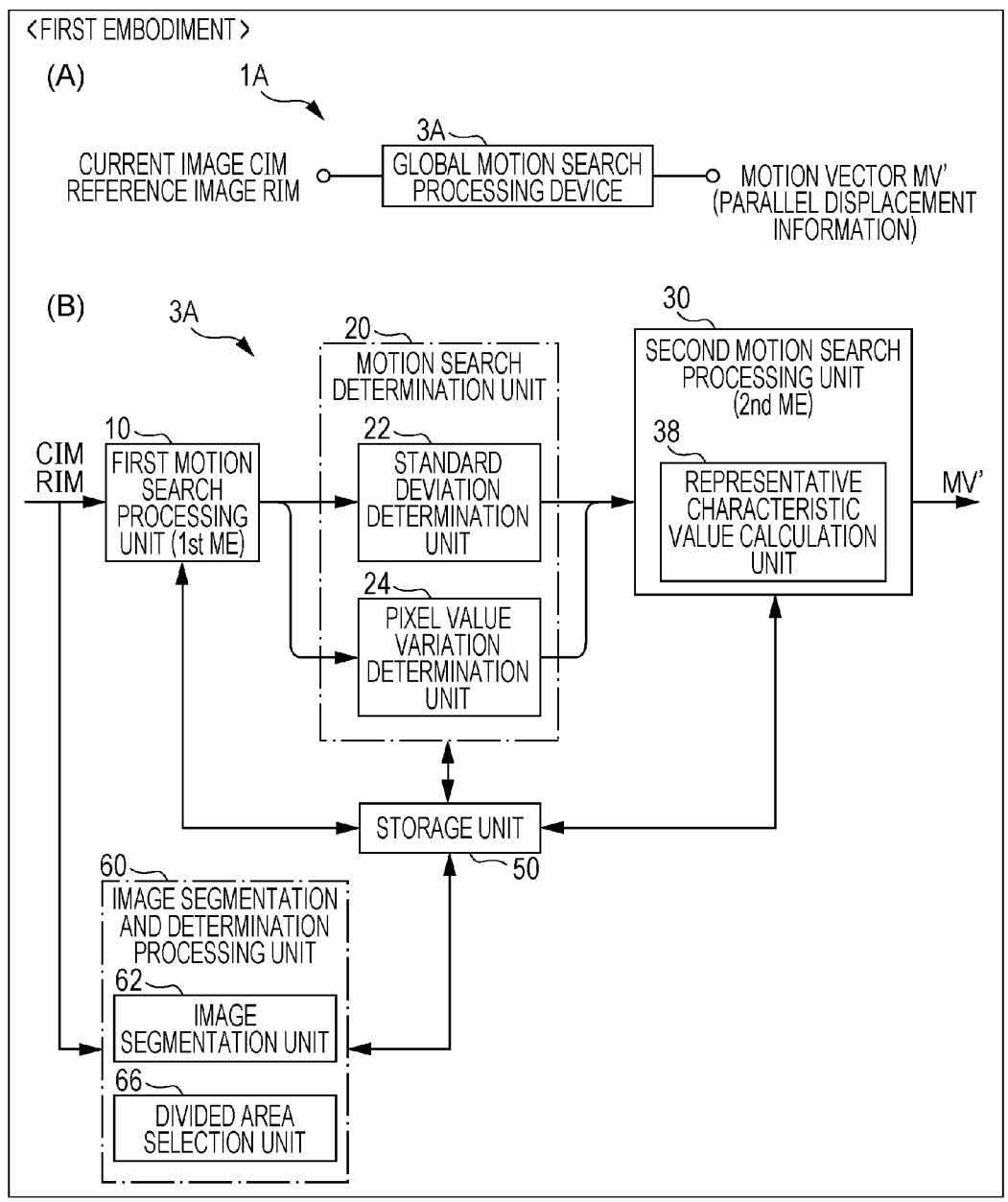
FIGS. 1(A) and 1(B) are diagrams explaining a global motion search processing device and an image processing device having thereof according to a first embodiment.

Hereinafter, embodiments of a technique disclosed by this description will be explained in detail with reference to the drawings. When the respective functional elements are distinguished in each embodiment, references of alphabet, "_n" (n is a numeral), or a combination of those are attached and, when explanations are given without distinguishing the functional elements, those references are omitted. It is the same in the drawings.

The explanations are made in the following order.
1. Entire outline
2. First embodiment: Basic configuration of each device
3. Second embodiment: Application of affine information
4. Third embodiment: Image segmentation using object information
5. Fourth embodiment: New second motion search process in which outlier elimination is executed for divided image
6. Fifth embodiment: New third motion search process in which outlier elimination for entire image
7. Sixth embodiment: Reliability determination of motion estimation using edge amount information after first process
8. Seventh embodiment: Reliability determination of motion estimation using edge amount information in first process loop <Entire Outline>

Firstly, basic subjects will be explained. In an image processing device, an image processing method, an imaging device, an electronic equipment, and a program disclosed in this description, an image segmentation unit firstly divides an image to be processed in to plural images when executing a global motion search process. A first motion search processing unit executes motion estimation for each divided image and calculates motion information of a motion vector and the like based on a result of the motion estimation. A divided image selection unit selects a divided image, in which reliability of the motion search process is equal to or greater than a threshold value or reliability is relatively high (hereinafter, also shortened and referred to as "a highly reliable divided image") from plural divided images. The divided image selection unit preferably selects a divided image having high reliability of the motion search process result, based on information of the motion search process for each divided image by the first motion search processing unit.

Regarding the "information of the motion search process" in the "information of the motion search process for each divided image by the first motion search processing unit," for example, motion information (motion vector) which is calculated as a motion search process result can be used; however, it is not limited to this example and various information related to the motion estimation can be used. An index value for judging (determining) according to a certain rule using the information is calculated and determines whether or not it is a "highly reliable divided image."

It may be determined whether it is a "highly reliable divided image" based on an absolute standard by comparing the index value calculated according to the certain rule with a predetermined threshold value. Alternatively, it is determined based on a relative standard in which a divided image (may be more than one image) with a relatively high index value (the value becomes larger as the reliability becomes higher, for example) is selected from the all divided images. In the former example, the number of divided images to be used in the following process (a second motion search process and the like) varies depending on how the threshold value is set so that there is a difficulty that it may be required to repeat setting the threshold value and the same process again since no image may be selected in some cases. In the later example, although the number of divided images to be used in the following process (a second motion search process and the like) can be made constant, there is a difficulty that the process cannot proceed to a determination process after a calculation of the index values of all divided images are executed.

In a second motion search process, a second motion search processing unit execute motion estimation for the entire image in which an image segmentation is not executed based on information of the first motion search process by the first motion search processing unit for the divided image selected by the divided image selection unit, and recalculates motion information for the entire image based on the result of the motion estimation. In other words, the motion search process is re-executed based on the information of the first motion search process. In this case, the outlier elimination process can be executed based on the information of the first motion search process by the first motion search processing unit. For example, the second motion search processing unit determines whether reliability of the motion search process of the pixel to be processed is equal to or greater than a predetermined threshold value (whether it is a highly reliable pixel) (executes an outlier elimination), and executes a motion search process for the undivided entire image by using pixels having reliability being equal to or greater than the threshold value (high reliability). In other words, for the second time, it is determined whether it is a highly reliable pixel is determined for each pixel based on the information of the first motion search process for selected divided image which is determined to have high reliability, motion estimation is executed without discarding the information of highly reliable pixel (as discarding information of pixels having reliability which is not high, in contrast), and motion information (a motion vector and the like) is calculated for the entire image based on a result of the motion estimation.

As the "information of the motion search process" in "information of the first motion search process by the first motion search processing unit for the divided image selected by the divided image selection unit," various information related to the motion estimation can be used, such as motion information (a motion vector) calculated as motion search process result, a product-sum operation result in a process to calculated the motion information, an additional value of the pixel value variation amount itself which is not related to the calculation of the motion information, and the like, for example. An index value for judging (determining) according to a certain rule using the information is calculated and it is determined whether it is a "highly reliable pixel" or not.

The determination whether to be a "highly reliable pixel" or not may be made based on an absolute standard by comparing an index value calculated according to a certain rule based on the information of the first motion search process for the selected divided image with a threshold value. Or the determination may be made by a threshold value comparison based on a relative standard in which those with a relatively low index value (which becomes a larger value when reliability becomes higher, for example) are discarded among all pixels in the entire image. In the former example, since the number of all pixels used in a following process (specifically, in a product-sum operation process) varies depending on how the threshold value is set, there is an advantage that the determination process and product-sum operation process are sequentially executed although the number of pixels contributing to the motion information which is conclusively calculated. In the later example, although the number of all pixels used in a following process (the product-sum operation process) can be made constant, there is a difficulty that the process cannot proceed to a determination process or a product-sum operation process without calculating index values of all pixels.

In the second motion search process, an image segmentation is applied, in the entire image, highly reliable pixel is selected based on the motion search process result of highly reliable divided image regarding each pixel. Since weighting is not executed for each divided image, it can be prevented that all pixels in a divided image determined to have low reliability are not made to be low reliable. When there is a highly reliable pixel in the divided image determined to have low reliability, the pixel is properly selected as a highly reliable pixel. As a result, regardless of which divided image a highly reliable pixel exists, information of the highly reliable pixel is surely selected without being wasted to execute the motion estimation so that motion estimation with high accuracy can be executed. This allows to execute a highly accurate motion estimation which has high robustness and does not waste information of a highly reliable pixel.

When an imaging device or an electronic equipment which executes an image blur correction, a super-resolution process, a time axis integration process, a high dynamic range process, a stitching process, a stereo vision matching process, and the like by using the above described global motion search process in an early step, an assured image blur correction, a super-resolution process, and the like can be realized since highly accurate image correction information can be calculated based on a highly accurate accuracy motion estimation result.

The image processing device, image processing method, imaging device, electronic equipment, and program which are disclosed in this description preferably further include a representative characteristic value calculation unit. This is to handle a case that the divided image selection unit selects more than one divided images having high reliability of motion search process result. In this case, the representative characteristic value calculation unit calculates a representative characteristic value related to the motion search process based on the information of the motion search process for the selected plural divided images by the first motion search processing unit. In response to this result, the second motion search processing unit executes a second motion search process. In other words, the second motion search processing unit determines whether or not it is a pixel having high reliability of motion search process result based on the representative characteristic value calculated by the representative characteristic value calculation unit for the selected plural divided image, and executes a motion search process for the entire image by using the highly reliable pixel.

The image processing device, image processing method, imaging device, electronic equipment, and program disclosed in this description preferably includes a determination unit which determines whether the motion search result by the first motion search processing unit is invalid or not by determining whether the difficulty of the global motion search is equal to or greater than a predetermined threshold value (whether the difficulty is high) based on the information of the motion search process for each divided image by the first motion search processing unit. When the determination unit determines that the motion search result by the first motion search processing unit is invalid, it may be mad so that the second motion search processing unit does not execute motion search process. This is because effective motion estimation cannot be performed. Alternatively, the process may be executed once again after changing the selection condition for selecting divided images.

As the "information of the motion search process" in the "information of the motion search process for each divided image by the first motion search processing unit," for example, various information related to the motion estimation such as motion information (motion vector) calculated as a motion search process result, a product-sum operation result in the process to calculate motion information, an additional value off a pixel value variation amount itself which is not directly related to the calculation of the motion information, and the like. An index value for judging (determining) according to a certain rule using the information is calculated and it is determined whether it is a "highly reliable pixel" or not. For example, an adding calculation result for the entire divided image based on a calculation formula, which is expressed by at least one of the pieces of information related to a direction pixel value variation amount, a vertical direction pixel value variation amount, and a time direction pixel value variation amount in each pixel, and motion information calculated based on the adding calculation result for the entire divided image are obtained for all divided image, and it is determined whether the difficulty of the global motion search is high or not according to a conditional expression expressed by the obtained values. As the "conditional expression expressed by the obtained values," there is a conditional expression related to a standard deviation of a distribution of error function value in the entire image of the LK method, or a conditional expression related to an absolute value of pixel value variations in the time direction per pixel.

The image processing device, image processing method, imaging device, electronic equipment, and program disclosed in the description preferably includes a third motion search processing unit which executes a motion search process for each divided image as determining whether it is a highly reliable pixel based on the information of the motion search process for the divided image by the first motion search processing unit (referred to as a first method). In this case, the second motion search processing unit executes a motion search process for the entire image, in which an image segmentation is not executed, based on the information of the motion search process for each divided image by the third motion search processing unit. Alternatively, a third motion search processing unit which executes a motion search process for the entire image, in which an image segmentation is not executed, based on the information of the motion search process for the entire image by the second motion search processing unit may be included (referred to as a second method). When the second method is employed, the third motion search processing unit may also execute an outlier elimination process based on the information of the second motion search process by the second motion search processing unit. In other words, a motion search process can by executed for the entire image by using a highly reliable pixel after determining whether it is a highly reliable pixel or not.

In short, in the first method and the second method, a motion search process including an outlier elimination process once again by using the information of the motion search process including the outlier elimination process. Since the outlier elimination can be executed by using information of more accurate motion estimation, an assured motion search process can be executed as a result. In the first method, by executing the motion search process and image selection for each divided image once again, an accurate value for the outlier elimination can be calculated although the process amount increases compared to the second method. On the other hand, in the second method, since a motion search process including an outlier elimination for the entire image is executed and a motion search process including an outlier elimination for the entire image is executed once again by using the information, the motion search process and image selection for each divided image are required only once and the process amount is reduced compared to the first method.

In the image processing device, image processing method, imaging device, electronic equipment, and program disclosed in this description, the image segmentation and/or motion search process are executed based on an image characteristic value of the image to be processed. As the "image characteristic value of the image to be processed," there are object information and edge information of the image.

For example, when the "image characteristic value of the image to be processed" is object information, the image segmentation unit can be made in a configuration in which the image to be processed can be unevenly divided into plural divided image based on the object information in the image as an image characteristic value. By executing the image segmentation according to the motion of a focused subject using the object information, images can be divided into those with local motion and those without (or with few) local motion so that an assured motion search process can be executed.

Alternatively, when the "image characteristic value of the image to be processed" is edge information, it is made in a configuration including a determination unit which determines whether the motion search result by the first motion search processing unit is invalid or not, and the determination unit may determine whether the motion search result by the first motion search processing unit is invalid or not by determining whether difficulty of the global motion search is high or not based on the edge information as an image characteristic value. Since the reliability of the motion search process by the first motion search processing unit is determined based on the edge information, and the motion estimation result is made to be invalid in the image having low reliability of the motion estimation result, an erroneous correction is not executed as a result. In other words, in order to avoid the erroneous correction, edge amount of the entire image is calculated and, when there are few edge in the entire image, the motion search process result by the first motion search processing unit can be determined to be invalid.

Alternatively, when the "image characteristic value of the image to be processed is edge information, it is made in a configuration including the determination unit which determines the motion search result by the first motion search processing unit is invalid or not and this determination unit may determine whether the motion search result by the first motion search processing unit is invalid or not for each divided image base on the edge information as an image characteristic value and, when invalid, the motion search process result of the divided image by the first motion search processing unit may be determined to be invalid. In this case, the divided image selection unit selects a divided image having high reliability of motion search process result based on the information of the motion search process for each divided image by the first motion search processing unit after the process by the determination unit. Further, the determination unit may determine whether the motion search result is invalid or not by determining whether the difficulty of the global motion search is high or not based on the information of the motion search process by the first motion search processing unit for all divided images after the above determination. In such a configuration, edge amount is calculated for each divided image and, when there are few edge in the divided image, the motion search process result of the divided image is made invalid. Thus, an image segmentation is not executed using an incorrect motion search process result, an assured image segmentation can be executed. Further, since an outlier elimination with high accuracy can be executed, an assured motion search process can be executed in a second or subsequent motion search process.

In the image processing device, image processing method, imaging device, electronic equipment, and program disclosed in this description, as motion information calculated as a result of the motion search process, motion information related to a parallel displacement of an image may be calculated and motion information related to rotation displacement of an image can be calculated. When the calculated result is only parallel displacement information, the process becomes simple but advanced displacement information other than line displacement information cannot be used. On the other hand, when the calculated result includes affine information, although there becomes plural processes, information of rotation, scaling, shear, parallel displacement between two images can be calculated and further advanced displacement information can be used. This allows to execute corrections of the rotation, scaling, and shear in addition to correction of the parallel displacement, and a further stabilized image sequence can be output.

In the image processing device, image processing method, imaging device, electronic equipment, and program disclosed by this description, preferably, at least one of the respective motion search processing unit executes a motion search process using the LK method. By employing the LK method, further improved calculation efficiency can be maintained in addition to an execution of a highly accurate motion estimation which is robust to a local moving subject and an illumination intensity change.

When the LK method is used, further preferably, the first motion search processing unit calculates motion information, for divided image, based on an adding calculation result of an adding calculation executed for the enter divided image based on a calculation formula, which is expressed by at least one of pieces of information related to a horizontal direction pixel value variation amount, a vertical direction pixel value variation amount, and a time direction pixel value variation amount of each pixel. For example, the first motion search processing unit may calculate motion information, for each divided image, based on an addition calculation result of an adding calculation executed for the entire divided image based on a calculation formula, which is expressed by at least one of pieces information related to the horizontal direction pixel value variation amount, vertical direction pixel value variation amount, and, time direction pixel value variation amount of each pixel.

Alternatively, when the LK method is used, further preferably, the second motion search processing unit may execute an adding calculation for the entire image based on a calculation formula, which is expressed by at least one of pieces of information related to the horizontal direction pixel value variation amount, vertical direction pixel value variation amount, and time direction pixel value variation amount of each pixel. In this case, the second motion search processing unit may determine whether it is a highly reliable pixel or not according to a setting condition based on the information of the motion search process for the selected divided image by the first motion search processing unit and execute an adding calculation when the setting condition is satisfied. For example, as information used to determine whether or not it is a pixel having high reliability of the motion search process result, the second motion search processing unit obtains an adding calculation result for the entire divided image based on a calculation formula, which is expressed by at least one of information related to the horizontal direction pixel value variation amount, vertical direction pixel value variation amount, and time direction pixel value variation amount of each pixel, and determines whether to add, for each pixel, according to the setting condition expressed by the obtained respective values. Further, the second motion search processing unit may use a setting condition related to an index value indicating a distribution status across the respective entire images from which error function value are selected in the LK method, or setting condition related to an index value indicating a distribution status across the respective entire divided images from which a pixel value variation is selected in the LK method.

The solid imaging device includes an electrical charge detection unit (typically, a photoelectric conversion unit) which is responsive to electromagnetic waves, is applicable to be an image capture unit capturing an image with the electrical charge detection unit, and employed by being mounted to overall imaging devices or electronic equipment using the solid imaging device. For example, it is used in an imaging device such as a digital still camera, a video camera, and the like, and, as the electronic equipment there are a portable terminal device with an imaging function such as a mobile phone, a copying machine using a solid imaging device or an imaging device as an image scanner, and the like. The solid imaging device and imaging device includes a linear sensor and an area sensor. In other words, the solid imaging device may be considered as an aspect of a physical quantity distribution detection semiconductor device in which a plurality of unit composing elements (pixels, for example) responsive to electromagnetic waves such as light, radiant rays and the like input from outside are arranged linearly or in a matrix; and the imaging device may be considered as an aspect of a physical information acquisition device (a physical quantity distribution detection device) using a physical quantity distribution detection semiconductor device.

The configuration of the present embodiment can be applied to various things that detect a change of various physical quantity as a change of electrical charge quantity, in addition to the solid imaging device including an electrical charge detection unit responsive to electromagnetic waves such as light, radiant rays, and the like input from outside. For example, it can be applied to a device that detects other physical changes, such as a fingerprint authentication device which detects an image of a fingerprint by detecting information related to a fingerprint based on an electrical characteristic change or an optical characteristic change according to pressure. The disclosed technique may be applied to a detection unit in a touch panel for example. Alternatively, in a field of computer devices, fingerprint authentication devices and the like for detecting an image of a fingerprint by detecting information related to a fingerprint based on an electrical characteristic change or an optical characteristic change according to pressure are used. These devices reads a physical quantity distribution which is converted into electrical signals using a unit composing element (a pixel in a solid imaging device) as electrical signals so that the disclosed technique can be applied. A camera module mounted in electronic equipment is sometimes referred to as an imaging device. In the configuration explained below is representatively explained using an application to a solid imaging device and an imaging device including the solid imaging device; however, in addition to this, it may be applied to various electronic equipment with an imaging function. Understood from the above, in addition to the techniques described in claims, a physical quantity distribution detection semiconductor device including a function unit similarly to a solid imaging device and the like, and a physical information acquisition device may be extracted as a technique proposed by this description. Here, in this description, the physical quantity distribution detection semiconductor device is representatively described as a solid imaging device (in other words, the physical quantity distribution detection semiconductor device includes the solid imaging device) and the physical information acquisition device is representatively described as an imaging device (in other words, the physical information acquisition device includes the imaging device), when there is no exceptional remarks (for example, the matter which is distinctively explained in this section).

<Concrete Application Examples>

Concrete application examples of an image processing device, an image processing method, an imaging device, an electronic equipment, and a program disclosed in this description will be explained.

First Embodiment

Global Motion Search Processing Device and Image Processing Device

FIG. 1 is a diagram that explains a first embodiment of a global motion search processing device and an image processing device including the global motion search processing device. FIG. 1(A) illustrates the first embodiment of an image processing device 1A including a global motion search processing device 3A; and FIG. 1(B) is a block diagram that illustrates a basic configuration of the global motion search processing device of the first embodiment.

As illustrated in FIG. 1(A), the image processing device 1A of the first embodiment includes the global motion search processing device 3A. The global motion search processing device 3A of the first embodiment executes a global motion search process which imports two images including a current image CIM and a reference image RIM (for example, an image of an immediate prior frame) and outputs a pair of motion vectors MV (specifically, motion vectors MV' as a result of second motion search process (2nd ME)). Different from a later described second embodiment, the motion vectors MV', which indicate motion in an image, only represents a parallel displacement.

As illustrated in FIG. 1(B), the global motion search processing device 3A includes a first motion search processing unit 10 (1st ME) (a first motion search processing unit), a motion search determination unit 20, a second motion search processing unit 30 (2nd ME) (second motion search processor), and a storage unit 50 (memory). The motion search determination unit 20 determines whether the motion search result by the first motion search processing unit 10 is invalid or not, and includes a standard deviation determination unit 22 and a pixel value variation determination unit 24 as function units to determine whether the difficulty of the global motion search is high based on the motion search process information for each divided image by the first motion search process. The standard deviation determination unit 22 calculates a standard deviation Se related to an error function value using a process result, an adding result and the like by the first motion search processing unit 10 (1st ME) and compares the standard deviation Se with a threshold value. The pixel value variation determination unit 24 calculates an absolute value D of the pixel value variation using a process result, an adding result and the like by the first motion search processing unit 10 (1st ME), and compares the absolute value D with a threshold value. The motion search determination unit 20 determines whether the first motion search process (1st ME) by the first motion search processing unit 10 is valid or not, based on at least one of threshold value comparison results by the standard deviation determination unit 22 and the pixel value variation determination unit 24.

Here, the present embodiment will be explained using a configuration that includes the motion search determination unit 20; however, a configuration without the motion search determination unit 20 may be employed. In this case, the second motion search processing unit 30 performs a second motion search process without referring to the process result by the motion search determination unit 20.

As a characteristic of the present embodiment, the global motion search processing device 3A includes an image segmentation and selection processing unit 60 that divides an image and calculates a representative motion vector MV from the divided images. The first motion search processing unit 10 of the present embodiment performs a motion search process for each divided image (divided area) divided by the image segmentation and selection processing unit 60 and has a function as a divided area motion vector calculation unit. The image segmentation and selection processing unit 60 divides an image area into plural images and selects one or more image area having high reliability based on a pair of each characteristic amounts in each divided area calculated by the first motion search processing unit 10. When a single image area is selected, the selected value is used as a representative characteristic value and, when plural image areas are selected, a representative characteristic value is calculated based on the selected image areas.

In order to perform these processes, in detail, the image segmentation and selection processing unit 60 firstly includes an image segmentation unit 62 and a divided image selection unit 66. Further, there provided a representative characteristic value calculation unit (representative motion vector calculation unit) which calculates a representative characteristic value (representative motion vector) related to the motion search process based on information of the motion search process for a selected plural divided image by the first motion search processing unit 10. The example in the figure illustrates an example that the second motion search processing unit 30 includes a representative characteristic value calculation unit 38. In this case, during a second motion search process, a representative characteristic value is calculated. Here, the representative characteristic value calculation unit may be provided to the image segmentation and selection processing unit 60 as a substitute for the second motion search processing unit 30 and, in this case, a configuration that the representative characteristic value is calculated before the second motion search process is performed is applied (see fourth and fifth embodiments).

In the entire image area, the second motion search processing unit 30 selects a highly reliable pixel in each pixel based on the representative characteristic value (motion vector MV) obtained in the image segmentation and selection processing unit 60 and executes motion estimation using the highly reliable pixel. The second motion search processing unit 30 calculates a set of motion information for the entire image area based on the result.

The global motion search processing device 3A has a function to execute the LK method for the entire image plural times (twice or more) in order to execute a global motion search process GME (global ME) between two of image sequences I (x, y, t) expressed as a function of a horizontal direction (x), a vertical direction (y) and a time direction (t) of a two-dimensional image. Here, the global motion search processing device 3A has characteristics that the motion search process is executed for each divided image divided by the image segmentation and selection processing unit 60 in the first motion search process (1st ME) and that the motion search process is executed for the entire image based on the representative motion vector MV obtained by the image segmentation and selection processing unit 60 in the second motion search process (2nd ME) so as to perform a highly reliable estimation. In the motion estimation method, an input image is divided into plural image areas, a first motion estimation is executed in each divided image, a characteristic value is calculated based on the result of the first motion estimation, and a second motion estimation is performed for the entire input image based on the calculated characteristic value. With this, motion estimation with high robustness and high accuracy can be performed. Hereinafter, a basic process of each function unit will be briefly explained.

Here, a method to execute a detection of a motion vector may be any of a gradient method (It is not limited to the LK method and other method may be used), a block matching method, Hesse method, SIFT method, and the like, for example. Further, although the detection of a motion vector is performed more than once, the method used in each detection may be different. For the sake of simplification in description, as a preferable example, an example that a method based on the LK method is used for each detection of a motion vector will be explained.

(Image Segmentation and Selection Processing Unit 60: Dividing Image and Selecting Highly Reliable Divided Image)

As an image segmentation method, there are various methods such as an image segmentation described in Japanese Patent Application Laid-Open No. 2004-015376 and the like; however, any method can be employed. Further, with any method employed, it is not limited to a method that evenly divides an image and it may be an uneven image segmentation.

There are various methods for selecting a highly reliable divided image; however, any method may be employed as long as a highly reliable image area can be selected. For example, the image segmentation unit 62 divides an area of an image sequence I (x, y, t) to be processed into plural areas and the first motion search processing unit 10 calculates a characteristic amount (a motion vector MV in this case) of each divided area. The divided image selection unit 66 selects one or more divided areas having a characteristic amount with a high reliability from respective characteristic amounts (motion vectors MV). When the number of the divided areas selected by the divided image selection unit 66 is one, a representative motion vector calculation unit 68 sets the characteristic amount of the divided area as a representative characteristic value and, when the number of the divided areas selected by the divided image selection unit 66 is more than one, the representative motion vector calculation unit 68 calculates a representative characteristic value based on the characteristic amounts of the respective divided areas.

Here, when one or more divided areas are selected, it is preferable to use a sorting process. For example, by obtaining a difference of motion vector MV from that of another divided image based on a result of the first motion search process (1st ME) and sorting with the calculated value as a sort key, a predetermined number of divided images having a small difference in the motion vector MV from another divided image are selected and that information is stored in the storage unit 50. It is preferable to change the number of divided images to be selected in each motion estimation process.

(First Motion Search Processing Unit 10: First Motion Search Process (1st ME))

In the first motion search process, a pair of motion vectors MV (Vx, Vy) are calculated as a result of the LK method for each divided image and the calculated result is stored in the storage unit 50. The stored motion vectors MV are used for selecting a divided image or in the second motion search process, for example. In this case, calculation results in a process required to obtain the motion vectors MV (Vx, Vy), which are Axx $(=\Sigma(I_x)^2)$, Ayy $(=\Sigma(I_y)^2)$, Axy $(=\Sigma(I_x \cdot I_y))$, Axt $(=\Sigma(I_x \cdot I_t))$, and Ayt $(=\Sigma(I_y \cdot I_t))$, are stored in the storage unit 50 in order to use later for an ME invalidation determination, second and subsequent motion search processes, and the like. Further, additional information such as Ax $(=\Sigma I_x)$, Ay $(=\Sigma I_y)$, At $(=\Sigma I_t)$, Att $(=\Sigma(I_t)^2)$, which are not required in the original LK method, are also calculated and the calculated results are stored in the storage unit 50. Here, $I_x$, $I_y$ and $I_t$ represent pixel value variation amounts of the pixel in the horizontal, vertical, and time directions of the image sequence I (x, y, t) so that various calculation methods such as calculating a partial differential value can be employed for example. The term of the additional value $\Sigma$ composed of $I_x$, $I_y$, $I_t$ represents a value (summation) which each components are added across the entire divided image (the time component is also added according to need). For example, although it is not used in the present embodiment, an additional value $\Sigma$ that all of the horizontal, vertical, and time directions are considered is a value that calculation result of an arbitrary calculating formula composed of the pixel value variation amount in the horizontal direction, the pixel value variation amount in the vertical direction, and the pixel value variation amount in the time direction is added across the entire image. An additional value $\Sigma$ that the horizontal direction and the vertical direction are considered is a value that a calculation result of an arbitrary calculating formula composed of the pixel value variation amount in the horizontal direction and the pixel value variation amount in the vertical direction is added across the entire image. An additional value $\Sigma$ that the horizontal direction (or the vertical direction) and the time direction are considered is a value that a calculation result of an arbitrary calculating formula composed of the pixel value variation amount in the horizontal direction (or the vertical direction) and the pixel value variation amount in the time direction is added across the entire image.

(Motion Search Determination Unit 20: Determination of Validity/Invalidity of First Motion Search Process Result)

The motion search determination unit 20 determines whether the motion search process by the first motion search processing unit 10 is valid or invalid by using the first motion search process result and the calculation result in the process. For example, the motion search determination unit 20 determines that the motion search process result by the first motion search processing unit 10 is invalid when it is determined that the difficulty of the global motion search process GME is high based on the motion vectors MV (Vx, Vy) obtained by the first motion search processing unit 10. In this case, the second motion search processing unit 30 does not have to execute a second LK method. In the case of this determination, the second motion search processing unit 30 uses the first motion search process result and the calculation result in the process to obtain a standard deviation Se $(=\sigma e$, which is a standard deviation of a distribution of the error function values in the entire image of the LK method) and an absolute value D $(=\delta$, which is an absolute value of the pixel value variations in the time direction per pixel), and performs a process (a threshold comparison) for comparing the standard deviation Se and/or the absolute value D with a threshold parameter. The motion search determination unit 20 determines that the motion search process by the first motion search processing unit 10 is "valid" when the respective values are "lower" than the threshold value. Corresponding to this, the second motion search processing unit 30 uses the first motion search process result and the calculation result in the process and performs a second motion search process. On the other hand, the motion search determination unit 20 determines that the motion search process by the first motion search processing unit 10 is "invalid" when the respective values are "greater" than the threshold value and sets the motion vector MV (Vx=DVx, Vy=DVx) of the first motion search process result to "0: zero." In this case, the global motion search processing device 3A ends the entire process without executing the second motion search process by the second motion search processing unit 30. It is noted that the "lower" may be "equal to or lower" or "less." Corresponding to this "lower," regarding "high," "higher than" may be used with "equal to or lower" and "equal to or higher than" with "less."

With such a threshold value comparison of the standard deviation Se and the absolute value D by the motion search determination unit 20, it can be avoided that an undesirable motion vector MV, which is more likely to be generated when a local motion within an image is too large, is mistakenly used. Similarly, with the threshold value comparison of the standard deviation Se and the absolute value D, it can be avoided that an undesirable motion vector MV, which is more likely to be generated when a change of an illumination intensity in an image is too large, is mistakenly used. Here, when a threshold value comparison is executed, a preferable result can be obtained by comparing with the threshold value after an averaging filter by also using standard deviations Se and absolute values D in the past. A further preferable result can be obtained by comparing with the threshold value having hysteresis characteristics.

(Second Motion Search Processing Unit 30: Second Motion Search Process (2nd ME))

In the second motion search process, basically similarly to the first motion search process, a pair of motion vectors MV' (Vx', Vy') are newly calculated as a result of the LK method and the calculation result is stored in the storage unit 50. Here, the difference from the first motion search process is to determine whether to execute an addition in each pixel when the calculation result in the process or additional information, which are required to calculated the motion vector MV', are obtained. The calculation results in the process are Axx' $(=\Sigma(I'_x)^2)$, Ayy' $(=\Sigma(I'_y)^2)$, Axy' $(=\Sigma(I'_x \cdot I'_y))$, Axt' $(=\Sigma(I'_x \cdot I'_t))$, and Ayt' $(=\Sigma(I'_y \cdot I'_t))$. The additional information includes Ax' $(=\Sigma I'_x)$, Ay' $(=\Sigma I'_y)$, At' $(=\Sigma I'_t)$, and Att' $(=\Sigma(I'_t)^2)$. Here, in later described embodiments, the calculation results Axx', Ayy', Axy', Axt', and Ayt' and additional information Ax', Ay', At', and Att' are stored in the storage unit 50 to be used in a further subsequent motion search process and the like. The apostrophe (') is put to distinguish the first calculation and the second calculation; however, since the LK method is executed twice on the same pair of images, I' is equal to I in actual. On the other hand, each calculation value becomes a value different from the first value since a determination whether to add is executed.

Here, the second motion search processing unit 30 uses the first motion search process result and the calculation results in the process to determine whether to add, and obtains a distribution average Me' and a standard deviation Se' of error function values and a distribution average Mi' and a standard deviation Si' of pixel value variations. Further, the second motion search processing unit 30 calculates a degree of an outlier in each pixel with respect to the distribution average and performs a process (a threshold value comparison) to compare the degree of the outlier with a predetermined threshold parameter (a standard deviation, for example).

The distribution average Me' is an average $\sigma e'$ of a distribution of error function values within the selected divided image (selected image) in the LK method. The standard deviation Se' is a standard deviation σe' of a distribution of error function values within the selected divided image in the LK method. The distribution average Mi' is an average μi' of a distribution of pixel value variations in time direction within the selected divided image. The Si' is a standard deviation σi' of a distribution of pixel value variations in the time direction within the selected divided image.

When one of them or both of them are satisfied (the degree of the outlier is greater than the threshold value; hereinafter, also referred to as "being an outlier"), the second motion search processing unit 30 proceeds to a next pixel without obtaining each additional value Σ (here, especially Axx', Ayy', Axy', Axt' and Ayt'). In other words, the second motion search processing unit 30 calculates a degree of an outlier from the error function value in each pixel based on the average and the standard deviation of the error function value in the LK method, determines whether the calculated value is greater than the threshold value, and does not use this pixel to calculate the motion vector MV' when it is satisfied. The second motion search processing unit 30 calculates a degree of an outlier from the pixel value variation in each pixel based on the average and standard deviation of the pixel value variation in the time direction, determines whether the calculated value is greater than the threshold value, and does not use this pixel to calculate the motion vector MV' when it is satisfied. With this manner, a local motion at a certain degree and a change of brightness that works as noise can be removed and a desirable result as a global motion vector MV' can be obtained.

In particular, in the first embodiment (same in the later described embodiments), since first process result and information in calculation process are used to eliminate an outlier in the second LK method, the process amount can be reduced compared to the case of the LK method including the outlier elimination disclosed in Non-Patent Document 1, in which the first process result and information in calculation process are not used. Thus, a global motion search process which is robust to a local moving subject or an illumination intensity change can be executed as maintaining high calculation efficiency of the LK method.

[Concrete Process of Global Motion Search Processing Device]

(Entire Outline of Process Procedure)

Figure 2:
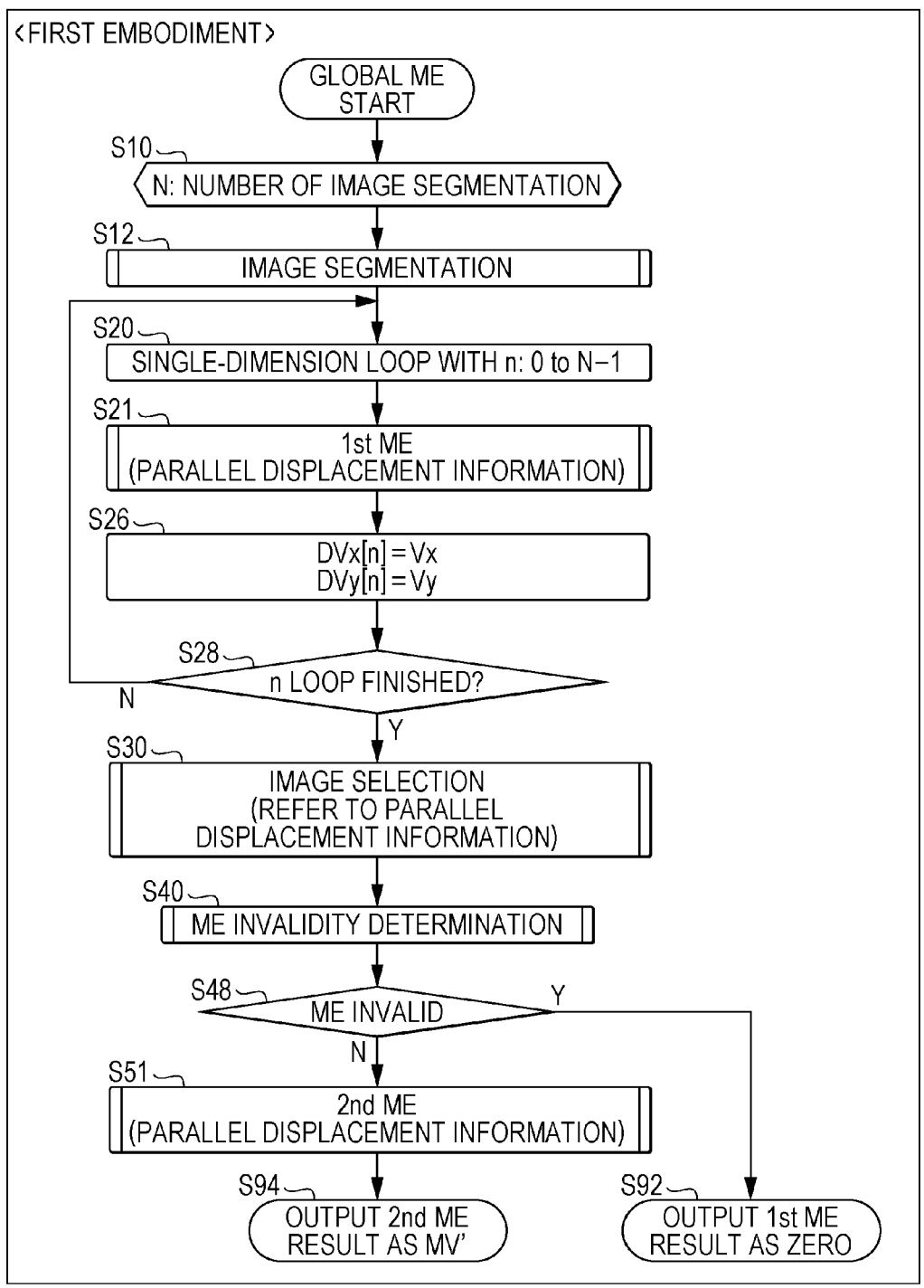
FIG. 2 is a flowchart explaining an entire outline of a procedure of a global motion search process executed by the global motion search processing device according to the first embodiment.

FIG. 2 is a flowchart that explains an entire outline of a procedure of a global motion search process executed by the global motion search processing device 3A in the first embodiment.

Firstly, the image segmentation unit 62 of the image segmentation and selection processing unit 60 receives setting of an image segmentation number N (S10) and divides a frame image to be processed (current image CIM) and reference image RIM according to the image segmentation number N (S12: described later in detail). Here, as described below, settings of a horizontal segmentation number X and a vertical segmentation number Y may be received and the image segmentation number N may be set based on the received settings.

Next, the first motion search processing unit 10 executes a first motion search process (1st ME) using the LK method for each divided image. Specifically, the first motion search processing unit 10 firstly sets an operator n which corresponds to a divided image number, to "0" (S20), and executes the motion search process (1st ME) using the LK method for the n (=0)th divided image (S21: described later in detail). The first motion search processing unit 10 stores motion vectors MV (Vx, Vy), which are the result of the process performed in a condition of "n (=0)," in the storage unit 50 as motion vectors MDV (DVx[n], DVy[n]) (S26). Then, the first motion search processing unit 10 increments the operator n by "1" and repeats the same process until a process in a condition that operator n=N−1 completes (S20, S28-N).

When the first motion search processing unit 10 completes the first motion search process (1st ME) for all divided images (S28-Y), the divided image selection unit 66 of the image segmentation and selection processing unit 60 selects a highly reliable divided image using the result of the motion search process (1st ME) of each divided image (S30: described later in detail).

Next, the motion search determination unit 20 determines difficulty and reliability of a global motion search process GME using the first motion search process result and the calculation results during the process by the first motion search processing unit 10 and determines whether the first motion search process (1st ME) is invalid or not (valid) (S40: described later in detail). When determining that the difficulty of the global motion search process GME is high, the motion search determination unit 20 cancels the motion search process by the first motion search processing unit 10 (S48-Y), sets the motion vector MV (Vx=DVx, Vy=DVx) as the first motion search process result to "0: zero," and outputs it as a result (motion vector MV) of the global motion search process GME (S92). In this case, a second LK method does not have to be performed by the second motion search processing unit 30, and the global motion search processing device 3A ends the entire process. On the other hand, when determining that the difficulty of the global motion search process GME is low, the motion search determination unit 20 validates the motion search process by the first motion search processing unit 10 (S48-N), and, in response to this, the second motion search processing unit 30 performs a second motion search process using the first motion search process result and the calculation results during the process (S51: described later in detail). The second motion search processing unit 30 outputs the motion vector MV' (Vx', Vy') of the result of the second motion search process (2nd ME) as a result (motion vector MV) of the global motion search process GME and ends the entire process (S94). When the first motion search process (1st ME) by the first motion search processing unit 10 is invalid (S48-Y), the second motion search process (2nd ME) is not performed by the second motion search processing unit 30. This prevents a misusage of an undesired motion vector MV and reduces the process load.

(Image Segmentation Process)

Figure 3:
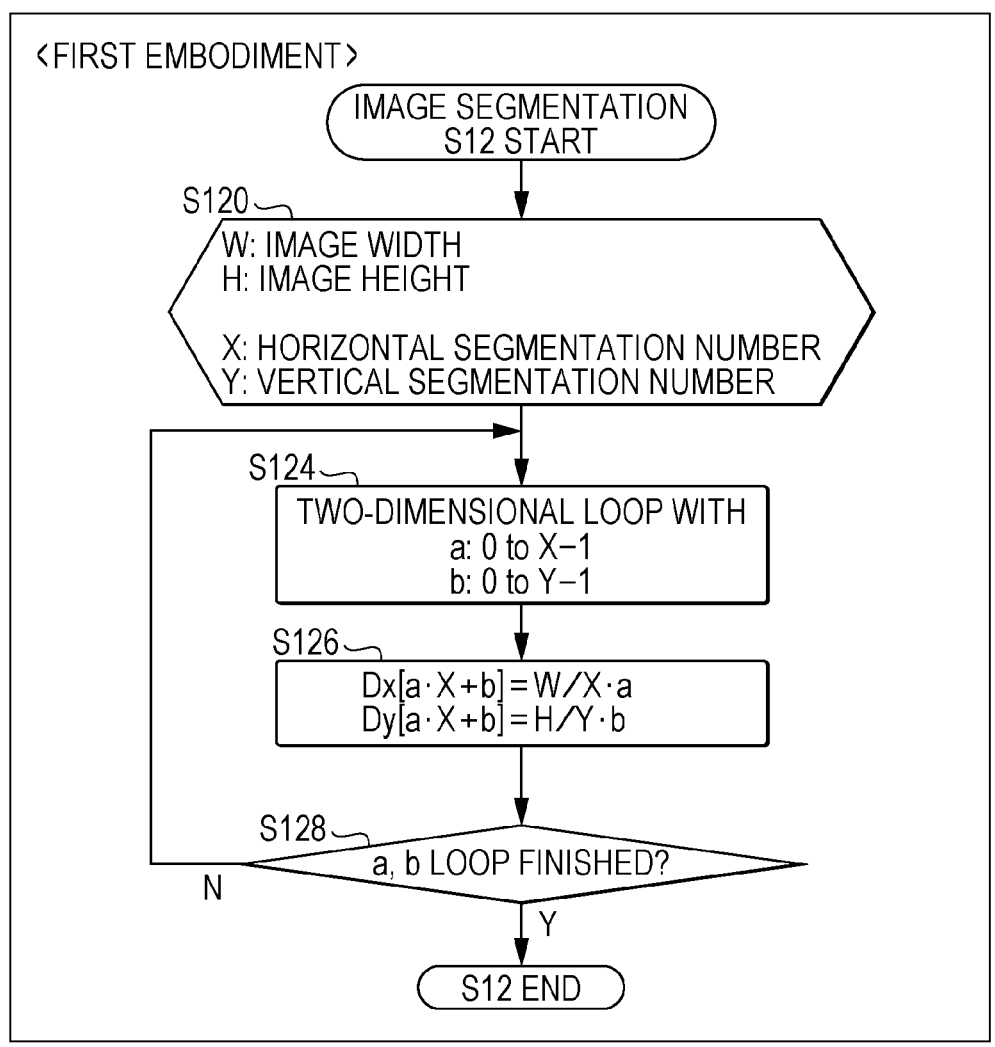
FIG. 3 is a flowchart explaining a procedure of an image segmentation process by an image segmentation unit.
Figure 4:
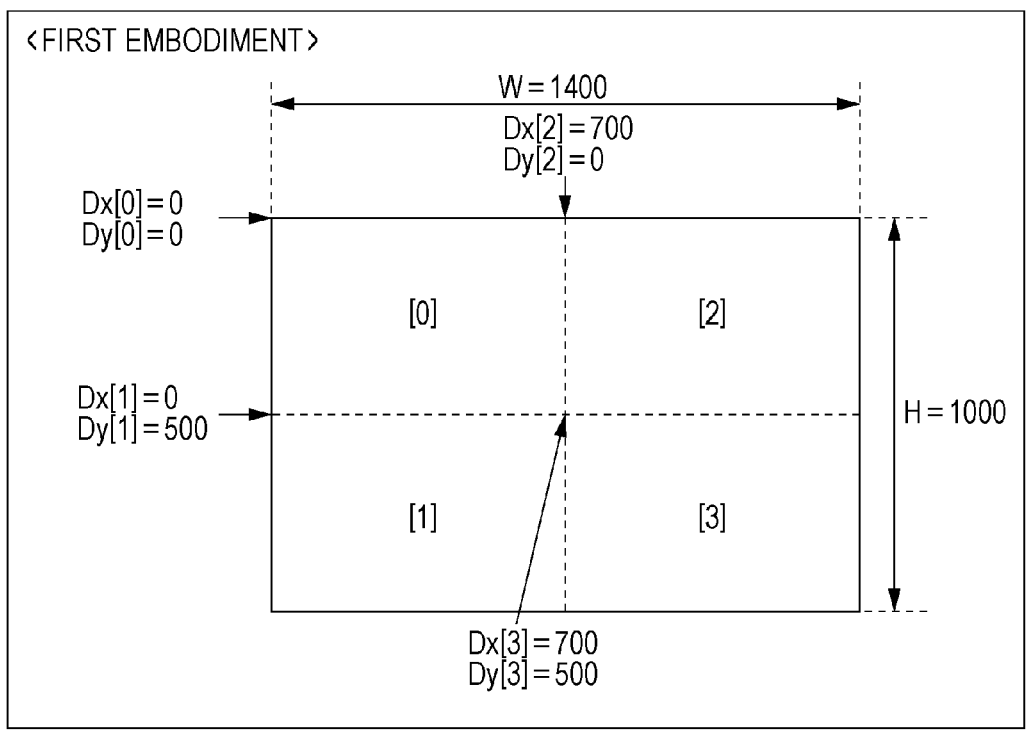
FIG. 4 is a diagram explaining a relationship between a divided image which is divided in the image segmentation process procedure illustrated in FIG. 3 and coordinate information specifying a position of the divided image.

FIGS. 3 and 4 are diagrams to explain the image segmentation process (S12) of the first embodiment by the image segmentation unit 62 of the image segmentation and selection processing unit 60. Here, FIG. 3 is a flowchart that explains a procedure of the image segmentation process by the image segmentation unit 62. FIG. 4 is a diagram that explains relationship between the divided image divided in the image segmentation process procedure illustrated in FIG. 3 and coordinate information that specifies the position of the divided image. It is noted that, regarding the number of each divided image, the upper left position is set to 0 and lower right position is set to the last number (N−1), as starting from upper left to lower left, then moving to a next column on the right, and moving from the above to the bottom.

The image segmentation unit 62 firstly receives settings of a width W (specified by the number of pixels), a height H (specified by the number of pixels), horizontal segmentation number X and vertical segmentation number Y of an image to be processed (current image CIM) and a reference image RIM (an image of a frame immediately prior to the image to be processed (S120). The image segmentation process method of the first embodiment is a method to uniformly divide the image and a multiplication of the horizontal segmentation number X and the vertical segmentation number Y becomes the image segmentation number N.

Next, the image segmentation unit 62 performs an image segmentation according to set horizontal segmentation number X and vertical segmentation number Y, and stores coordinate information that specifies the position of each divided image to the storage unit 50. Concretely, the image segmentation unit 62 calculates position information of a divided image as setting an array change element a corresponding to the horizontal segmentation number X from 0 to "X−1," and an array change element b corresponding to the vertical segmentation number Y to be from 0 to "Y−1," and starts a two-dimensional loop to be stored in storage unit 50 (S124). When the process starts, the image segmentation unit 62 firstly sets "0" to the array change element a and the array change element b respectively (S124), and calculates coordinate information Dy[a·X+b] in the vertical direction and coordinate information Dx[a·X+b] in the horizontal direction that specify the position of "a·X+b"th divided image (S126). For example, to obtain left top point coordinate information of each divided image, the coordinate information Dx[a·X+b] is set to W/X·a and the coordinate information Dy[a·X+b] is set to H/Y·b (S126). The calculation formula of the coordinate information described here is an example and other calculation formulas such as left bottom point or a central point can be used. The image segmentation unit 62 stores the obtained coordinate information Dx[a·X+b] and coordinate information Dy[a·X+b] to the storage unit 50 to use in the first motion search process (1st ME) (S126). Then, the image segmentation unit 62 determines whether the a, b loop is finished. When it is not finished, the process returns to step S124 (S128-N) and, when it is finished, the process proceeds to the next step. In other words, the image segmentation unit 62 increments the array change element a or the array change element a by "1" and repeats the same process until the process in which the array change element a is X−1 and the array change element b is Y−1 is completed (S128-N).

For example, FIG. 4 illustrates an example case that an image having 1400 pixels as width W in the horizontal direction and 1000 pixels as height H in the vertical direction is divided into four images as a whole, as setting the horizontal segmentation number X to 2 and the vertical segmentation number Y to 2. When a=0 and b=0, the coordinate information Dx[0·2+0] is calculated as 1400/2·0=0 and the coordinate information Dy[0·2+0] is calculated as 1000/2·0=0. In other words, the 0th (="a·X+b") divided image is at the left top, and the left top point of the divided image has the horizontal direction coordinate information Dx[0] which is 0 and the vertical direction coordinate information Dy[0] which is 0. When a=0 and b=1, the coordinate information Dx[0·2+1] is calculated as 1400/2·0=0 and the coordinate information Dy[0·2+1] is calculated as 1000/2·1=500. In other words, the first (="a·X+b") divided image is at the left bottom, and the left top point of the divided image has the horizontal direction coordinate information Dx[1] which is 0 and the vertical direction coordinate information Dy[1] which is 500. When a=1 and b=0, the coordinate information Dx[1·2+0] is calculated as 1400/2·1=700 and the coordinate information Dy[1·2+0] is calculated as 1000/2·0=0. In other words, the second (="a·X+b") divided image is at the right top and the left top point of the divided image has the horizontal direction coordinate information Dx[2] which is 700 and the vertical direction coordinate information Dy[2] which is 0. When a=1 and b=1, the coordinate information Dx[1·2+1] is calculated as 1400/2·1=700 and the coordinate information Dy[1·2+1] is calculated as 1000/2·1=500. In other words, the third (="a·X+b") divided image is at the right bottom and the left top point of the divided image has the horizontal direction coordinate information Dx[3] which is 700 and the vertical direction coordinate information Dy[3] which is 500.

(First Motion Search Process (1st ME))

Figure 5:
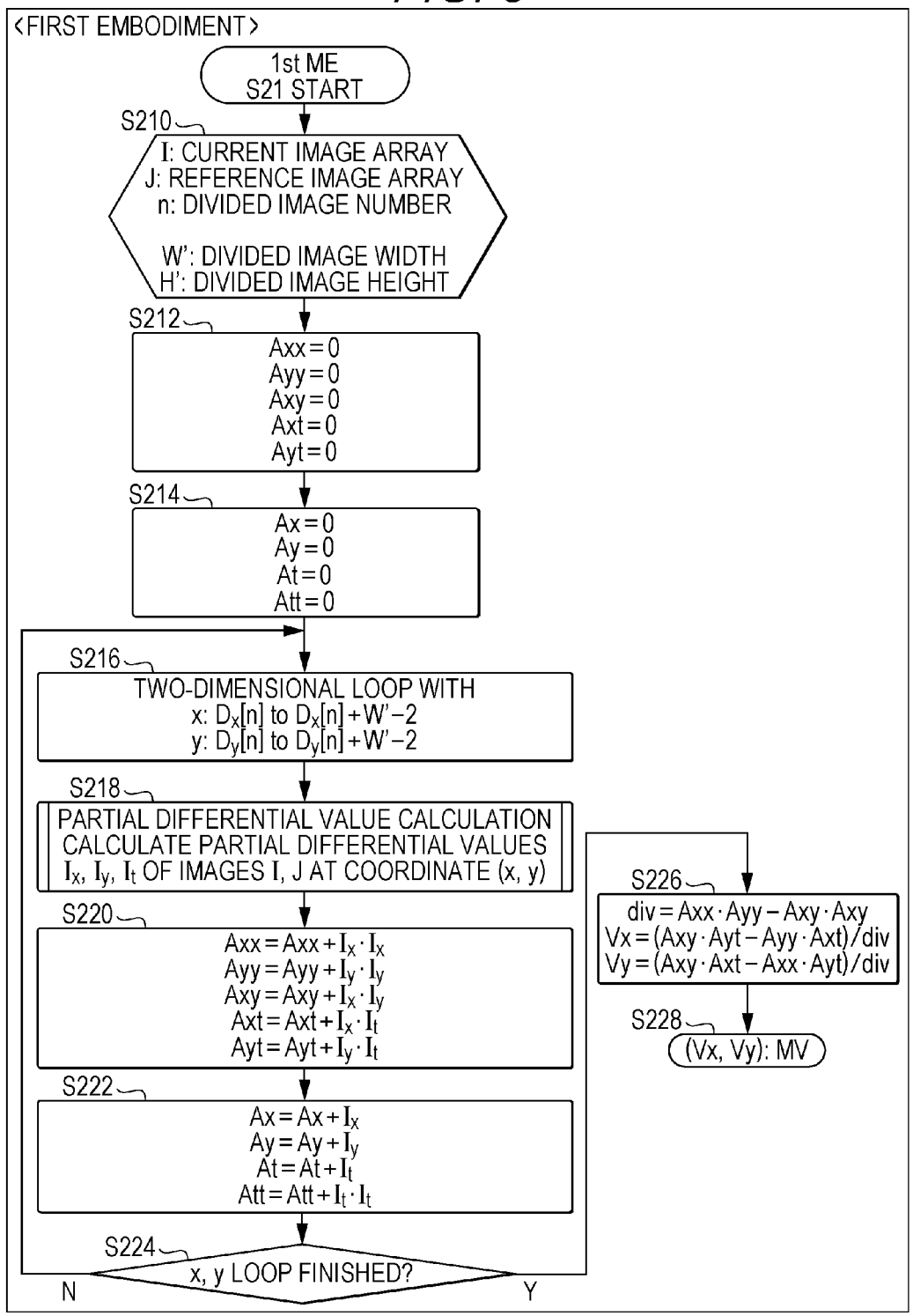
FIG. 5 is a flowchart explaining a first motion search process (S21), according to the first embodiment, by a first motion search processing unit.

FIG. 5 is a flowchart that illustrates the first motion search process (S21) of the first embodiment by the first motion search processing unit 10. The motion search process illustrated here is an example that the LK method is enlarged and, basically, the first motion search processing unit 10 obtains the motion vector MV (Vx, Vy) according to the following equation (referred to as the equation (1)). Note that the Axx $(=\Sigma(I_x)^2)$, Ayy $(=\Sigma(I_y)^2)$, Axy $(=\Sigma(I_x \cdot I_y))$, Axt $(=\Sigma(I_x \cdot I_t))$, Ayt $(=\Sigma(I_y \cdot I_t))$ and div=Axx·Ayy−Axy·Axy=Axx·Ayy−(Axy)².

[Mathematical Formula 1]

$$\begin{aligned} Vx &= (Axy \cdot Ayt - Ayy \cdot Axt)/(Axx \cdot Ayy - (Axy)^2 \\ &= (Axy \cdot Ayt - Ayy \cdot Axt)/div \\ Vy &= (Axy \cdot Axt - Axx \cdot Ayt)/(Axx \cdot Ayy - (Axy)^2 \\ &= (Axy \cdot Axt - Axx \cdot Ayt)/div \end{aligned} \quad (1)$$

The procedure will be sequentially explained. The first motion search processing unit 10 firstly inputs a current image array I and a reference image array J, and obtains a width W' (=W/X) of the divided image (operator n of the divided image number) and a height H' (=H/Y) of the divided image (S210).

Next, the first motion search processing unit 10 sets parameters Axx, Ayy, Axy, Axt, and Ayt of the first process calculation to be an initial value 0 (S212) and parameters Ax, Ay, At, and Att to be an initial value 0 (S214).

Next, the first motion search processing unit 10 switches the coordinate x of the divided image (divided image number n) from Dx[n] to Dx[n]+W'−2 and the coordinate y from Dy[n] to Dy[n]+H'−2, and starts a two-dimensional loop to calculate a pixel value variation amount (here, a partial differential value is employed) in the pixels in the horizontal, vertical, and time directions of the image sequence I (x, y, t) and store it in the storage unit 50 (S216). The "−2" in the "W'−2" and "H'−2" is a final pixel position in the loop process and may be set appropriately. When the final position is placed at a side of the divided image, "−1" corresponding to the final pixel position can be used (that is, image width W−1=final coordinate of the image); however, when a partial differential calculation is performed as described later, "−2" is used so that the process ends at a pixel prior to the side since one forward pixel is to be referred.

When the process starts, the first motion search processing unit 10 calculates partial differential values $I_x$, $I_y$, and $I_t$ of the current image I and the reference image J in the coordinate (x, y), and stores the calculated result in the storage unit 50 (S218: described later in detail). The first motion search processing unit 10 calculates Axx, Ayy, Axy, Axt, and Ayt based on the calculated partial differential values $I_x$, $I_y$, and $I_t$ and stores the calculated result in the storage unit 50. Concretely, $I_x \cdot I_x$ of the pixel is added to Axx, $I_y \cdot I_y$ of the pixel is added to Ayy, $I_x \cdot I_y$ of the pixel is added to Axy, $I_x \cdot I_t$ of the pixel is added to Axt, and $I_y \cdot I_t$ of the pixel is added to Ayt, which are respectively calculated in the previous loop (S220). Further, the first motion search processing unit 10 also calculates Ax, Ay, At, and Ayt which are not originally required in the LK method based on the calculated partial differential values $I_x$, $I_y$, and $I_t$, and stores the calculated results in the storage unit 50. Concretely, $I_x$ of the pixel is added to Ax, $I_y$ of the pixel is added to Ay, $I_t$ of the pixel is added to At, and $I_t \cdot I_t$ of the pixel is added to Att, which are respectively calculated in the previous loop (S222).

The first motion search processing unit 10 determines whether the x, y loop is finished. The process returns to step S216 when it is not finished (S224-N), and the process proceeds to a sequential step when it is finished. In other words, when the first motion search process (1st ME) for all pixels of the divided image of the divided image number n is completed (S224-Y), the first motion search processing unit 10 calculates a motion vector MV (Vx, Vy) using the calculated Axx, Ayy, Axy, Axt, and Ayt and based on the equation (1) (S226), and stores the calculated result in the storage unit 50 (S228).

(Partial Differential Value Calculation Process)

Figure 6:
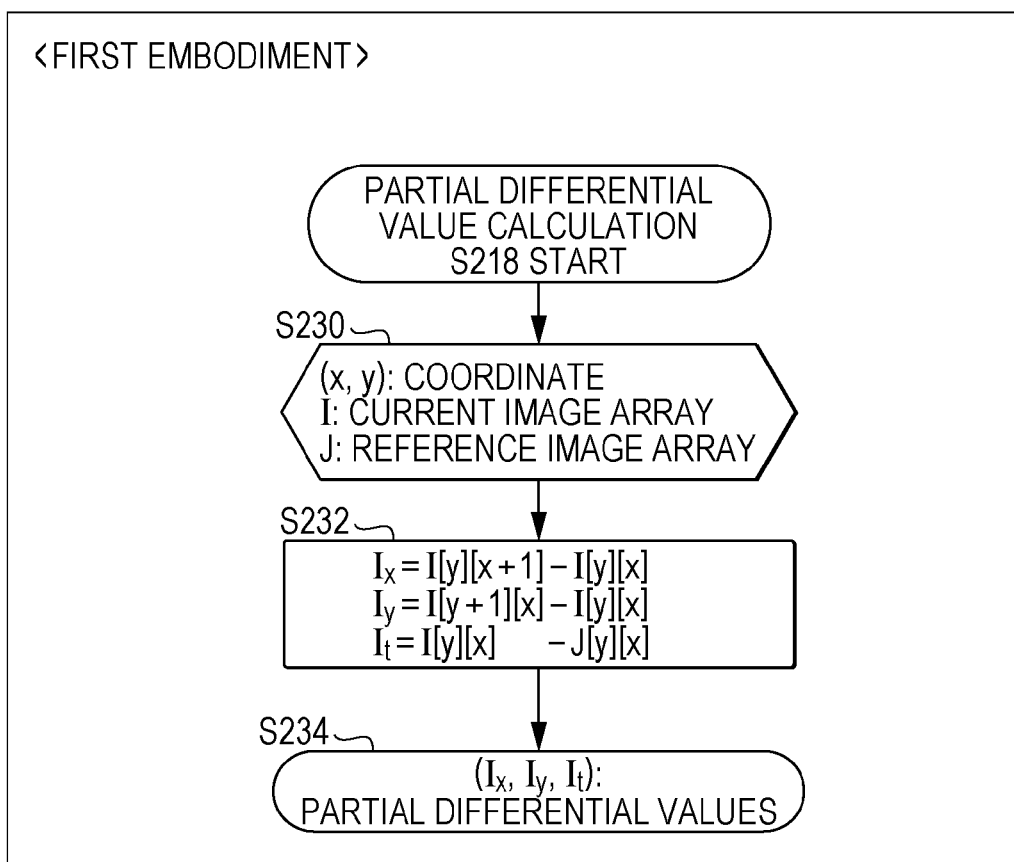
FIG. 6 is a flowchart explaining a partial differential value calculation process (S218) by the first motion search processing unit.

FIG. 6 is a flowchart that explains a partial differential value calculation process (S218) by the first motion search processing unit 10. The first motion search processing unit 10 obtains the current image I and the reference image J in the coordinate (x, y) (S230) and obtains their partial differential values $I_x$, $I_y$, and $I_t$ (S232). For example, regarding the current image I, a difference (=I[y][x+1]−I[y][x]) between a partial differential value I[y][x+1] of a pixel which is shifted from the present pixel by one unit (one pixel) in the horizontal direction (the pixel number is increased by 1) and the partial differential value I[y][x] of the present pixel is obtained as a partial differential value I, and a difference (=I[y+1][x]−I[y][x]) between the partial differential value I[y+1][x] of a pixel which is shifted from the pixel by one unit (one pixel) in the vertical direction from the present pixel (the pixel number is increased by 1) and the partial differential value I[y][x] of the present pixel is obtained as a partial differential value $I_y$. Further, the first motion search processing unit 10 obtains a difference (=I[y][x]−J[y][x]), as a partial differential value $I_t$, between the partial differential value I[y][x] and the partial differential value J[y][x], which are the same pixels of the current image I and reference image J shifted by one unit in the time direction. The first motion search processing unit 10 stores the respective calculated partial differential values $I_x$, $I_y$, and $I_t$ in the storage unit 50 (S234).

(Divided Image Selection Process)

Figure 7:
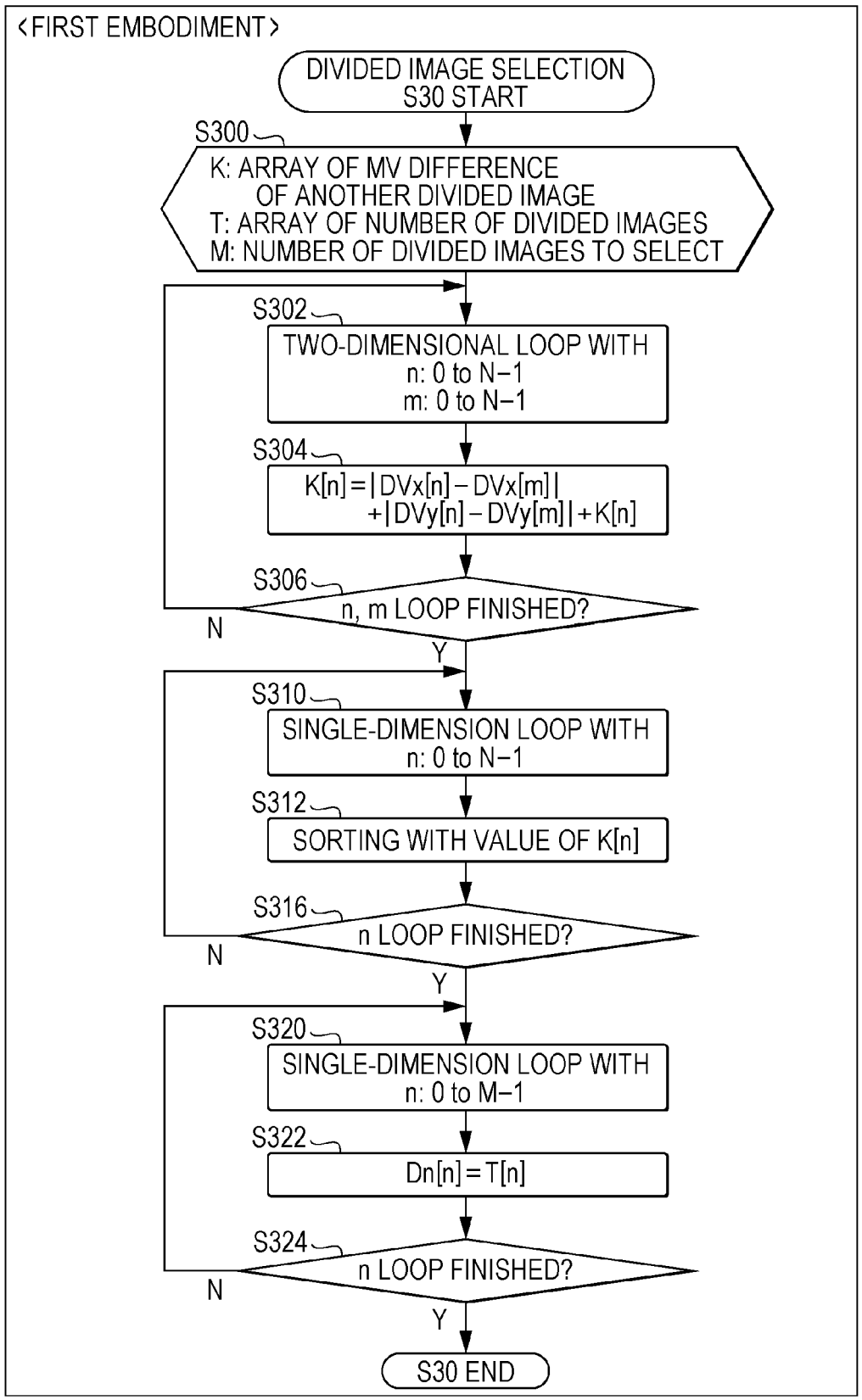
FIG. 7 is a flowchart explaining a divided image selection process (S30) by a divided image selection unit.

FIGS. 7 and 8 are diagrams explaining a divided image selection process (S30) of the first embodiment by the divided image selection unit 66 of the image segmentation and selection processing unit 60. Here, FIG. 7 is a flowchart that explains the divided image selection process (S30) by the divided image selection unit 66. FIG. 8 is a diagram that explains a relationship between the divided image, which is selected in the divided image selection process illustrated in FIG. 7, and the divided image number. FIG. 8(A) illustrates motion vectors MDV (DVx, DVy) for all divided images stored in the storage unit 50 by the first motion search process (1st ME) and accumulated values of Axx, Ayy, Axy, Axt, Ayt, Ax, Ay, At, and Att. The [n] (the number in brackets) represents each divided image number.

The divided image selection unit 66 firstly stores an array K[n] of a difference from a motion vector MDV(DVx[n], DVy[n]) of another divided images and an array T[n] of divided image numbers in the storage unit 50, and sets a selection number M (M is equal to or lower than the entire segmentation number N) of a highly reliable divided image (S300). The selection number M of the divided image can be changed in each motion estimation process. The selection number M is made to be "equal to or lower than the entire segmentation number N" for the sake of usefulness. For example, when the reliability of the entire image is high, the selection number M may be specified to be N. According to the first embodiment, the process can be performed when M=N, and, since it is set that "the selection number M of a divided image can be changed in each motion estimation process," it is possible to specify that M=N in addition to that the selection number M is "lower than the entire segmentation number N. When M=N, processes of image segmentation and image selection are executed; however, substantially, two motion search processes (the second process is an outlier emission) are executed for the entire image. Here, two same motion search processes are not simply repeated for the entire image.

Next, the divided image selection unit 66 starts the two-dimensional loop to calculate a motion vector difference total value K[n], as changing the operator n from 0 to "N−1" and the operator m from 0 to "N−1," and by using the motion vector MDV(DVx[n], DVy[n]) ("n" is from 0 to "N−1," see FIG. 8(A)) based on the result of the motion search process (1st ME) in each divided image, and store the calculated value in the storage unit 50 (S302). When the process starts, the divided image selection unit 66 firstly sets the operator n to 0, calculates the total of each motion vector difference between the horizontal direction and vertical direction as setting the operator m from 0 to "N−1" (process is not needed when n=m) as a motion vector difference total value K[0], and stores it in the array of the storage unit 50 (S304). Concretely (explaining as referring to FIG. 8), the total value K[0] is initialized to "0," the operator m is set to 1, and K[0]=|(DVx[0]−DVx[1])|+|DVy[0]−DVy[1]| is calculated. Next, |(DVx[0]−DVx[2])|+|DVy[0]−DVy[2]| when the operator m is set to 2 is calculated, the calculated result is added to K[0] which has been calculated in previous loop (m=1). Further, a final motion vector difference total value K[0] is obtained and stored in the storage unit 50 by calculating |(DVx[0]−DVx[3])|+|DVy[0]−DVy[3]| when the operator m is set to 3 and adding the calculated result to K[0] which has been calculated in previous loop (m=2). Similarly, by repeating to set the operator n from 1 to "N−1," the motion vector difference total value K[1], the motion vector difference total value K[2], and the motion vector difference total value K[3] are respectively obtained and stored in each array of the storage unit 50 (see FIG. 8(B)).

Then, the divided image selection unit 66 determines whether the n, m loop is finished, returns to step S302 when the loop is not finished (S306-N), and proceeds to a sort process when the loop is finished (S306-Y). When the sort process starts, the divided image selection unit 66 sets the operator n from 0 to "N−1" (S310), and starts a single-dimension loop to sort by using the obtained motion vector difference total value K[n] ("n" is from 0 to N−1: K[0], K[1], K[2], and K[3] in FIG. 8(B)) as a sort key (S312). When sorting the motion vector difference total value K[n], the respective divided image number T[n] are also sorted (see FIG. 8(C)). In the example illustrated in FIG. 8(C), the relation is described as K[2]<K[3]<K[1]<K[0]; based on the result, the motion vector difference total value K[n] is sorted respectively in the order of K[2], K[3], K[1], and K[0]; and, corresponding to this, the divided image number T[n] is sorted respectively in the order of T[0]=2, T[1]=3, T[2]=1, and T[3]=0.

Then, the divided image selection unit 66 determines whether the n loop is finished, returns to step S310 when the loop is not finished (S314-N), and proceeds to an image selection process when the loop is finished (S314-Y). When the image selection process starts, the divided image selection unit 66 starts a single-dimension loop to set the operator n from 0 to "M−1" (S320) as maintaining an array Dn[n] of selection divided image number in the storage unit 50, and selects M number of divided images based on the sorted motion vector difference total value K[n] ("n" is from 0 to N−1: K[0], K[1], K[2], and K[3] in FIG. 8(B)). When the selection process starts, the divided image selection unit 66 selects the selection number (M number) of divided image numbers having a small difference of the motion vector MDV of another divided image (the motion vector difference total value K[n], in this example) based on a sorted result, and stores the information of the divided image number T[n] in a selection divided image number array Dn[n] in the storage unit 50 (S332: see FIG. 8(D)). Then, the divided image selection unit 66 determines whether the n loop is finished, returns to step S320 when the loop is not finished (S324-N), and proceeds to a divided image selection process when the loop is finished (S324-Y). In the example illustrated in FIG. 8(D), the selection number M is 2, and there stored the selection divided image number Dn[0] calculated as T[0]=2 and the selection divided image number Dn[1] calculated as T[1]=3.

(Motion Search Validity Determination Process)

Figure 9:
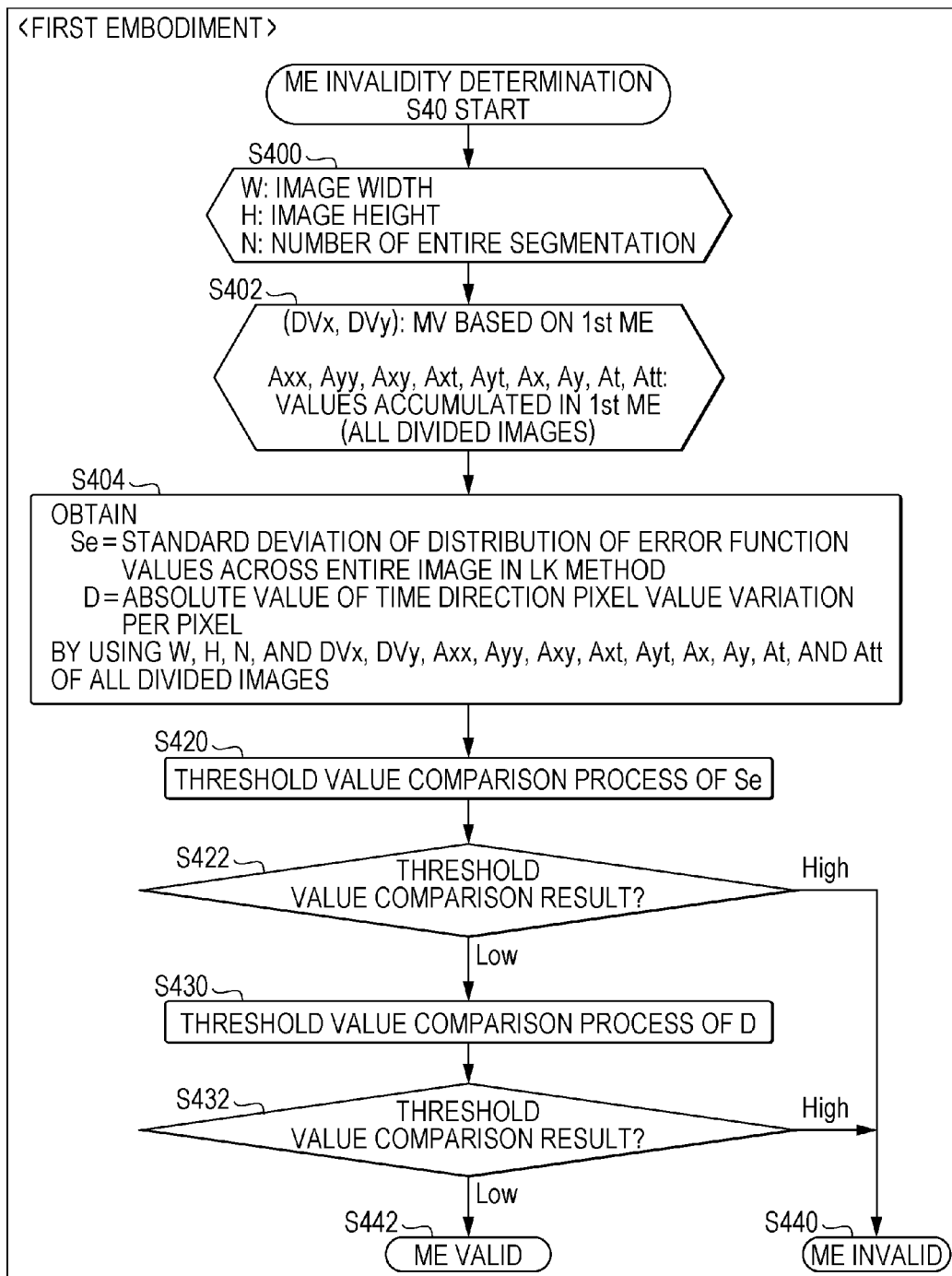
FIG. 9 is a flowchart explaining a validity determination process in the motion search process by a motion search determination unit according to the first embodiment.

FIG. 9 is a flowchart that explains a validity determination process of the motion search process by the motion search determination unit 20 according to the first embodiment. The motion search determination unit 20 firstly obtains the width W (specified by number of pixels), the height H (specified by the number of pixels), and the number of the entire segmentation number N of the image to be processed (current image CIM) and the reference image RIM (an image of one frame prior to the image to be processed, for example) (S400). For example, setting information in step S120 is used.

Next, upon receiving the result of the first motion search process (1st ME), the motion search determination unit 20 obtains the motion vector MDV(DVx, DVy) and accumulated values of Axx (=$\Sigma(I_x)^2$), Ayy (=$\Sigma(I_y)^2$), Axy (=$\Sigma(I_x \cdot I_y)$), Axt (=$\Sigma(I_x \cdot I_t)$), Ayt (=$\Sigma(I_y \cdot I_t)$), Ax (=$\Sigma I_x$), Ay (=$\Sigma I_y$), and Att (=$\Sigma(I_t)^2$) (see FIG. 8) of all divided image stored in the storage unit 50 (S402).

Next, the motion search determination unit 20 (the standard deviation determination unit 22 and the pixel value variation determination unit 24) calculates a standard deviation Se of the error function values (=a standard deviation σe of distribution of the error function values in the entire image in the LK method) and an absolute value D of the pixel value variations (=an absolute value δ of the pixel value variations in the time direction per one pixel) according to the equation (2) and using the width W, the height H, the entire segmentation number N, the motion vector MDV (DVx, DVy) of all divided images, Axt, Ayt, Ax, Ay, and Att (S404). Note that the entire segmentation number N is used to calculate an average Vxave from DVx[0] to DVx[N−1] and an average Vyave from DVy[0] to DVy[N−1]. F(α, β, γ . . . ) represents a function expression of respective parameters α, β, γ . . . . The parameters α, β, γ, . . . include a calculation value indicated in another function expression. Concrete function expressions are not described here. Further, F(α, β, γ, . . . ) described here is also one example. Further, the distribution average Me is an average of distribution of the error function values across the entire image in the LK method.

[Mathematical Formula 2]

$$\left.\begin{array}{l}\text{Average } Vxave \text{ from } DVx[0] \text{ to } DVx[N-1]\text{: an average value of} \\ \text{motion vectors in the horizontal direction in the entire image} \\ \text{Average } Vyave \text{ from } DVy[0] \text{ to } DVy[N-1]\text{: an average value of} \\ \text{motion vectors in the vertical direction in the entire image} \\ Vsum = F(Vxave, Vxave, Axx, Ayy, Axy, Att, Axt, Ayt) \\ Me = F(Vxave, Vxave, Ax, Ay, At, W, H) \\ Se = F(Vsum, Me, W, H) \\ D = F(At, W, H)\end{array}\right\} \quad (2)$$

Next, the motion search determination unit 20 (the standard deviation determination unit 22 thereof) executes a threshold value comparison of the standard deviation Se, using the predetermined threshold value (S420). As a result of threshold value comparison, when it is determined that the standard deviation Se is greater than the threshold value, the motion search determination unit 20 determines that the first motion search process (1st ME) by the first motion search processing unit 10 is invalid and ends the process (S422-High, S440). As a result of threshold value comparison, when the standard deviation determination unit 22 determines that the standard deviation Se is smaller than the threshold value, the pixel value variation determination unit 24 performs a threshold value comparison of the pixel value variation absolute value D by using a predetermined threshold value (S422-Low, S430). As a result of threshold value comparison, when it is determined that the pixel value variation absolute value D is greater than the threshold value, the motion search determination unit 20 determines that the first motion search process (1st ME) by the first motion search processing unit 10 is invalid (S432-High, S440). As a result of threshold value comparison, when it is determined that the pixel value variation absolute value D is smaller than the threshold value, the motion search determination unit 20 determines that the first motion search process (1st ME) by the first motion search processing unit 10 is valid (S432-Low, S442).

In this example, after the error function value standard deviation Se and the pixel value variation absolute value D are calculated, the threshold value comparisons of the standard deviation Se and the absolute value D are executed; however, a modification may be made so that, after the calculation and the threshold value comparison of one of the standard deviation Se and absolute value D are executed, the calculation and the threshold value comparison of the other are executed. Further, although the accuracy is deteriorated, a modification may be made so that the calculation and the threshold value comparison of only one of the standard deviation Se and the absolute value D is executed.

According to the motion search validity determination process of the first embodiment, the threshold value comparison of the standard deviation Se can prevent the motion vector MV, which tends to be easily generated when the local motion within the image is too large, from being mistakenly used, and the threshold value comparison of the pixel value variation absolute value D can prevent the motion vector MV, which tends to be easily generated when the change of the illumination intensity in the image is too large, from being mistakenly used. When the threshold value comparison is executed, a further preferable result can be obtained by executing a threshold value comparison after an averaging filter also using the standard deviation Se and the absolute value D in the past. Further, a further preferable result can be obtained by executing a threshold value comparison having hysteresis characteristics.

(Second Motion Search Process (2nd ME))

Figure 10:
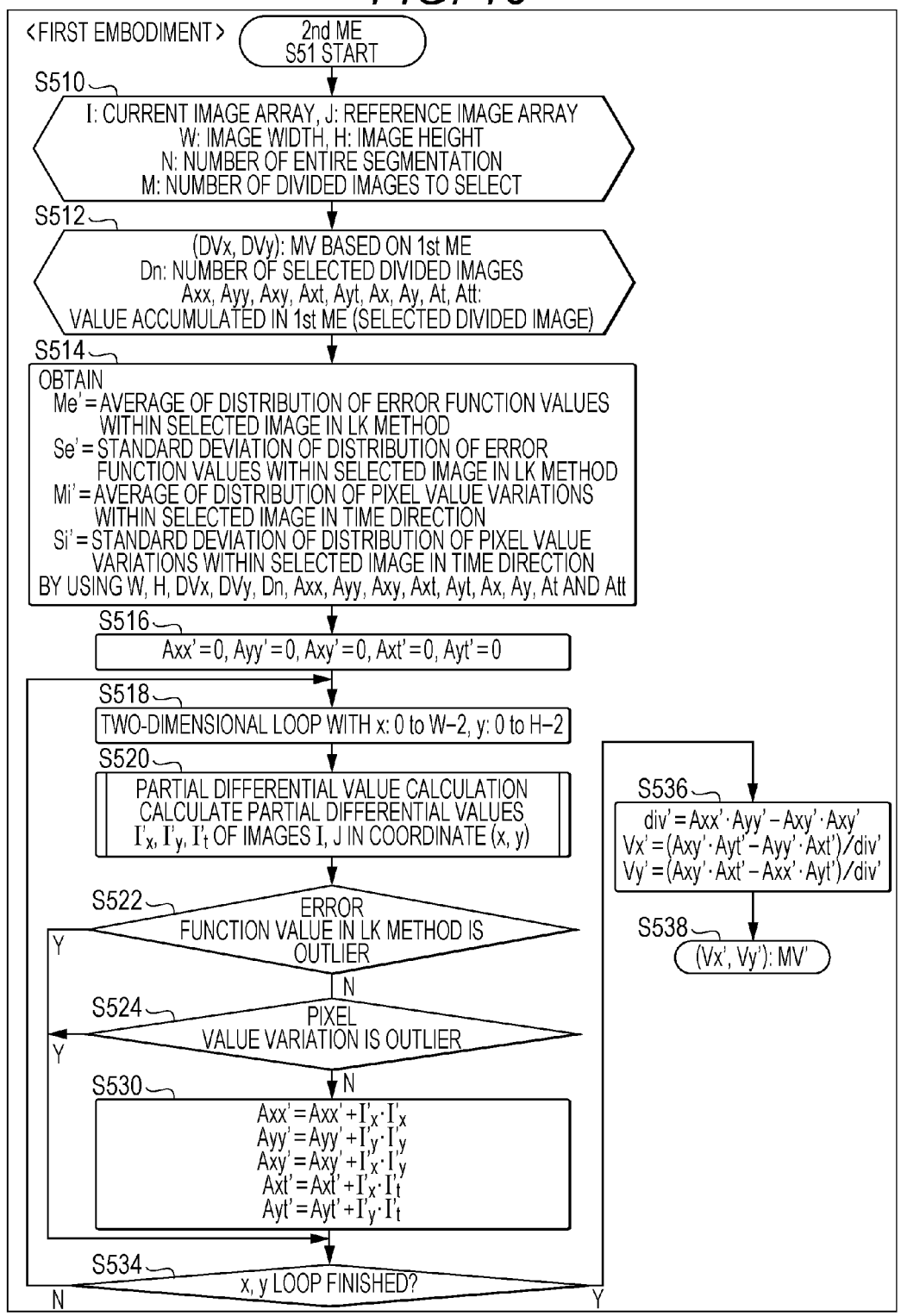
FIG. 10 is a flowchart explaining a second motion search process (S51), according to the first embodiment, by a second motion search processing unit.

FIG. 10 is a flowchart that explains the second motion search process (S51) of the first embodiment by the second motion search processing unit 30.

The second motion search process illustrated here is an example that the LK method is enlarged, similarly to the first motion search process (1st ME) and, basically, the motion search determination unit 20 obtains the motion vector MV' (Vx', Vy') according to the equation (1). Here, the second motion search process (2nd ME) is different from the first motion search process (1st ME) in that a calculation process is executed for the entire image and that an additional value Σ for a specific pixel, in other words, that "adding for all over the image" is not executed.

In order to determine a specific pixel which is not to be used to calculate the additional value Σ, the second motion search processing unit 30 firstly obtains a current image I and a reference image J, and obtains the width W (specified by the number of pixels) and the height H (specified by the number of pixels) of each image, the entire segmentation number N, and information of the divided image selection number M (S510). For example, setting information in step S120 or step S300 is used.

Next, the second motion search processing unit 30 obtains the motion vector MDV (DVx, DVy), selected divided image number Dn, and accumulated values of Axx ($=\Sigma(I_x)^2$), Ayy ($=\Sigma(I_y)^2$), Axy ($=\Sigma(I_x \cdot I_y)$), Axt ($=\Sigma(I_x \cdot I_t)$), Ayt ($=\Sigma(I_y \cdot I_t)$), Ax ($=\Sigma I_x$), Ay ($=\Sigma I_y$), At ($=\Sigma I_t$), and Att ($=\Sigma(I_x)^2$) of each selection (selected divided image) by the divided image selection unit 66 from the entire divided image stored in the storage unit 50 in response to the result of the first motion search process (1st ME) (see FIG. 8) (S512).

Next, the second motion search processing unit 30 calculates an error function value distribution average Me', a standard deviation Se', a pixel value variation distribution average Mi', and a standard deviation Si' according to the equation (3), by using the width W, the height H, the entire segmentation number N, the selection number M, the selected divided image motion vector MDV (DVx, DVy), Dn, Axx, Ayy, Axy, Axt, Ayt, Ax, Ay, At, and Att (S514). Here, the error function value distribution average Me' is an average μe' in distribution of the error function values in the selected image in the LK method. The error function value standard deviation Se' is a standard deviation σe' in distribution of error function values in the selected image in the LK method. The pixel value variation distribution average Mi' is an average μi' in distribution of pixel value variations in the time direction in the selected image. The pixel value variation standard deviation Si' is a standard deviation σi' in distribution of pixel value variations in the time direction in the selected image. Here, the representative characteristic value calculation unit 38 calculates an average value of motion vectors in the selected divided image (representative motion vector DVxave, DVyave) as a representative characteristic amount. For example, the representative characteristic value calculation unit 38 calculates an average DVxave (an average of the motion vectors in the horizontal direction in the selected divided image) by using from DVx[0] to DVx[N−1], selection number M, and divided image number Dn, and calculates an average DVyave (an average of motion vectors in the vertical direction in the selected divided image) by using from DVy[0] to DVy[N−1], the selection number M, and the divided image number Dn. As a method for calculating DVxave and DVyave, based on Dn[0 to M−1], DVx, DVy of each selected divided image are added and the added result is divided by the selection number M.

[Mathematical Formula 3]

$$\left.\begin{array}{l}\text{Average } DVxave \text{ of the selected divided image } Dn \text{ from} \\ DVx[0] \text{ to } DVx[N-1]\text{: an average value of the motion vectors} \\ \text{in the horizontal direction in the selected divided image } Dn \\ \text{Average } DYyave \text{ of the selected divided image } Dn \text{ from} \\ DVx[0] \text{ to } DVx[N-1]\text{: an average value of the motion vectors} \\ \text{in the vertical direction in the selected divided image } Dn \\ DVsum = F(DVxave, DVxave, Axx, Ayy, Axy, Att, Axt, Ayt) \\ Me' = F(DVxave, DVxave, Ax, Ay, At, W, H, M, N) \\ Se' = F(DVsum, Me', W, H, M, N) \\ Mi' = F(At, W, H, M, N) \\ Si' = F(Att, Mi', W, H, M, N)\end{array}\right\} \quad (3)$$

Next, the second motion search processing unit 30 sets the second process calculation parameters Axx', Ayy', Axy', Axt', and Ayt' to be 0 as an initial value (S516). Next, the second motion search processing unit 30 starts a two-dimensional loop to calculate a pixel value variation amount (which is used with a partial differential value in this example) of the image sequence I (x, y, t) in the horizontal, vertical, and time directions in this image as setting the coordinate x from 0 to W−2 and the coordinate y from 0 to H−2 of the image, and stores in the storage unit 50 (S518). When this process starts, the second motion search processing unit 30 calculates partial differential values I'$_x$, I'$_y$, and I'$_t$ of the current image I and the reference image J in the coordinate (x, y), and stores the calculation result in the storage unit 50 (S5209). The details of this partial differential value calculation process are the same as the partial differential value calculation process (S218) in the first motion search process (1st ME) (see FIG. 6).

Next, the second motion search processing unit 30 introduces a conditional branching to evaluate a following conditional expression (S522, S524), based on the calculated partial differential values I'$_x$, I'$_y$, and I'$_x$, in a loop to recalculate Axx', Ayy', Axy', Axt', and Ayt' (S518 to S534). Concretely, the second motion search processing unit 30 calculates an outlier degree of the error function value in each pixel with respect to the distribution average Me' of the error function values in the LK method, according to the equation (4). The second motion search processing unit 30 executes a threshold value comparison of the outlier degree of the error function value using a predetermined threshold value (S522). As the "predetermined threshold value," the standard deviation Se' is used, for example. When the outlier degree of the error function value is greater than the threshold value, the process proceeds to a subsequent pixel without taking an additional value Σ (S522-Y).

[Mathematical Formula 4]

$$\left.\begin{array}{l}\text{Outlier degree} = F(I'_x, I'_y, I'_t, DVxave, DYyave, Me') \\ = I'_x \cdot DVxave + I'_y \cdot DVyave + I'_t - Me'\end{array}\right\} \quad (4)$$

When the outlier degree of the error function value is not greater than the threshold value (S522-N), the second motion search processing unit 30 calculates an outlier degree of a pixel value variation in each pixel with respect to the distribution average Mi' of error function values in the LK method, according to the equation (5). The second motion search processing unit 30 executes a threshold value comparison of an outlier degree of the pixel value variation by using a predetermined threshold value (S524). As the "predetermined threshold value," the standard deviation Si' is used for example. When the outlier degree of the pixel value variation is greater than the threshold value, the process proceeds to a subsequent pixel without taking an additional value Σ (S524-Y).

[Mathematical Formula 5]

$$\left.\begin{array}{l}\text{Outlier degree} = F(I'_t, Mi') \\ = I'_t - Mi'\end{array}\right\} \quad (5)$$

When the outlier degree of the pixel value variation is not greater than the threshold value (S524-N), the second motion search processing unit 30 calculates Axx', Ayy', Axy', Axt', and Ayt' based on the calculated partial differential values I'$_x$, I'$_y$, and I'$_x$, and stores the calculated results in the storage unit 50. Concretely, I'$_x$·I'$_x$ of the present pixel is added to Axx', I'$_y$·I'$_y$ of the present pixel is added to Ayy', I'$_x$·I'$_y$ of the present pixel is added to Axy', I'$_t$·I'$_x$ of the present pixel is added to Axt', and I'$_y$·I'$_x$ of the present pixel is added to Ayt', which are respectively calculated in a previous loop (S530).

The second motion search processing unit 30 determines whether the x, y loop is finished. When the loop is not finished, the process returns to step S518 (S534-N), and, when the loop is finished, the process provides to a subsequent step. In other words, when the second motion search process (2nd ME) of a divided image of divided image number Dn for all pixels is completed (S534-Y), the second motion search processing unit 30 calculates a motion vector MV' (Vx', Vy') using the calculated Axx', Ayy', Axy', Axt', and Ayt', according to the equation (1), (S536), and stores the calculated results in the storage unit 50 (S538).

According to such second motion search process (2nd ME) of the first embodiment, when the threshold value comparison of one of or both of the outlier degree of the error function value and the outlier degree of the pixel value variation is settled, the process proceeds to a subsequent pixel without taking an additional value Σ. With this configuration, a local motion at a certain degree and a change of brightness as noise can be removed and a preferable result as a global motion vector MV can be obtained.

Further, in the second motion search process, by using the result of the first motion search process and parameters in the process, a global motion search process which is robust to a local moving subject or an illumination intensity change can be performed as maintaining high calculation execution efficiency of the LK method. As a method for realizing the second motion search process (including an outlier elimination) without using the result of the first motion search process and the parameters in the process, there may be the following two methods, for example.

A first example is a procedure executing a first motion search process by the LK method, a calculation to eliminate outlier (or an outlier elimination process), and a second LK by the LK method (including an outlier elimination) in order. Here, as explaining based on the first embodiment, the "calculation to eliminate another outlier" is to execute another calculation in all pixels to obtain the distribution average Me' and the standard deviation Se' of the error function value and the distribution average Mi' and the standard deviation Si' of the pixel value variation. This is a process which is required because Ax, Ay, At, and Att are not used in the calculation to obtain the motion vector MV. In this case, since a step of the calculation to eliminate an outlier (or the outlier elimination process) is added, the process load increases. On the other hand, according to the first embodiment, the process load can be reduced by using the value previously, which is calculated in the first motion search process calculation of the LK method, in the second motion search process of the LK method.

Further, a second example is a method to perform a second motion search process of the LK method in a technique described in Non-Patent Document 1. In this case, a first motion search process of the LK method is performed as dividing an image, a calculation is performed as using a result in each divided image, an outlier elimination process is performed, and then a second motion search process of the LK method is performed by using the outlier elimination result. Accordingly, compared to the first embodiment, since a usage of the results of the outlier elimination processes in each divided image is required, the process increases.

As described above, according to the first embodiment, the parameters to be used in the outlier elimination are obtained in the calculation process of the first motion search process (during a calculation to obtain a vector) and stored in the storage unit 50 so that the results can be used in the second motion search process. Since the number of parameters used during the calculation is large in the LK method, the number of additional calculation is small. In the second motion search process, since the parameters in the result process are stored in the storage unit 50 are used and the outlier elimination process can be executed without calculating parameters used in the outlier elimination, the process load as a whole can be reduced.

Further, a general LK method only calculates a motion vector as a result and cannot determine which of the horizontal direction pixel value variation amount, the vertical direction pixel value variation amount, and the time direction pixel value variation amount made a change of the motion vector when calculating. On the other hand, according to the first embodiment, by using the result of the first motion search process and parameters in the process, it is possible to distinguish which parameter made the change of the motion vector. For example, by checking the pixel value variation in the time direction (which is a change of brightness between frames), it is judged that the change of the motion vector is caused by the change of the illumination intensity, and by performing the outlier elimination process according to the judgment result, the robustness for changes of illumination intensity can be increased.

In this example, after calculating the error function value distribution average Me', the standard deviation Se' in addition to the pixel value variation distribution average Mi' and the standard deviation Si', the outlier of the standard deviations is calculated to execute the threshold value comparison and the outlier of the pixel value variations is calculated to execute the threshold value comparison; however, a modification may be made so that, after calculation of each value and the threshold value related to one of the standard deviations and pixel variation values is executed, calculation and threshold comparison of the other are executed. Further, although the accuracy is deteriorated in some degree, a modification may be made so that the calculation of each value and the threshold value comparison of only one of the standard deviation Se and the absolute value D are executed.

The following is variations which can be easily imagined and is included in this disclosed technique. Firstly, a case that the number of repletion of the motion search process is two has been explained; however, it may be also applied when the number of repetition is further increased. Further, not only an estimation of the motion vector MV of only translational displacement element, but also versions applicable to an affine parameter estimation including rotation-enlargement (which will be described later) and a projective transform matrix estimation may be applied.

As described above, according to the first embodiment, a robust global motion search process GME can be performed on local moving object or a change of illumination intensity and the like as maintaining high calculation execution efficiency of the LK method. Further, even though the image segmentation method is used, motion estimation with a high accuracy can be performed since information of a highly reliable pixel is not discarded. Although robustness of motion estimation for the entire image by the LK method cannot be improved since a local motion vector MV is not obtained; however, when the LK method according to the first embodiment is used to execute, motion estimation with high robustness can be executed. By using the LK method, the motion estimation can be executed with a small amount of calculation.

The images on which motion estimation is executed can be recorded and processed based on the motion estimation result obtained by the global motion search process GME of the present embodiment. With this, the global motion search process GME of the present embodiment may be applied to motion estimation in the entire image, a process for position adjustment (for example, signal processing for super-resolution, time axis integration, image blur correction, three-dimensional noise reduction, high dynamic range, panorama stitching, stereo vision matching, follow shot (still photography of moving object), video coding, and the like). It is obvious that changes can be made if appropriate within the scope of the disclosed technique, in addition to these signal processing.

Since image correction information with high accuracy can be calculated, the global motion search process GME of the present embodiment can perform an accurate image process when applied to a super-resolution process, a time axis integration process, and the like. For example, when it is applied to an image blur correction (DIS: Digital Image Stabilizer) in a digital still camera, a digital movie camera, and the like, it can be realized by a lesser computational resource since the global motion search process GME can be performed with only a reduced image of an input image. Alternatively, when a block matching method is used, dedicated hardware is included in general; however, a typical image reduction circuit, general-purpose memory, and processor are enough according to the disclosed technique. A solid imaging device having such effects can be used as an imaging device of a digital camera or a video camera.

[Configuration Example of Imaging Device]

Figure 11:
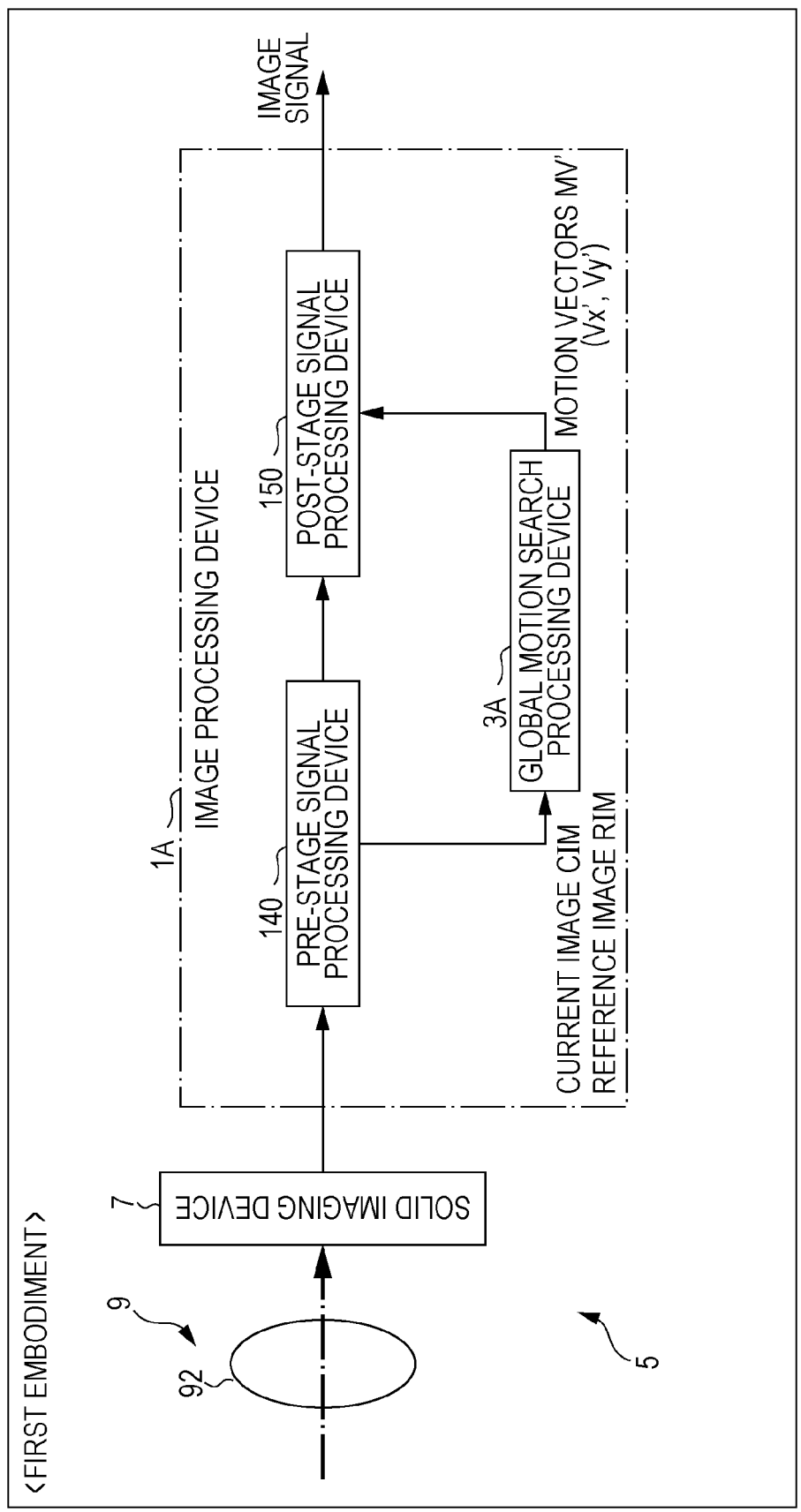
FIG. 11 is a diagram illustrating a configuration example of an imaging device having the image processing device to which the global motion search process is applied.

FIG. 11 is a diagram that illustrates a configuration example of an imaging device having an image processing device to which the global motion search process GME that can execute an image segmentation, select a highly reliable divided image and execute a robust motion estimation with a high accuracy.

There are composed the image processing device 1A that can use, as preprocessing, a motion estimation algorithm by the global motion search processing device 3A of the first embodiment, and an imaging device 5 that includes the algorithm. The imaging device 5 includes a solid imaging device 7 and an optical system 9 in addition to the image processing device 1A which functions as a camera signal processor. The imaging unit 7 includes an imaging unit composed of an imaging device such as a CMOS image sensor, a CCD image sensor, and the like, an optical low-pass filter and a group or color filter, which are provided in an optical incidence side of the imaging unit, a drive control unit which drives the imaging unit and a signal processing unit which processes an imaging signal and outputs as an image signal (which are not illustrated). The optical system 9 introduces incident light to an imaging region of the imaging unit of the solid imaging device 7 (that is, to form an image of a subject image) and has an imaging lens 91 which collects incident light (image light) for example and form an image on the imaging area of the imaging unit (projects).

The image processing device 1A has a function to execute an image blur correction (DIS: Digital Image Stabilizer) by using the motion vector MV' from the global motion search processing device 3A. In addition to the global motion search processing device 3A, a pre-stage signal processing device 140 (including the first signal processing unit) and a post-stage signal processing device 150 (the second signal processing unit). The pre-stage signal processing device 140 processes the image signal obtained by the imaging device 5 and generates a pixel value signal of two systems (equal to or more than two systems) for the global motion search processing device 3A and the post-stage signal processing device 150. As described above, the global motion search processing device 3A calculates a motion vector MV' (motion information of the image) based on the current image CIM and the reference image RIM expressed by the pixel value signal input from the pre-stage signal processing device 140. By using the motion vector MV' input from the global motion search processing device 3A, the post-stage signal processing device 150 performs a signal process (especially, a process related to an image blur correction function) on the pixel value signal input from the pre-stage signal processing device 140 and outputs it as a video signal.

[Example of Application to Electronic Equipment]

The solid imaging device or the imaging device may be applied to various electronic equipment such as a digital camera (electronic still camera), a video camera (digital movie), a game machine, an electronic book, an electronic dictionary, a cell phone, and the like. Further, as an image to be processed, the electronic equipment can have an image read from various memory media or an image obtained via a communication network as an image to be processed in addition to having an image obtained from the solid imaging device or the imaging device as an image to be processed.

For example, there may be a case that the electronic equipment is a television receiver using a display module (a liquid crystal display or an organic electro-luminescence display) as an example of an image display device. The television receiver has a configuration that the display module is placed on a front face of a front panel supported by a base for example and a glass filter is provided on the display face. The television receiver has an imaging device including a solid imaging device, in a display face side, for detecting a moving object and the technique of the imaging device (more specifically, the global motion search processing device 3A) proposed in the first embodiment can be directly applied. Alternatively, there may be a case that that the electronic equipment is a digital camera. The digital camera includes a display module, a control switch, a shutter button, and the like. The digital camera has an imaging device including a solid imaging device and the technique of the imaging device (more specifically, the global motion search processing device 3A) proposed in the first embodiment can be directly applied. Alternatively, there may be a case that the electronic equipment is a video camera. The video camera has an imaging lens for taking an image of a subject in front of the camera body and further a display module, a photographing start/stop switch, and the like are placed. The video camera includes a solid imaging device in a manner that the above described imaging device is applied, and the technique of the imaging device (more specifically, the global motion search processing device 3A) proposed in the first embodiment can be directly applied. Alternatively, there may be a case that the electronic equipment is a cell phone. The cell phone is a type of a flip phone for example and includes an upper chassis, a lower chassis, a display module, a sub-display, a camera, a connecting part (a hinge part), a picture light, and the like. The camera of the cell phone is made in a manner that the imaging device including the solid imaging device is applied and the technique of the imaging device (more specifically, the global motion search processing device 3A) proposed in the first embodiment can be directly applied. Alternatively, there may be a case that the electronic equipment is a laptop computer. The computer has a lower chassis, an upper chassis, a display module, a web camera, a keyboard, and the like. The web camera of the computer is made in a manner that the imaging device including the solid imaging device is applied and the technique of the imaging device (more specifically, the global motion search processing device 3A) proposed in the first embodiment can be directly applied.

[Configuration Example of Image Processing Device]

Figure 12:
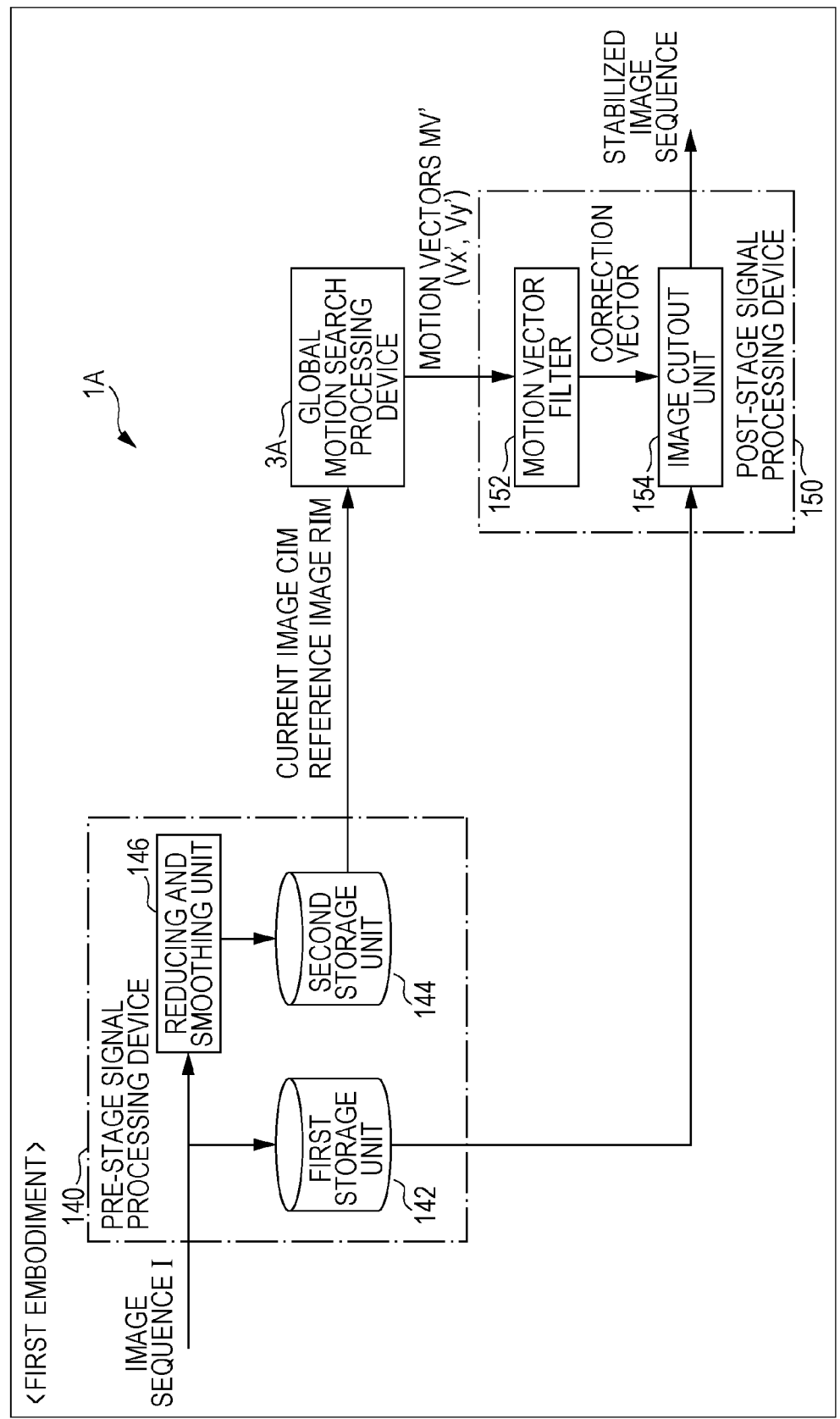
FIG. 12 is a diagram illustrating a detailed configuration example of the image processing device installed in the imaging device.

FIG. 12 is a diagram that explains a detailed configuration example of the image processing device 1A included in the imaging device 5. The pre-stage signal processing device 140 has a first storage unit 142 and a second storage unit 144 which stores an image, and a reducing and smoothing unit 146 (first signal processing unit) which performs a reducing process and a smoothing process. As the first storage unit 142 and the second storage unit 144, a semiconductor memory using a flash memory as a storage medium, a storage device storage device (SSD: Solid State Drive) using a semiconductor memory, a hard disk device, a portable memory medium such as a MO or a DVD-RAM using light, magnetism, and the like can be used. The post-stage signal processing device 150 has a motion vector filter 152 and an image cutout unit 154. The post-stage signal processing device 150 outputs a stabilized image sequence by referring to a result of the motion search process (by the global motion search processing device 3A) on the entire image read from the second storage unit 144 and performing a motion correction process on the image read from the first storage unit 142.

In the first storage unit 142, an image is stored in every input image sequence I (x, y, t). In the second storage unit 144, an image on which a reducing process and a smoothing process are performed by the reducing and smoothing unit 146 is stored. The image stored in the first storage unit 142 is read by the post-stage signal processing device 150 (the image cutout unit 154 thereof). The image (current image CIM and reference image RIM) stored in the second storage unit 144 is read by the global motion search processing device 3A. The calculation amount in the global motion search process GME is reduced by reducing the image, and the motion vector MV' which has resistance to noise and has high accuracy by the smoothing process is used in combination. Since the first storage unit 142 and the second storage unit 144 are provided, a time delay of a path in the motion search process by the global motion search processing device 3A (more specifically, a time delay until a motion vector MV' is output) and image reading from the first storage unit 142 can be synchronized.

The global motion search processing device 3A reads a reduced and smoothed image of a latest input image (current image CIM) and a reduced and smoothed image of an immediately prior image (reference image RIM) from the second storage unit 144 and outputs a motion vector MV' which is obtained as a result of the global motion search process GME to the motion vector filter 152. The motion vector filter 152 converts the current image CIM and the reference image RIM to a correction vector. In a simplest case, the motion vector filter 152 executes an integral filter process integral filter process (simply, input motion vectors MV' is sequentially added) and outputs to the image cutout unit 154. The image cutout unit 154 generates and outputs a stabilized image sequence to which an image blur correction is performed, by reading the latest input image (current image CIM) from the first storage unit 142 and cutting out and enlarging (or simply cutting out) according to the correction vector from the motion vector filter 152. In other words, the post-stage signal processing device 150 outputs a stabilized image sequence to which an image blur correction is performed since the motion vector filter 152 performs a digital filter on the time series of the motion vector MV' to form a correction vector, and the image cutout unit 154 cuts out, or cuts out and enlarges a part which size is at a certain ratio from the original input image according to the position indicated by the correction vector.

Here, the global motion search processing device 3A is explained in a manner to be used as an image blur correction function of the imaging device 5; however, it is not limited to this example. The global motion search processing device 3A can be used for a super-resolution process, a time axis integration process, a high dynamic range process, a panorama stitching process, a stereo vision matching process, and the like.

As an imaging device which performs a super-resolution process, for example, a technique described in Japanese Patent Application Laid-Open No. 2009-076984 can be referred. As an imaging device which performs a high dynamic range process, for example, a technique described in Japanese Patent Application Laid-Open No. 2010-62785 can be referred. As an imaging device which performs a panorama stitching process, for example, a technique described in Japanese Patent Application Laid-Open No. 2009-33392 can be referred. As an imaging device which performs a stereo vision matching process, for example, a technique described in Japanese Patent Application Laid-Open No. 2006-313445 can be referred. The time axis integration process is a technique including a panorama stitching process, a super-resolution process, and a high dynamic range process, and, as an imaging device which performs a time axis integration process, imaging devices which performs each process can be combined, for example.

Second Embodiment

Global Motion Search Processing Device and Image Processing Device

Figure 13:
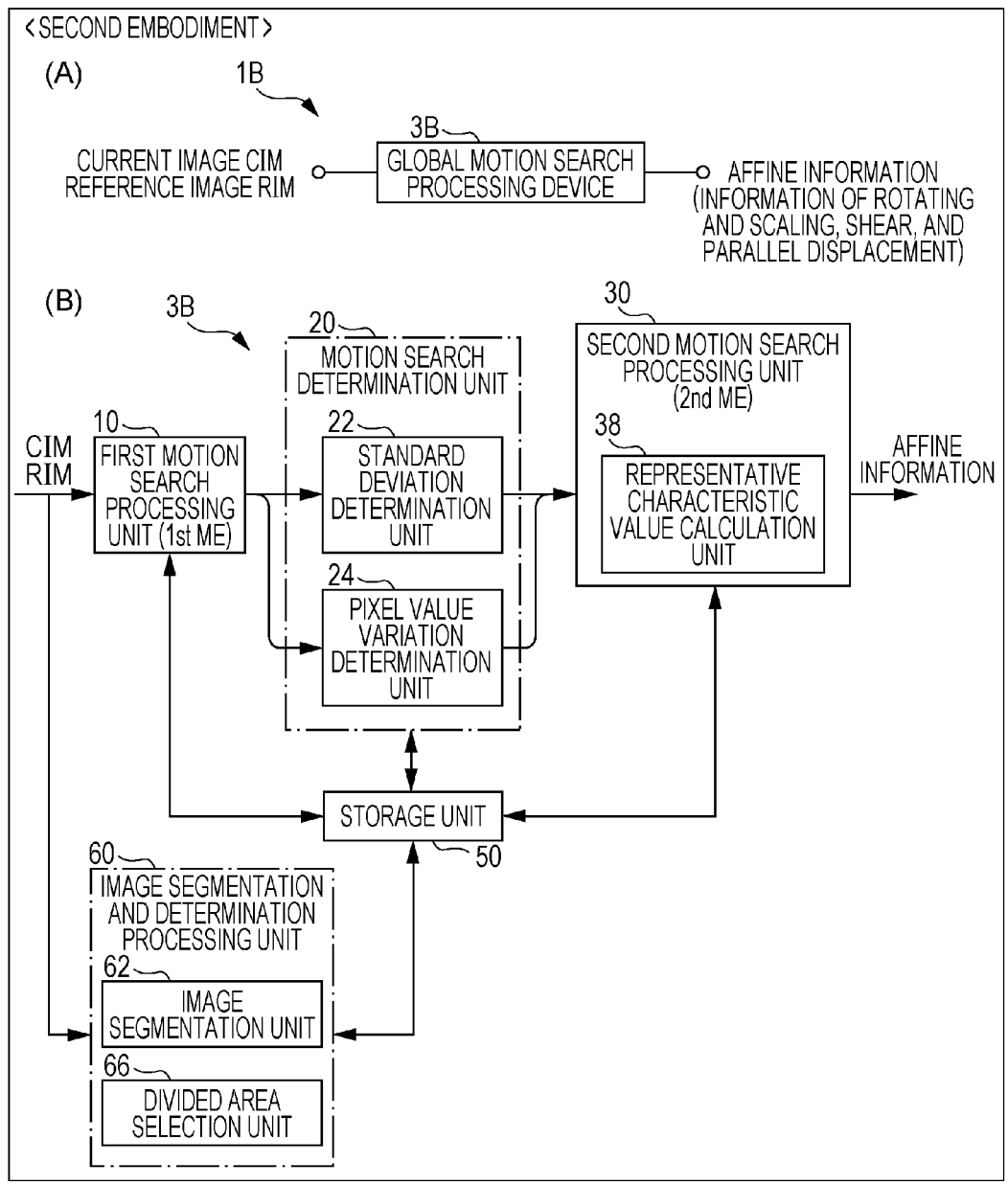
FIGS. 13(A) and 13(B) are diagrams illustrating a global motion search processing device and an image processing device having thereof according to a second embodiment.

FIG. 13 is a diagram that explains a global motion search processing device and an image processing device thereof according to the second embodiment. Different from the above described first embodiment, the second embodiment has a characteristic that rotation between two images, scaling (enlargement and reduction), shear (skew, shear deformation), parallel displacement information can be calculated by outputting affine information in addition to parallel displacement information as motion information of the image.

As illustrated in FIG. 13, an image processing device 1B according to the second embodiment includes a global motion search processing device 3B. The global motion search processing device 3B according to the second embodiment outputs a pair of affine information by importing two images of the current image CIM and the reference image RIM (an image of an immediate prior frame, for example). Although the basic process sequence of the global motion search process GME can be realized similarly to the first embodiment, the difference from the first embodiment is that a pair of pieces of affine information are output but not a pair of motion vectors MV'.

(Entire Outline of Process Procedure)

Figure 14:
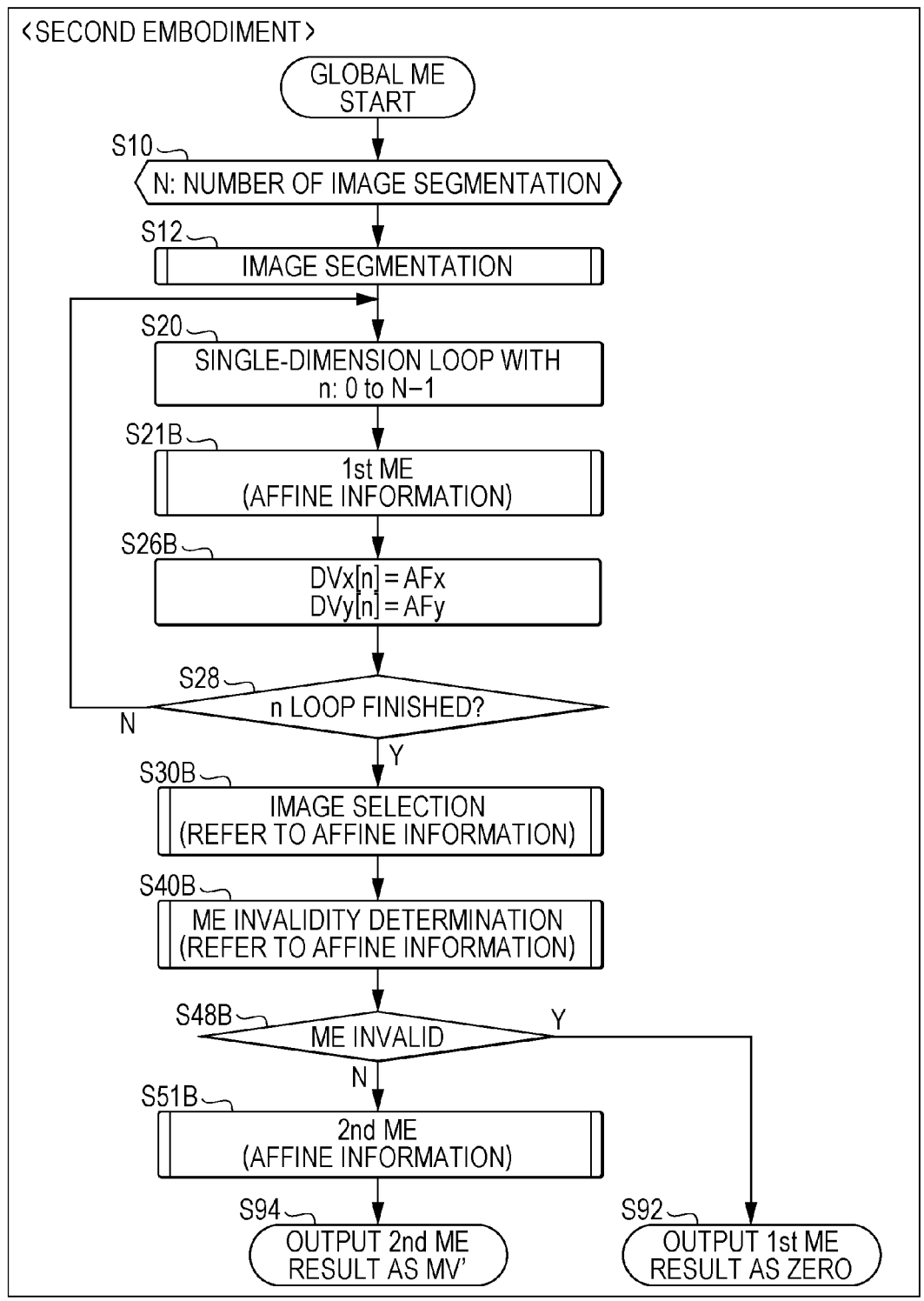
FIG. 14 is a flowchart explaining an entire outline of a procedure of a global motion search process executed by the global motion search processing device according to the second embodiment.

FIG. 14 is a flowchart that explains an entire outline of a global motion search process procedure executed by the global motion search processing device 3B of the second embodiment. The procedure is the same as the procedure of the first embodiment illustrated in FIG. 2, a particular process of the second embodiment is executed in steps S21, S30, and S51. In order to define the difference from the first embodiment, a reference letter B is added to indicate these steps (same as in the drawings).

For example, the first motion search processing unit 10 sets an operator n corresponding to the divided image number to "0" (S20) and performs a motion search process (1st ME) on the n (=0)th divided image using the LK method. As a result of this process, affine information is calculated and stored in the storage unit 50 for every divided areas (S21B).

Here, affine transformation is a formation which is a similarity transformation that enlargement/reduction transformation is added to the parallel displacement and the rotational transformation (Euclid transformation) and allows shear (skew, shear deformation), and it is a formation which can maintain a geometric nature so that dots that are arranged in a straight line in an original graphic are also arranged in a straight line after a formation and parallel lines are also parallel lines after a formation. As known to the public, a matrix element aij (i=1, 2, j=1, 2) of an affine matrix to execute an affine transformation represents a parameter which determines a rotation, enlargement/reduction, and shear and $b_1$ and $b_2$ represent parallel displacement parameters. In other words, parameters of affine transformation to be calculated by the first motion search processing unit 10 are six parameters of $a_{11}$, $a_{12}$, $a_{21}$, $a_{22}$, and $b_1$, $b_2$. $b_1$ and $b_2$ which represent parallel displacement parameters among them correspond to the motion vectors MV (Vx, Vy) of the first embodiment. In the second embodiment, there is a difference that, in addition to the motion vectors MV (Vx, Vy), which are $b_1$ and $b_2$ representing parallel displacement parameters, parameters $a_{11}$, $a_{12}$, $a_{21}$, and $a_{22}$ which determine rotation, enlargement/reduction, and shear are also calculated as affine information and various processes are executed based on the affine information.

For example, the affine parameter, the pixel information, and the coordinate can be expressed as a relationship of the equation (6-1). In the equation (6-1), since the primary expression is established in each pixel, the affine parameters $a_{11}$, $a_{12}$, $a_{21}$, $a_{22}$, $b_1$, and $b_2$ can be calculated from Axx, Ayy, Att, Axy, Axt, Ayt, a coordinate x, and a coordinate y by using a least-square method. Regarding a parameter transformation to determine the rotation, enlargement/reduction, and shear from the affine parameter, there are various methods and, to explain with an example of a QR decomposition, it is expressed as the equation (6-2) for example. Here, for the sake of simplification, the parameter $b_1$ and $b_2$ of the parallel displacement are omitted. $\alpha$ and $\beta$ are enlargement/reduction ratio, $\theta$ is a rotation angle, and $\gamma$ is a shear. When calculating, the equation (6-3) is also used. Incidentally, x and y are coordinates before an affine transformation (which is, the current coordinate), X and Y are coordinates after the affine transformation.

possible to make a selection by calculating a difference of the "parameters to determine the rotation, enlargement/reduction, and shear" from each divided image and sorting. For example, in step S26 of FIG. 2, DVx and DVy are motion vectors of (Vx, Vy: substantially, parameters of a parallel displacement in a divided image) of each divided image, and it is changed to any of the "parameters to determine the rotation, enlargement/reduction, and shear" in each divided image (represented as AFx, AFy) are used (step S26B in FIG. 14). Further, in step S304 of FIG. 7, for K[n], a difference of a motion vector is used, and it is changed to any of the "difference of the parameters to determine the rotation, enlargement/reduction, and shear" in each divided image so that a highly reliable divided image can be selected.

Further, in the second embodiment, the affine information is used in the motion search validity determination process (S40B, S48B) by the motion search determination unit 20. For example, although the determination process related to the absolute value of the pixel value variation is used as it is, the parameter of the parallel displacement of the "parameter to determine the rotation, enlargement/reduction, and shear" are used to obtain an error function. For example, an average of the parameter of the parallel displacement calculated in each divided image and the "parameter to determine the rotation, enlargement/reduction, and shear" is obtained. An affine parameter is calculated from the obtained average value (which is corresponding to the calculation of Vxave and Vyave in the first embodiment). The affine parameters obtained from this average value are defined as $a_{11}$ave, $a_{12}$ave, $a_{21}$ave, $a_{22}$ave, $b_1$ave, and $b_2$ave. Then, in the equation (2), two kinds of Vsum1 and Vsum2 are obtained as substitute for Vsum. Here, it can be expressed as: Vsum1=F ($a_{11}$ave, $a_{12}$ave, $a_{21}$ave, $a_{22}$ave, $b_1$ave, $b_2$ave, x, y, $I_x$, $I_y$, and $I_t$), and Vsum2=F ($a_{11}$ave, $a_{12}$ave, $a_{21}$ave, $a_{22}$ave, $b_1$ave, $b_2$ave, x, y, $I_x$, $I_y$, and $I_t$). The both of them are function expressions that product-sum operation is executed for the all pixels, and the difference between them is that, in Vsum2, the value of a square of the product-sum operation element of Vsum1 is added to all pixels. Further, in the equation (2), the function expression of Me is expressed as Me=F (Vsum1, W, H) and the function expression of Se is expressed as Se=F (Vsum2, Me, W, H).

The second motion search processing unit 30 calculates affine information as a result of the second motion search process (2nd ME) (S51B). Here, in the second motion search process (2nd ME), to determine a specific pixel which is not included to the additional calculation, the second motion search processing unit 30 uses the affine information and the calculation result in the process as output results of the first

[Mathematical Formula 6]

$$\begin{aligned}
x \cdot I_x \cdot a_{11} + y \cdot I_x \cdot a_{12} + I_x \cdot b_1 + x \cdot I_y \cdot a_{21} + y \cdot I_y \cdot a_{22} + I_y \cdot b_2 - x \cdot I_x - y \cdot I_y + I_t = 0 \quad &(6\text{-}1) \\
\begin{bmatrix} a_{11} & a_{12} \\ a_{21} & a_{22} \end{bmatrix} = \begin{bmatrix} \cos\theta & -\sin\theta \\ \sin\theta & \cos\theta \end{bmatrix} \begin{bmatrix} \alpha & 0 \\ 0 & \beta \end{bmatrix} \begin{bmatrix} 1 & \gamma \\ 0 & 1 \end{bmatrix} \quad &(6\text{-}2) \\
I_x \cdot \Delta x + I_y \cdot \Delta y + I_t = 0 & \\
a_{11} \cdot x + a_{12} \cdot y + b_1 = X & \\
a_{21} \cdot x + a_{22} \cdot y + b_2 = Y & \quad (6\text{-}3) \\
\Delta x = X - x & \\
\Delta y = Y - y &
\end{aligned} \quad (6)$$

The divided image selection unit 66 of the image segmentation and selection processing unit 60 selects a highly reliable divided area based on information of the rotation, scaling, shear, parallel displacement of the affine information in a process for selecting a highly reliable divided image (S30B). Here, similarly to the parallel displacement parameter, it is motion search process (1st ME) and obtains the error function value distribution average Ma', the standard deviation Sa', the pixel value variation distribution average Mb', and the standard deviation Sb' according to the equation (7). The distribution average Ma' is an average of the distribution of the error function values in the selected divided image (selected image) of the LK method. The standard deviation Sa' is a standard deviation of the distribution of the error function values in the selected divided image of the LK method. The distribution average Mb' is an average of the distribution of the pixel value variation in the selected divided image in the time direction. The Sb' is a standard deviation of the distribution of the pixel value variation in the selected divided image in the time direction.

Here, in order to calculate Ma' and Sa', a representative value in each affine parameter, similarly to obtaining DVxxave and DVyxave according to the first embodiment. A method to obtain the representative value, an average of the parameter of the parallel displacement and the "parameter to determine the rotation, enlargement/reduction, and shear" in the selected divided image can be obtained. The affine parameter is calculated from the obtained average value. It becomes a characteristic value when the calculated affine parameter is input. The parameters of N, M, Dn[0 to M−1], and parallel displacement and the "parameter to determine the rotation, enlargement/reduction, and shear" can be used to calculate, and the calculated affine parameters are set as $Da_{11}$ave, $Da_{12}$ave, $Da_{21}$ave, $Da_{22}$ave, $Db_1$ave, and $Db_2$ave. Incidentally, DVsum1 and DVsum2 are both function expressions that execute the product-sum operation for all pixels, and the difference between them is that, in DVsum2, a value of a square of the product-sum operation elements of DVsum1 is added to all pixels. The distribution average Mb' is substantially the same as the distribution average Mi', and the standard deviation Sb' is substantially the same as the standard deviation Si'.

[Mathematical Formula 7]

$$\begin{aligned}
DVsum1 &= F'(Da_{11}ave, D_{12}ave, Da_{21}ave, Da_{22}ave, Db_1ave, Db_{2ave}, xy, I_{x'}, I_{y'}, I_t) \\
DVsum2 &= F'(Da_{11}ave, D_{12}ave, Da_{21}ave, Da_{22}ave, Db_1ave, Db_{2ave}, xy, I_{x'}, I_{y'}, I_t) \\
Ma' &= F(DVsum1, W, H, M, N) \\
Sa' &= F(DVsum2, Me', W, H, M, N) \\
Mb' &= F(At, W, H, M, N) \\
Sb' &= F(Att, Mb', W, H, M, N)
\end{aligned} \quad (7)$$

Then, an outlier degree is calculated from the error function value and/or the pixel value variation in each pixel and a process to compare it with the predetermined threshold parameter (a threshold value comparison) is executed. Although it is not illustrated, a modification to FIG. 10 ("B" is added at the end of the step numbers) will be explained as follows. For example, the second motion search processing unit 30 calculates an outlier degree related to the error function value in each pixel with respect to the error function value distribution average Ma' in the LK method according to the equation (8) (S514B). The second motion search processing unit 30 executes a threshold value comparison of the outlier degree related to the error function value by using the predetermined threshold value (S522B). As the "predetermined threshold value," a standard deviation Sa' is used for example.

When the outlier degree related to the error function value is greater than the threshold value, the process proceeds to the next pixel without taking the additional value Σ (S522B-Y). When the outlier degree related to the error function value is not greater than the threshold value (S522B-N), the second motion search processing unit 30 calculates an outlier degree related to the pixel value variation in each pixel with respect to the distribution average Mb' of the error function value in the LK method according to the equation (9) (substantially, the same as the equation (5)). The second motion search processing unit 30 executes a threshold value comparison of the outlier degree related to the pixel value variation by using the predetermined threshold value (S524B). As the "predetermined threshold value," the standard deviation Sb' is used for example. When the outlier degree is greater than the threshold value related to the pixel value variation, the process proceeds to the next step without taking the additional value Σ (S524B-Y).

[Mathematical Formula 9]

$$\begin{aligned}
\text{Outlier degree} &= F(I'_t, Mb') \\
&= I'_t - Mb'
\end{aligned} \quad (9)$$

In the first embodiment, the process is simple since the output result is only parallel displacement information, but advanced displacement information other than line displacement information cannot be used. In contrast, in the second embodiment, since data that executes the process is affine information, the process is complicated; however, information of rotation, scaling, shear, parallel displacement between two images can be calculated and further advanced displacement information can be used. Thus, when the global motion search processing device 3B of the second embodiment is applied to the image processing device 1 or the imaging device 5, correction of rotation, scaling, and shear can be executed in addition to correction of the parallel displacement, and a further stabilized image sequence can be output.

[Mathematical Formula 8]

$$\begin{aligned}
\text{Outlier degree} &= F(Da_{11}ave, Da_{12}ave, Da_{21}ave, Da_{22}ave, Db_1ave, Db_2ave, Ma', x, y, I_{x'}, I_{y'}, I_t) \\
&= x \cdot I_x \cdot Da_{11}ave + y \cdot I_x \cdot Da_{12}ave + I_x \cdot Db_1ave + x \cdot I_y \cdot Da_{21}ave + \\
&\quad y \cdot I_y \cdot Da_{22}ave + I_y \cdot Db_2ave - x \cdot I_x - y \cdot I_y + I_t - Ma'
\end{aligned} \quad (8)$$

Third Embodiment

Global Motion Search Processing Device and Image Processing Device

Figure 15:
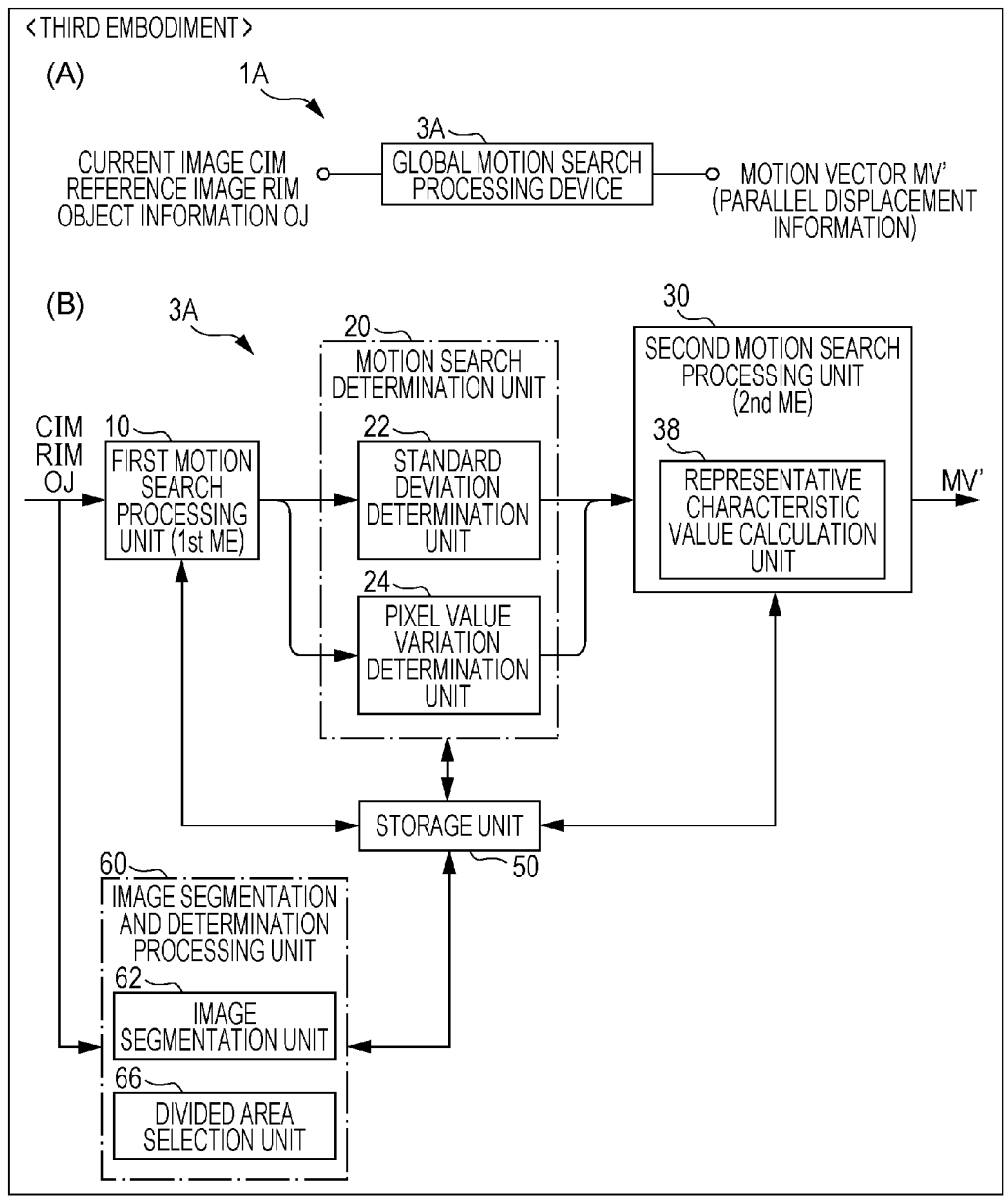
FIGS. 15(A) and 15(B) are diagrams illustrating a global motion search processing device and an image processing device having thereof according to a third embodiment.

FIG. 15 is a diagram that explains a third embodiment of a global motion search processing device and an image processing device including the global motion search processing device. The third embodiment has a characteristic that object information OJ in the image is imported in addition to two images (current image CIM and reference image RIM) and the imported object information OJ is used in an image segmentation. Here, the object information OJ is information of a coordinate (central coordinate, for example), size, and the like of an object in the image as a result of moving object detection and the like. Hereinafter, a modification of the first embodiment will be explained; however, the same modification can be made to the second embodiment.

As illustrated in FIG. 15, an image processing device 1C of the third embodiment has a global motion search processing device 3C. The global motion search processing device 3C of the third embodiment imports two images of a current image CIM and a reference image RIM (an image of an immediate prior frame, for example) and object information OJ, and outputs a pair of motion vectors MV'. The basic process sequence of the global motion search process GME can be realized similarly to the first embodiment; however, there is a characteristic of dividing into a divided image with no motion (or a few motion) and a divided image with motion, referring to the object information OJ. An image segmentation unit 62 stores heights and widths of the respective divided images in the storage unit 50, similarly to the coordinate information of divided images. The first motion search processing unit 10 executes a first motion search process (1st ME) using the coordinate information, width and height of the stored divided image. Since the image segmentation is executed using the object information OJ, an image with a local motion and an image without a local motion can be divided. In other words, the image segmentation according to the first embodiment or the second embodiment is a method that the image is divided evenly; however, the image segmentation of the third embodiment is a method that an image is divided unevenly by using the object information OJ.

[Image Segmentation Process]

Figure 16:
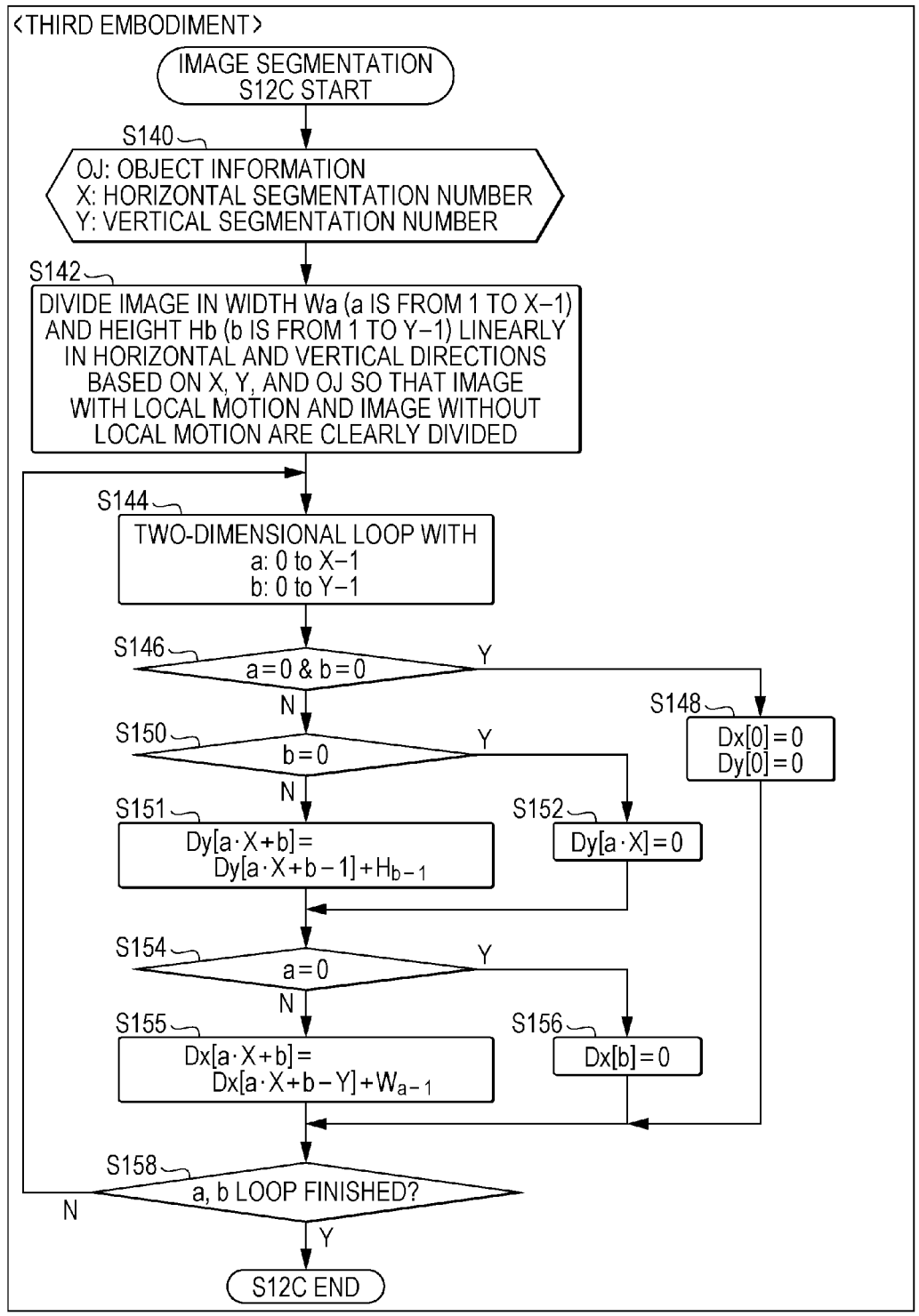
FIG. 16 is a flowchart explaining a procedure of an image segmentation process (step S12C) by an image segmentation unit.
Figure 17:
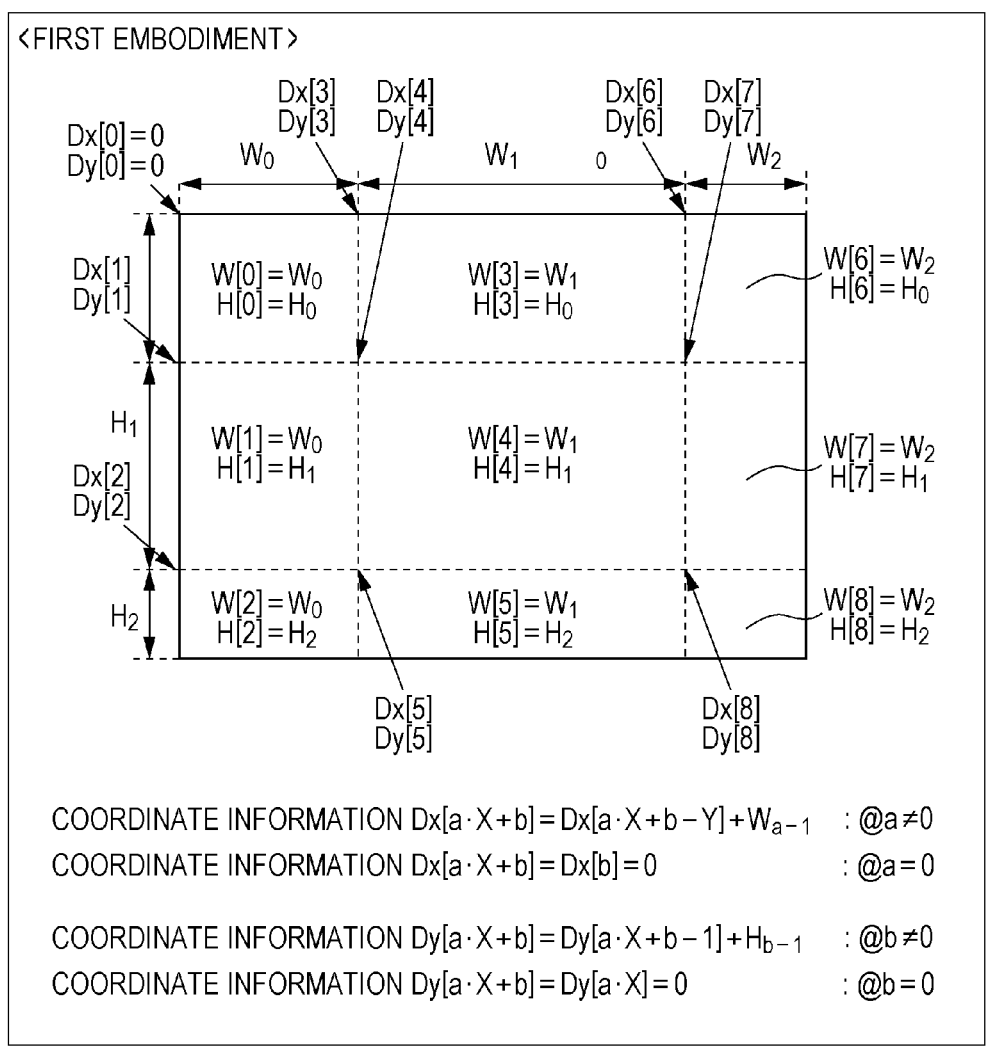
FIG. 17 is a diagram illustrating a relationship between a divided image divided in an image segmentation process procedure illustrated in FIG. 16 and coordinate information specifying a position of the divided image.

FIGS. 16 and 17 are diagrams explaining the image segmentation process of the third embodiment by the image segmentation unit 62 of the image segmentation and selection processing unit 60. Here, FIG. 16 is a flowchart that explains a procedure of the image segmentation process (step S12C) by the image segmentation unit 62. FIG. 17 is a diagram that illustrates a relationship between a divided image divided by the image segmentation process procedure illustrated in FIG. 16 and coordinate information specifying a position of the divided image.

Here, a horizontal direction coordinate information Dx[x·X+y] and a vertical direction coordinate information Dy[x·X+y], which specify a position of the divided image, are explained as coordinate information at a left top point of each divided image. It is obvious that this is not a limitation and another calculation formula of a left bottom point, central point, or the like may be used. The procedure is the same as the procedure of the first embodiment illustrated in FIG. 3; however, there is a difference that the image is unevenly divided using the object information OJ. Hereinafter, in order to define a difference from the first embodiment, detail of the image segmentation process (step S12C) is illustrated by adding step numbers using 140s and subsequent numbers (same as in the diagram).

The image segmentation unit 62 firstly accepts an image to be processed (current image CIM), a reference image RIM (an image of a frame immediately prior to the image to be processed), object information OJ (a central coordinate, a size, and the like) of a focused subject as a result of the moving object detection and the like, and accepts setting of a horizontal segmentation number X and a vertical segmentation number Y (S140). By using the object information OJ according to the set horizontal segmentation number X and vertical segmentation number Y, the image segmentation unit 62 divides the image with straight lines in the horizontal direction and in the vertical direction as setting the width Wx (x is from 1 to X−1) and the height Hy (y is from 1 to Y−1) so as to clearly divide the image with a local motion and the image without a local motion (see FIG. 17), and store the information (Wx) of width W'[n] and the information (Hy) of height H'[n] of the respective divided images (divided image number n) in the storage unit 50 (S142).

Next, the image segmentation unit 62 stores coordinate information which specifies positions of the respective divided images in the storage unit 50. Concretely, the image segmentation unit 62 starts a two-dimensional loop for calculating position information of the divided image as setting the array change element a corresponding to the horizontal segmentation number X to be from 0 to "X−1" and the array change element b corresponding to the vertical segmentation number Y to be from 0 to "Y−1," and storing it in the storage unit 50 (S144). When the process starts, the image segmentation unit 62 firstly sets the array change element a and array change element b to be "0," and sets the horizontal direction coordinate information Dx[0] and the vertical direction coordinate information Dy[0], which specify the position of the "a·X+b"=0th divided image, to be "0" (S146-Y, S148). In other words, the information specifying the position of the 0th divided image is the left top point of the entire image.

Next, the image segmentation unit 62 respectively calculates the vertical direction coordinate information Dy[a·X+b] and the horizontal direction coordinate information Dx[a·X+b], which specify the position (the left top point) of "a·X+b"th divided image by fixing one of the array change element a and the array change element b and incrementing the other by "1". For example, when b≠0 (S150-N), the coordinate information Dy[a·X+b] is set to be Dy[a·X+b−1]+Hy−1 (S151), and when b=0 (S150-Y), the coordinate information Dy[a·X+b] is set to be Dy[a−X]=0 (S152). When a≠0 (S154-N), the coordinate information Dx[a·X+b] is set to be Dx[a·X+b−Y]+Wx−1 (S155), and when a=0 (S154-Y), the coordinate information Dx[a·X+b] is set to be Dx[b]=0 (S156). The image segmentation unit 62 stores the obtained coordinate information Dx[a·X+b] and the coordinate information Dy[a·X+b] in the storage unit 50 to use in the first motion search process (1st ME). The image segmentation unit 62 determines whether the a, b loop is finished and the process returns to step S144 when the loop is not finished (S158-N), and proceeds to the next step when the loop is finished.

In step S216 illustrated in FIG. 5, the first motion search processing unit 10 starts a two-dimensional loop for calculating a pixel value variation amount (partial differential value) in the present pixel in the horizontal, vertical and time direction of image sequence I(x, y, t) as setting the coordinate x of the divided image (divided image number n) from Dx[n] to Dx[n]+W'[n]−2 and the coordinate y from Dy[n] to Dy[n]+H'[n]−2 and stores it in the storage unit 50. The subsequent processes are the same as those in the first embodiment.

According to such third embodiment, since the image segmentation is executed using the information such as moving object detection, this allows to divide into an image with a local motion and an image with no motion (or a fewer motion). When selecting a divided image, a divided image with no local motion can be selected so that an outlier elimination with higher accuracy compared to the first embodiment can be executed. As a result, an aciculate motion search process can be executed. In contrast, in the first embodiment, since an image segmentation is executed with fixed width and height, it is assumed that a moving object exists across plural areas and the accuracy of the outlier elimination is less than that of the third embodiment.

Fourth Embodiment

Global Motion Search Processing Device and Image Processing Device

Figure 18:
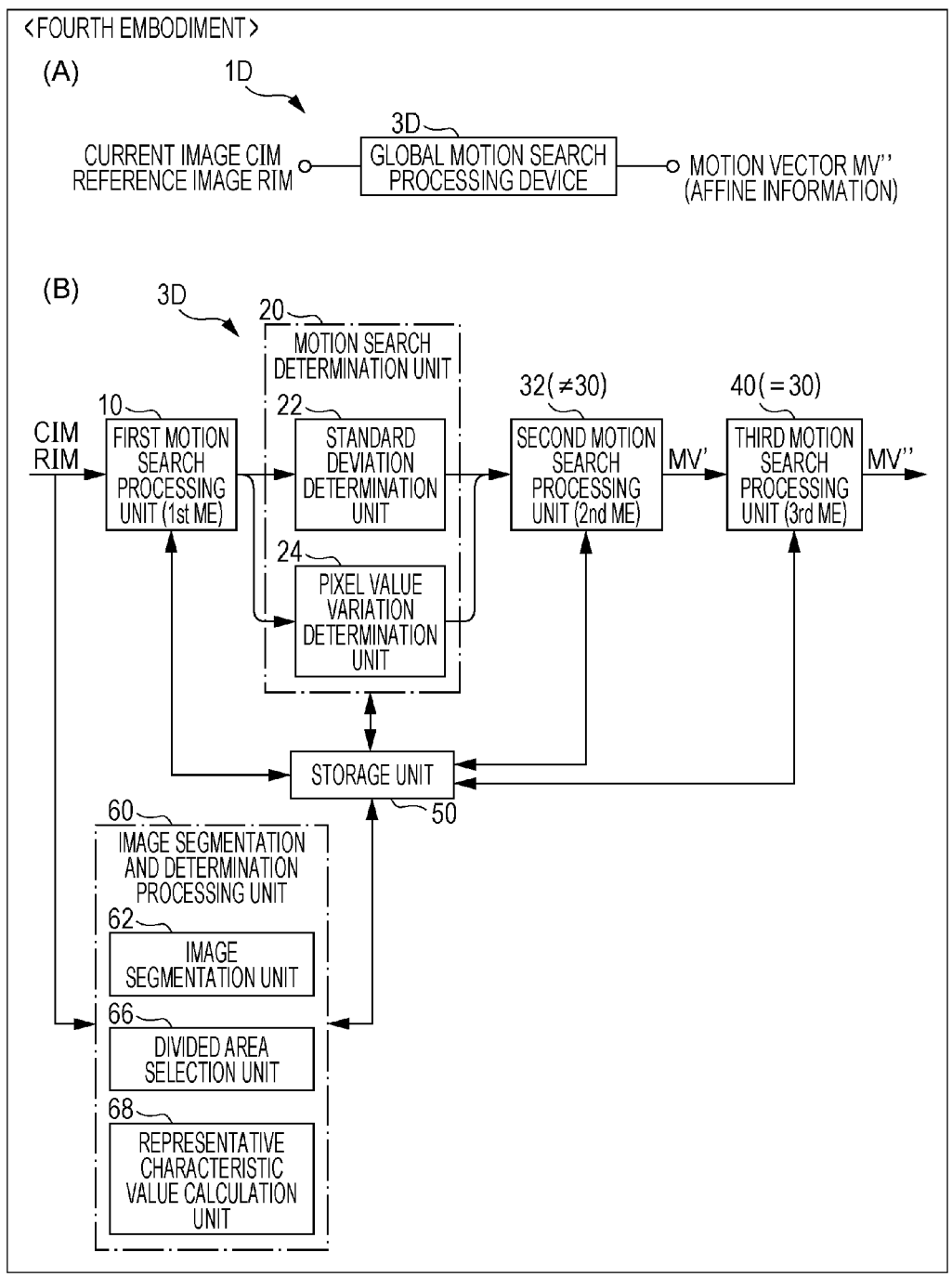
FIGS. 18(A) and 18(B) are diagrams illustrating a global motion search processing device and an image processing device having thereof according to a fourth embodiment.

FIG. 18 is a diagram that explains a forth embodiment of global motion search processing device and an image processing device having the diagram explaining a global motion search processing device. FIG. 18(A) illustrates an image processing device 1D having a global motion search processing device 3D of the fourth embodiment, and FIG. 18(B) is a block diagram illustrating a basic configuration of the global motion search processing device 3D of the fourth embodiment. Here, an example is illustrated in which the image segmentation and selection processing unit 60 includes a representative characteristic value calculation unit 68 (representative motion vector calculation unit) which calculates a representative characteristic value related to the motion search process based on motion search process information of the selected divided images by the first motion search processing unit 10. The representative characteristic value calculation unit 68 calculates a representative characteristic value by adding the motion vector of each selected divided image and dividing with the selection number (that is, obtaining an average), for example. When the selected divided image is one, the motion vector of the single divided image becomes the representative characteristic value and, when the selected divided images are more than one, the average value of the motion vectors of the respective divided images becomes the representative characteristic value.

The fourth embodiment has characteristics that a new second motion search process (2nd ME) that an outlier elimination is executed on the divided image again after the first motion search process (1st ME), and then, a third motion search process (3rd ME) that an outlier elimination is executed on the entire image is executed, similarly to the second motion search process (2nd ME) of the first embodiment. Since the outlier elimination is executed twice, the accuracy of the global motion search process is improved, compared to the first embodiment. Further, there is another characteristic that, between the second motion search process and the third motion search process, a highly reliable divided image is selected again by using a result of the second motion search process (2nd ME) of each divided image. Hereinafter, it is explained using a modification of the first embodiment; however, the same modification can be applied to the second embodiment.

As illustrated in FIG. 18(B), the global motion search processing device 3D of the fourth embodiment replaces the second motion search processing unit 30 with the second motion search processing unit 32 (corresponding to the third motion search processing unit) and includes a third motion search processing unit 40 (3rd ME) (corresponding to the second motion search processing unit) which outputs a pair of motion vectors MV (specifically, motion vectors MV" as a result of the third motion search process (3rd ME)) in a later step of the second motion search processing unit 32 (2nd ME). The third motion search processing unit 40 may be the same as the second motion search processing unit 30 of the first embodiment, but the second motion search processing unit 32 is slightly different from the second motion search processing unit 30. The double quotation mark (") is added to distinguish the third calculation from the first and second calculations; however, a third LK method is simply executed on the same pair of images and I"=I'=I in actual. On the other hand, since it is determined whether to add the second and third calculation values, the values are different from that of the first calculation. In the following explanation of the process, the double quotation mark (") is also added to the third image sequence I (x, y, t) and each calculation value.

Different from the second motion search processing unit 30 of the first embodiment, the second motion search processing unit 32 executes the new second motion search process (2nd ME) for the divided image by using the first motion search process (1st ME) and various type of additional values Σ. In the "new second motion search process (2nd ME)," determination for each pixel whether to include is basically executed similarly to the second motion search process (2nd ME) of the first embodiment; however, a motion search process is executed for each divided image, not for the entire image, different from the first embodiment. The image segmentation and selection processing unit 60 (the divided image selection unit 66 thereof) selects a highly reliable divided image by using the result of the first motion search process (1st ME) for each divided image, and also selects a highly reliable divided image by using the result of the second motion search process (2nd ME) on each divided image. The third motion search processing unit 40 executes a process same as the second motion search processing unit 30 of the first embodiment, as a third motion search process (3rd ME).

[Entire Outline of Process Procedure]

Figure 19:
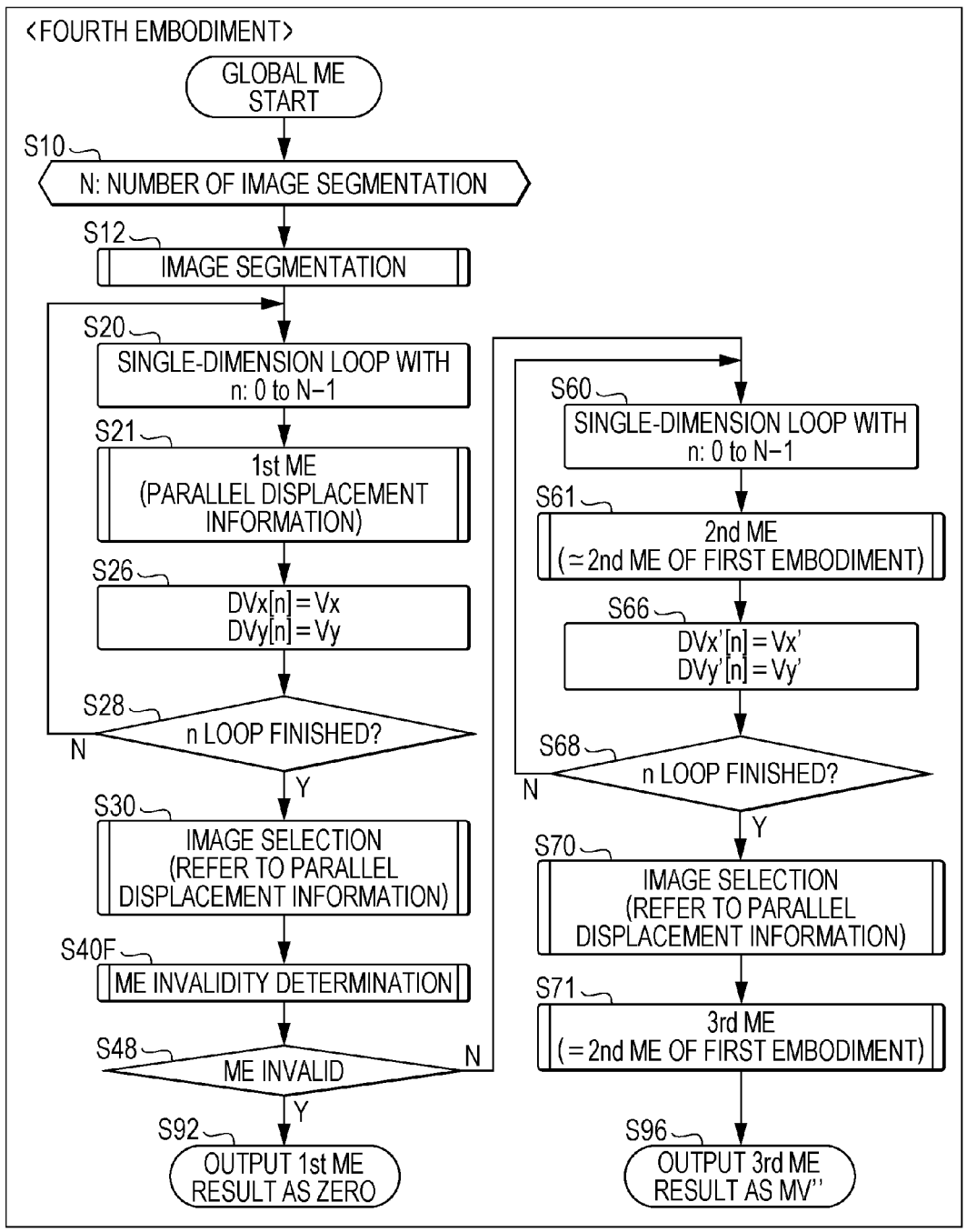
FIG. 19 is a flowchart explaining an entire configuration of a procedure of a global motion search process executed by the global motion search processing device according to the fourth embodiment.

FIG. 19 is a flowchart that explains an entire outline of the global motion search process procedure executed by the global motion search processing device 3D of the fourth embodiment. The process to step S48 is the same as that of the first embodiment.

When the motion search determination unit 20 determines that the motion search process by the first motion search processing unit 10 is valid (S48-N), accordingly, the second motion search processing unit 32 executes the second motion search process (2nd ME) using the LK method on each divided image by using the first motion search process result and the calculation result in process. Concretely, the second motion search processing unit 32 firstly sets the operator n corresponding to the divided image number to "0" (S60) and executes the motion search process (2nd ME) using the LK method on the n (=0)-th divided image (S61). The details thereof are the same as the second motion search process (2nd ME) of the first embodiment except for that the process is executed for each divided image not for the entire image. For example, in FIG. 10 illustrates the details of the second motion search process (2nd ME) according to the first embodiment, in step S510, information of the width W' or W'[n]) and the height H' or H'[n] of the divided image are obtained. In step S518, the two-dimensional loop is started to calculate the pixel value variation amount (partial differential value) in the present pixel in the horizontal, vertical, and time directions of the image sequence I (x, y, t) and stores it in the storage unit 50, as setting the coordinate x of the selected divided image (divided image number Dn) from 0 to W'−2 or W'[n]−2, and the coordinate y from 0 to H'−2 or H'[n]−2.

The second motion search processing unit 32 stores the motion vector MV' (Vx', Vy') which is the result of the process executed with the "n (=0)" in the storage unit 50 as the motion vector MDV' (DVx'[n], DVy'[n]) (S26). Then, the second motion search processing unit 32 repeats the same process as incrementing the operator n by "1" until the process with the operator n=N−1 is completed (S60, S68-N).

When the second motion search processing unit 32 completes the second motion search process (2nd ME) for all divided images (S68-Y), the divided image selection unit 66 of the image segmentation and selection processing unit 60 selects a highly reliable divided image similarly to step 30, using the result of the motion search process (2nd ME) of each divided image (S70).

After that, the third motion search processing unit 40 executes the third motion search process for all entire image by using the second motion search process result and calculation result in the process of the selected divided image, similarly to the second motion search process (2nd ME) of the first embodiment (S71). The third motion search processing unit 40 outputs the motion vector MV'' (Vx'', Vy'') which is a result of the third motion search process (3rd ME) as a result (motion vector MV) of the global motion search process GME, and ends the entire process (S96).

According to such fourth embodiment, since the motion estimation (3rd ME), which an outlier elimination is executed for the entire image, is executed by using the result of the motion estimation (2nd ME), which an outlier elimination is executed for each divided image, the outlier elimination can be executed by using the result of the motion estimation, which is more accurate than that of the first embodiment so that an accurate global motion search process can be executed. In the first embodiment, the second motion search process also executes the motion search process including the outlier elimination and a motion search process with high accuracy can be executed compared to conventional techniques; however, when the motion search process including an outlier elimination is repeated, outlier values can be further eliminated and an motion search process with higher accuracy can be realized even though the process amount increases. Here, considering a later described fifth embodiment, when the motion search process (including an outlier elimination) is repeated, both of the motion search process for each divided image and the motion search process for the entire image may be applied. Further, in the fourth embodiment, the motion search process for each divided image and the image selection are executed twice, a value for the outlier elimination with higher accuracy can be calculated even though the process amount increases, compared to the later described fifth embodiment. Especially, in the second motion search process (2nd ME), it is effective when the accuracy of the outlier elimination is not good enough.

Fifth Embodiment

Global Motion Search Processing Device and Image Processing Device

Figure 20:
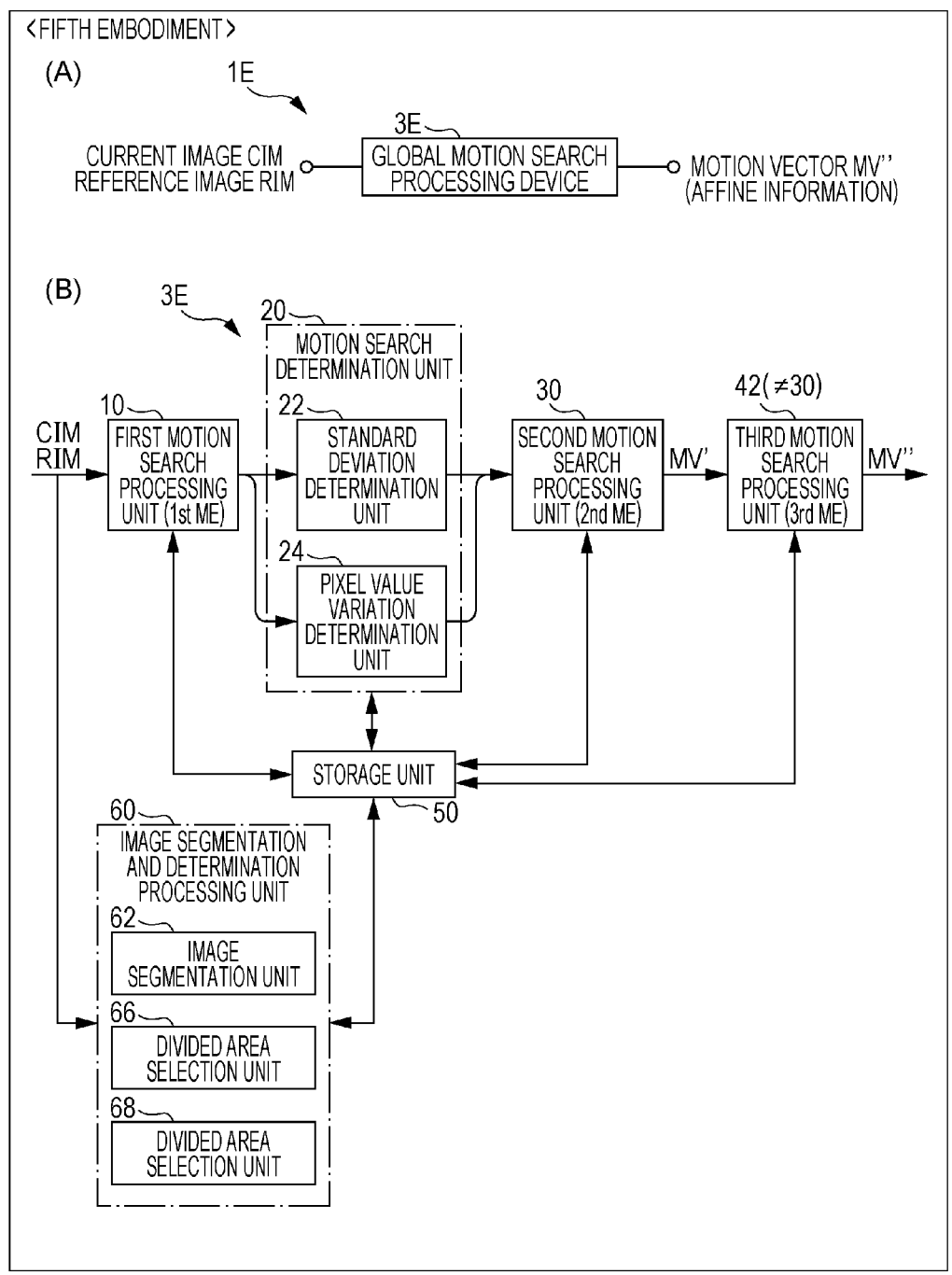
FIGS. 20(A) and 20(B) are diagrams illustrating a global motion search processing device and an image processing device having thereof according to a fifth embodiment.

FIG. 20 is a diagram that explains a fifth embodiment of a global motion search processing device and an image processing device including the global motion search processing device. Here, FIG. 20(A) illustrates an image processing device 1E including a global motion search processing device 3E of the fifth embodiment, and FIG. 20(B) is a block diagram illustrating a basic configuration of a global motion search processing device 3D of the fifth embodiment. Here, it is explained with an example that the image segmentation and selection processing unit 60 includes a representative characteristic value calculation unit 68 (representative motion vector calculation unit) which calculates a representative characteristic value related to the motion search process based on the motion search processes for selected plural divided image by the first motion search processing unit 10.

The fifth embodiment has a characteristic that a second motion search process (2nd ME) in which an outlier elimination is executed for the entire image after a first motion search process (1st ME), and further a third motion search process (3rd ME) in which an outlier elimination is executed for the entire image is executed in the same manner as the second motion search process (2nd ME). Since the outlier elimination is executed twice similarly to the fourth embodiment, the accuracy to the global motion search process becomes better than that of the first embodiment. The fifth embodiment further has a characteristic that storing motion search process result information for each divided image and selecting an image are not executed in the second motion search process and in processes before and after the second motion search process, different from the fourth embodiment. Although it will be explained as a modification of the first embodiment, the same modification can be applied to the second embodiment. Hereinafter, a modification of the first embodiment will be explained; however, the same modification can be made to the second embodiment.

As illustrated in FIG. 20(B), the global motion search processing device 3E of the fifth embodiment includes a third motion search processing unit 42 (3rd ME) (third motion search processing unit) which outputs a pair of motion vectors MV (specifically, the motion vectors MV'' of result of the third motion search process (3rd ME)) in a later step of the second motion search processing unit 30 (2nd ME). The double quotation mark ('') is added to distinguish the third calculation from the first and second calculations; however, a third LK method is simply executed on the same pair of images and I''=I'=I in actual. On the other hand, since it is determined whether to add the second and third calculation values, the values are different from that of the first calculation. In the following explanation of the process, the double quotation mark ('') is also added to the third image sequence I (x, y, t) and each calculation value.

Different from the third motion search processing unit 40 of the fourth embodiment, the third motion search processing unit 42 executes a motion search process for the entire image as following the process of the second motion search processing unit 30 of the first embodiment, while determining whether each pixel is a highly reliable pixel based on information of the motion search process for the entire image by the second motion search processing unit 30.

(Motion Search Validity Determination Process)

Figure 21:
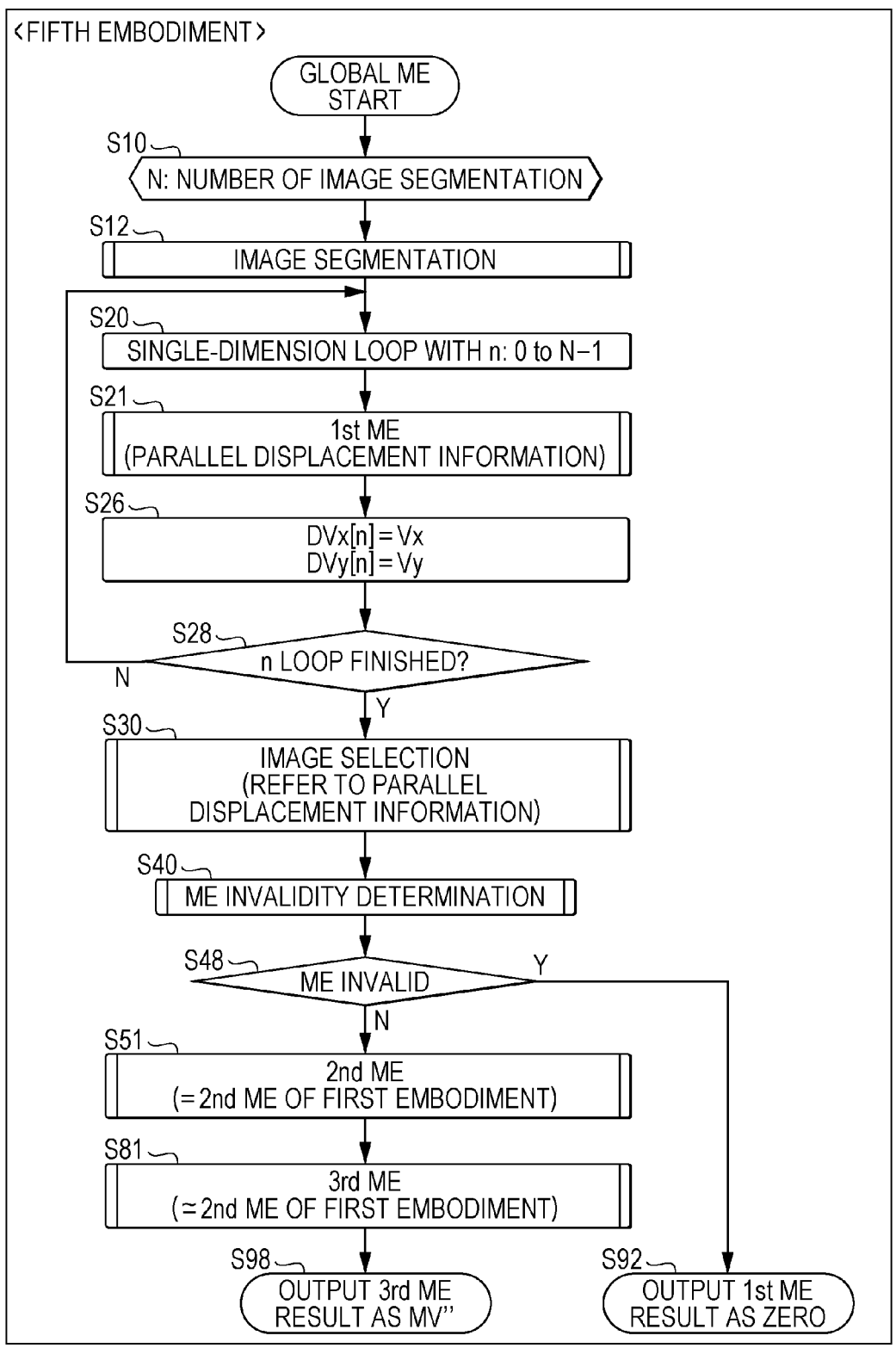
FIG. 21 is a flowchart explaining an entire configuration of a procedure of a global motion search process executed by the global motion search processing device according to the fifth embodiment.

FIG. 21 is a flowchart that explains an entire outline of the global motion search process procedure which is executed by the global motion search processing device 3E of the fifth embodiment. The configuration of the global motion search processing device 3E and the image processing device 1E including the global motion search processing device 3E according to the fifth embodiment is the same as that of the fourth embodiment.

The processes up to step S51 are the same as those in the first embodiment. When the second motion search process (2nd ME) by the second motion search processing unit 30 is completed, the third motion search processing unit 42 executes the third motion search process (3rd ME) using the LK method for the entire image again (S81). Here, in the third motion search process (3rd ME) according to the fifth embodiment, in order to determine whether to include a particular pixel to calculation, a pair of motion vector MV (more specifically, motion vectors MV" as a result of third motion search process (3rd ME)) are output by executing a motion search process including an outlier elimination based on the result of the second motion search process executed for the entire image and the calculation results in the process (S98).

The third motion search process (3rd ME) according to the fifth embodiment is basically the same as the second motion search process (2nd ME) of the first embodiment. The difference is that, when the error function value distribution average and standard deviation and the pixel value variation distribution average and standard deviation are obtained, pixels of not "selected divided image" but "the entire image" are used. For example, in the second motion search process (2nd ME) of the first embodiment illustrated in FIG. 10, in step S512, accumulated values of the motion vector MV' (Vx', Vy'), and Axx' ($=\Sigma(I'_x)^2$), Ayy' ($=\Sigma(I'_y)^2$), Axy' ($=\Sigma(I'_x \cdot I'_y)$), Axt' ($=\Sigma(I'_x \cdot I'_t)$), Ayt' ($=\Sigma(I'_y \cdot I'_t)$), Ax' ($=\Sigma I'_x$), Ay' ($=\Sigma I'_y$), At' ($=\Sigma I'_t$), Att' ($=\Sigma(I'_t)^2$) which are the calculation results in the process are obtained.

In step S514, the third motion search processing unit 40 calculates the error function value distribution average Me" and standard deviation Se" and the pixel value variation distribution average Mi" and standard deviation Si" by using the width W, the height H, the motion vectors MV' (Vx', Vy'), Axx', Ayy', Axy', Axt', Ayt', Ax', Ay', At', and Att'. The error function value distribution average Me" is an average µe' of the distribution of the error function values in the LK method in the entire image. The error function value standard deviation Se" is a standard deviation σe' of the distribution of the error function values in the LK method in the entire image. The pixel value variation distribution average Mi" is an average µi' of the distribution of the pixel value variations in the time direction in the entire image. The pixel value variation standard deviation Si" is a standard deviation σi' of the distribution of the pixel value variations in the time direction in the entire image. Calculation formulas of the error function value distribution average Me" and standard deviation Se", and the pixel value variation distribution average Mi" and standard deviation Si" are based on the equation (3).

From step S516 to step S534, the third motion search processing unit 42 calculates an outlier degree from the error function value in each pixel and/or an outlier degree from the pixel value variation in each pixel, executes a condition determination for each pixel, and executes a third motion search process, based on the error function value distribution average Me" and standard deviation Se" and the pixel value variation distribution average Mi" and standard deviation Si". Each calculation formula of each outlier degree are based on the equations (4) and (5).

According to such fifth embodiment, since the motion estimation (3rd ME) in which an outlier elimination is executed for the entire image by using the result of the motion estimation (2nd ME) in which an outlier elimination is executed for the entire image, executing the outlier elimination twice is the same as the fourth embodiment. Since the outlier elimination is executed by using the result of more accurate motion estimation compared to the first embodiment, an aciculate global motion search process can be executed. In the fifth embodiment, different from the fourth embodiment, the motion search process and image selection for each divided image are executed once, and this makes the accuracy of the outlier elimination reduced in some degree but the process amount can be reduced, compared to the fourth embodiment. Simply comparing the first embodiment, fourth embodiment, and the fifth embodiment (in a relative description), regarding the process amount, the first embodiment has the least and is followed by the fifth embodiment, and the fourth embodiment has the most; on the other hand, regarding the accuracy, the fourth embodiment has the most and is followed by the fourth embodiment, and the first embodiment has the least.

Sixth Embodiment

Global Motion Search Processing Device and Image Processing Device

Figure 22:
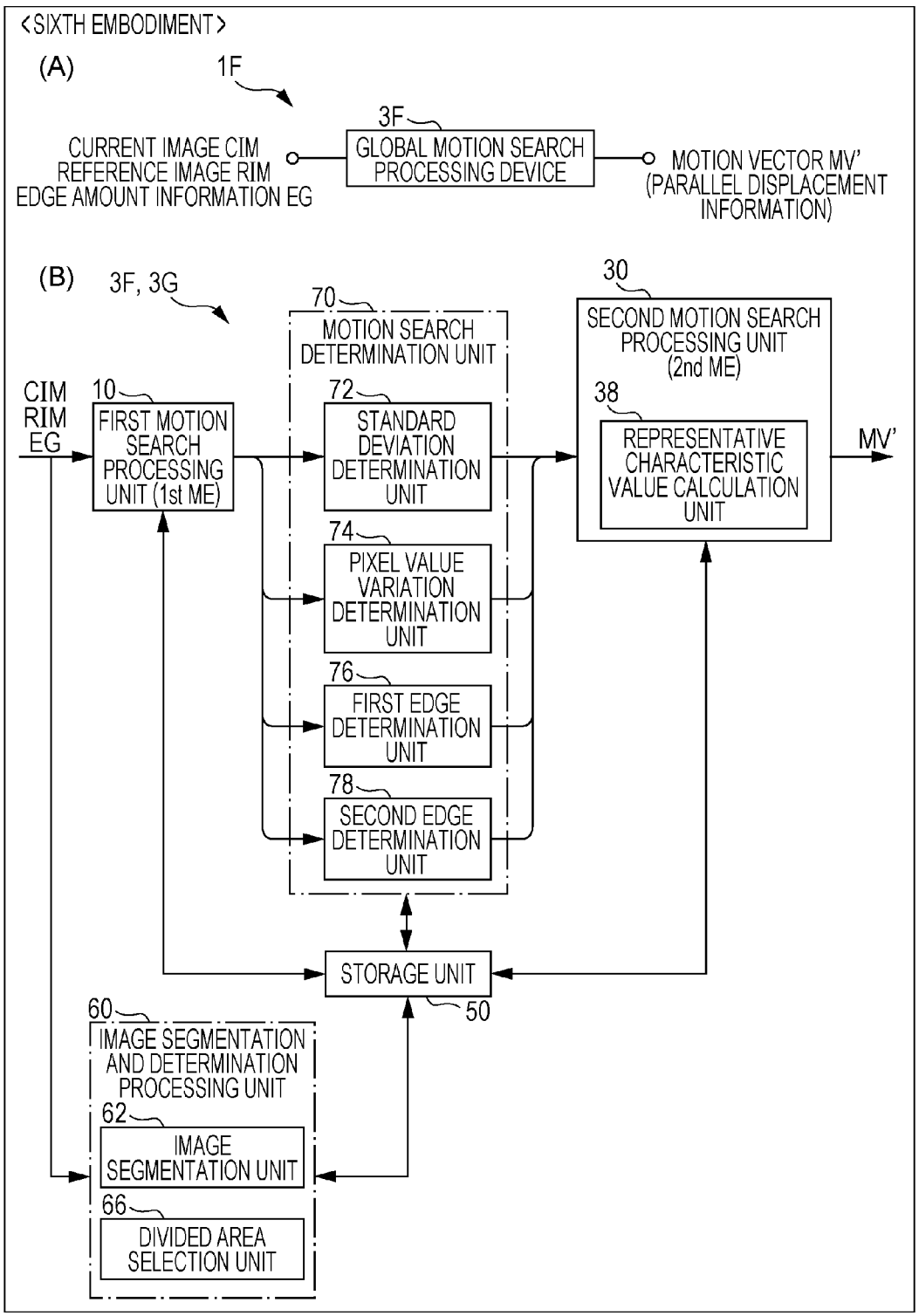
FIGS. 22(A) and 22(B) are diagrams illustrating a global motion search processing device and an image processing device having thereof according to a sixth embodiment.

FIG. 22 is a diagram that explains a sixth embodiment of the global motion search processing device and the image processing device including the global motion search processing device. Here, FIG. 22(A) illustrates an image processing device 1F including a global motion search processing device 3F of the sixth embodiment, and FIG. 22(B) is a block diagram that illustrates a basic configuration of the global motion search processing device 3F of the sixth embodiment. Hereinafter, it will be explained with a modification to the first embodiment; however, the same modification can be applied to the second embodiment.

The sixth embodiment has a characteristic that edge amount information EG of the images is imported in addition to two images (a current image CIM and a reference image RIM), and the validity of the motion search result by the first motion search processing unit 10 is determined based on the imported edge amount information EG. Thus, as illustrated in FIG. 22(B), the global motion search processing device 3F of the sixth embodiment includes a first motion search processing unit (1st ME), a motion search determination unit 70 as a substitute for a motion search determination unit 20, a second motion search processing unit 30 (2nd ME), and a storage unit 50 (memory). The motion search determination unit 70 is different from the motion search determination unit 20 of the first embodiment in including a first edge determination unit 76, in addition to a standard deviation determination unit 72 corresponding to the standard deviation determination unit 22, and a pixel value variation determination unit 74 corresponding to the pixel value variation determination unit 24.

The first edge determination unit 76 is to determine the validity of the motion search result of the first motion search processing unit based on the edge amount information EG as an image characteristic value, obtain a characteristic amount (an average value of edge amount in the entire image, for example) based on the edge amount information EG of the image, and compare this characteristic amount with a threshold value. Here, different from a later described seventh embodiment, the first edge determination unit 76 of the sixth embodiment is different in that an edge amount of "the entire image" (an average value of the edge amounts in the entire image, for example) is calculated and that the process result by the first motion search processing unit 10 is determined to be invalid when an edge in the entire image is small. The motion search determination unit 20 determines whether the first motion search process (1st ME) of the first motion search processing unit 10 is valid based on at least the threshold value comparison result by the first edge determination unit 76, preferably, based on at least one of the threshold value comparison results by the standard deviation determination unit 22 and the pixel value variation determination unit 24.

(Motion Search Validity Determination Process)

Figure 23:
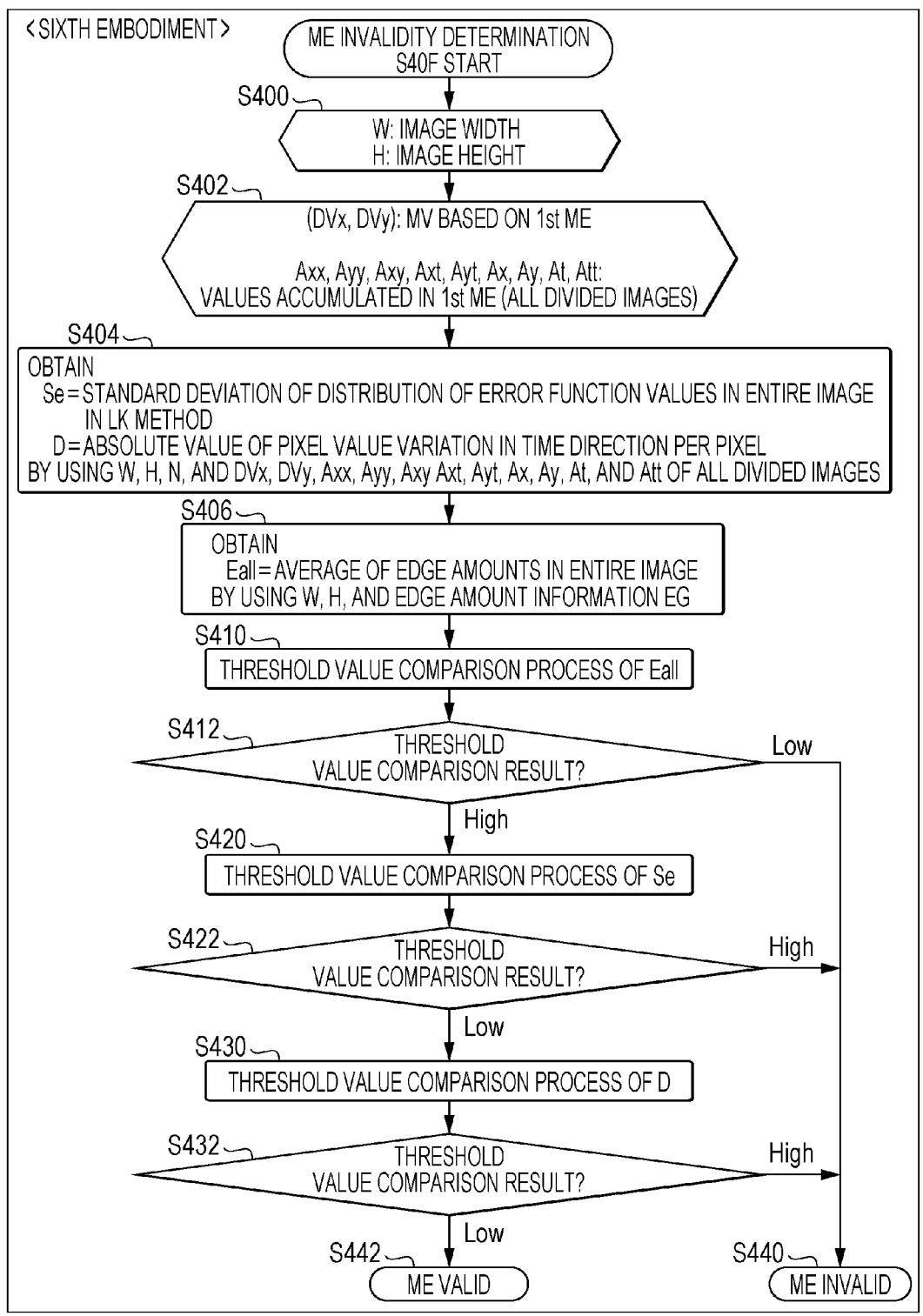
FIG. 23 is a flowchart explaining a validity determination process (step S40F) in a motion search process executed by a motion search determination unit according to the sixth embodiment.

FIG. 23 is a flowchart that explains a validity determination process (step S40F) of the motion search process by the motion search determination unit 70 according to the sixth embodiment. The processes up to step S404 is the same as those in the first embodiment. After that, the first edge determination unit 76 of the motion search determination unit 70 calculates an average value Eall of edge amounts in the entire image based on the width W and height H of the image to be processed and the edge amount information EG of the entire pixel (S406). For example, the edge amount information EG includes a piece of data for every pixels, which is set to "1" when it is an edge pixel and "0" when it is not an edge pixel. In a two-dimensional original loop of "x: 0 to W−1, y: 0 to H−1," input edge amount information EG (x, y) are subsequently added and divided by the number of pixels (W−H), that is, being set as Eall=(sum of edge information)/(W−H).

Next, the motion search determination unit 70 (the first edge determination unit 76 thereof) executes a threshold value comparison determination of an average value Eall with a predetermined threshold value (S410). When determining that the average value Eall is smaller than the threshold value as a result of the threshold value comparison result, the motion search determination unit 70 determines that the first motion search process (1st ME) by the first motion search processing unit 10 is invalid and ends the process (S412-Low, S440). The average value Eall being smaller than the threshold value means that there are a few edges in the entire image and there is a high possibility of an error in the motion search process. In other words, an image having a few edges in the entire image is an image with a low reliable motion estimation result. Thus, the first edge determination unit 76 calculates an edge amount in the entire image and determines that the first motion search process (1st ME) is invalid when there are a few edges in the entire image. This is to prevent an erroneous correction in a subsequent process. When determining the average value Eall is not smaller (higher) than the threshold value as a result of the threshold value comparison, the first edge determination unit 76 executes the processes in step S420 and subsequent steps (which are, a threshold value comparison of a standard deviation, a pixel value variation), similarly to the first embodiment.

Here, the threshold value comparisons of the average value Eall, the standard deviation Se, and the absolute value D are executed after calculating the average value Eall, the error function value standard deviation Se, and the pixel value variation absolute value D; however, a modification can be applied so that, after calculation and a threshold value comparison of one of the average value Eall, the standard deviation Se, and the absolute value D are executed, other calculation and threshold value comparisons are executed. Further, although the accuracy may be deteriorated, a modification can be applied so that calculation and threshold value comparisons of only one of the standard deviation Se and absolute value D are executed while at least calculation and threshold value comparison of average value Eall are executed.

According to such motion search validity determination process of the sixth embodiment, edge amount information EG of an image is input in addition to two images and it is determined whether the motion estimation result by the first motion search processing unit 10 is valid or invalid base on the information. Thus, regarding an image having low reliability of the motion estimation result, the motion estimation result is determined to be invalid and an erroneous correction is not executed as a result. In other words, when executing motion estimation, regarding an image having a small edge amount (a blank image, for example), there is an assumption that the motion estimation result has low reliability. Here, in the sixth embodiment, edge amount information of an image is obtained and, and it is determined whether the result of the first motion search process is valid or invalid by calculating edge amount of the entire image based on the edge information. Thus, regarding the result of the motion estimation of the image with low reliability, since the result of the motion estimation is determined as invalid, a motion search process with high accuracy can be executed for the second time. In other words, when calculating the edge amount in the entire image and there are a few edges in the entire image, the first motion search process (1st ME) is determined to be invalid (in order to prevent an erroneous correction). For example, in a case of a blank (which is, the edge amount is small), since there is a high possibility that a mistake is made in the motion search process, by setting the motion vector MV to "0" when there is a high possibility of a blank, a wrong motion search process will never be used (On the other hand, the motion vector MV increases when a mistake is made in the motion search process). Accordingly, since a process using a wrong motion search process result will not be executed, in the second and subsequent motion search processes, a motion search process including an outlier elimination with high accuracy can be executed. Therefore, when the global motion search processing device 3F of the sixth embodiment is applied to the image processing device 1 or the imaging device 5, an erroneous correction will not be executed as a result, and a further stabilized image sequence can be output. For example, in a case of a blur correction technique, correction amount=0, that means "no correction is made," and this is a measurement for authenticity.

Seventh Embodiment

Figure 24:
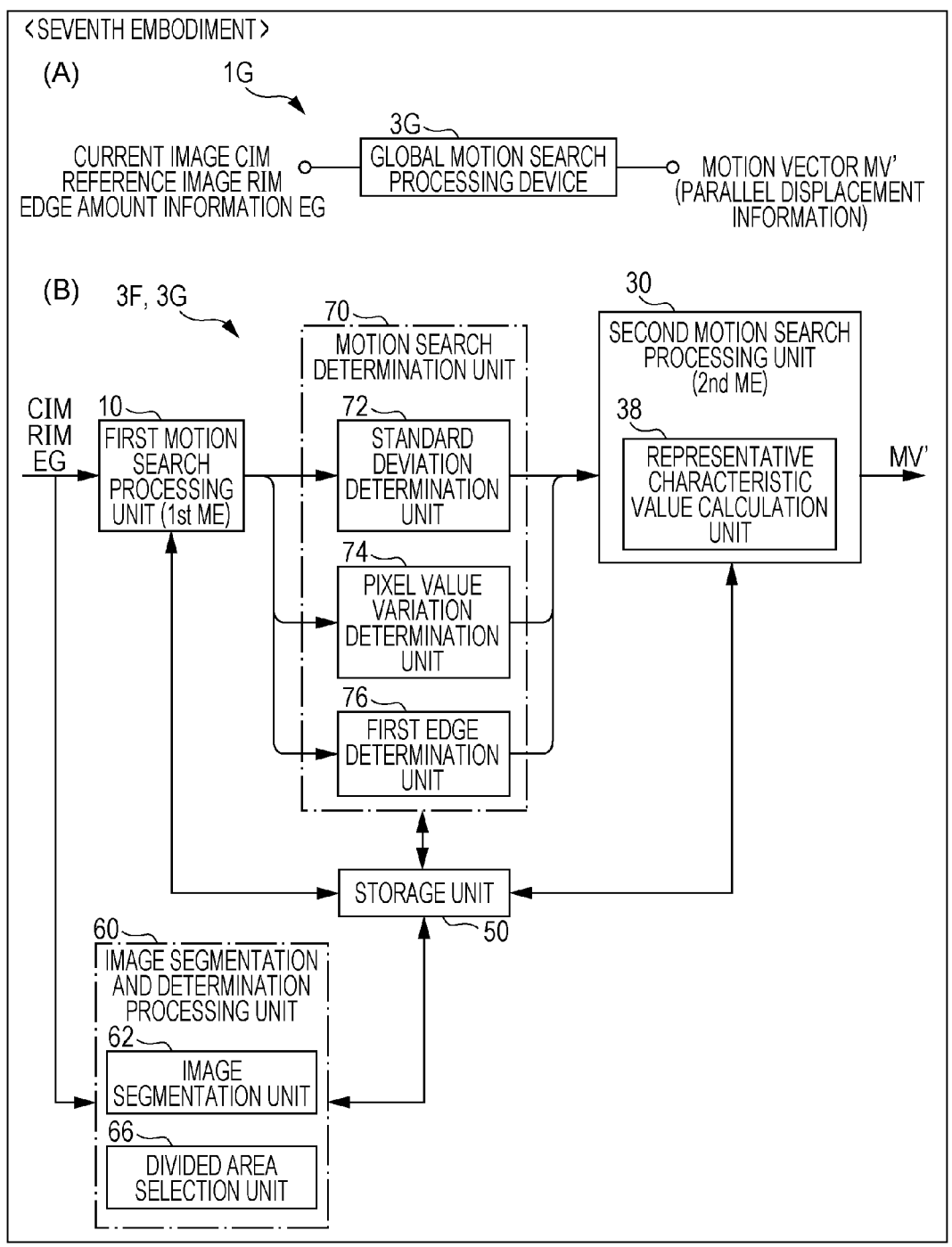
FIGS. 24(A) and 24(B) are diagrams illustrating a global motion search processing device and an image processing device having thereof according to a seventh embodiment.

FIG. 24 is a diagram that explains a seventh embodiment of the global motion search processing device and the image processing device including the global motion search processing device. Here, FIG. 24(A) illustrates an image processing device 1G including a global motion search processing device 3G of the seventh embodiment; and FIG. 24(B) is a block diagram illustrating a basic configuration of the global motion search processing device 3G of the seventh embodiment. Hereinafter, it will be explained with a modification to the first embodiment; however, the same modification can be applied to the second embodiment. Although the figures are made in a configuration shared with the sixth embodiment, it is not essential.

The seventh embodiment has a characteristic that, similarly to the sixth embodiment, edge amount information EG of an image is imported in addition to two images (a current image CIM and a reference image RIM), and determines whether the motion search result by the first motion search processing unit 10 is valid or not based on the imported edge amount information. Here, according to the seventh embodiment, different form the sixth embodiment, an edge amount calculation and a threshold value comparison are added to the loop of the first motion search process executed for each divided image so that the edge amount is calculated for each divided image and the motion search process result of the divided image is determined to be invalid when there is a few edge in the divided image. Further, after the comparison process, similarly to the first embodiment, also based on at least one of the threshold value comparison result by the standard deviation determination unit 72 and the pixel value variation determination unit 74, it is determined whether the first motion search process (1st ME) by the first motion search processing unit 10 is valid or not.

Thus, as illustrated in FIG. 24(B), the global motion search processing device 3G of the seventh embodiment is different from the motion search determination unit 20 of the first embodiment in that a second edge determination unit 76 is further provided to the motion search determination unit 70, based on the configuration of the sixth embodiment. The second edge determination unit 78 determines whether the motion search result by the first motion search processing unit 10 is invalid or not for each divided image based on the edge amount information EG as an image characteristic value and, when it is invalid, sets the motion search process result by the first motion search processing unit 10 to be invalid (sets the motion vector MDV (DVx, DVy) to zero, for example). Then, the divided image selection unit 66 selects one or more divided areas having a highly reliable characteristic amount from the characteristic amounts (motion vector MV) as the motion search process result by the first motion search processing unit 10 for all divided image after the determination by the second edge determination unit 76. The standard deviation determination unit 72 and the pixel value variation determination unit 74 determines whether the motion search result by the first motion search processing unit 10 is invalid or not by determining whether the difficulty of the global motion search based on the motion search process information by the first motion search processing unit 10 for all divided images after the determination by the second edge determination unit 76.

[Entire Outline of Process Procedure]

Figure 25:
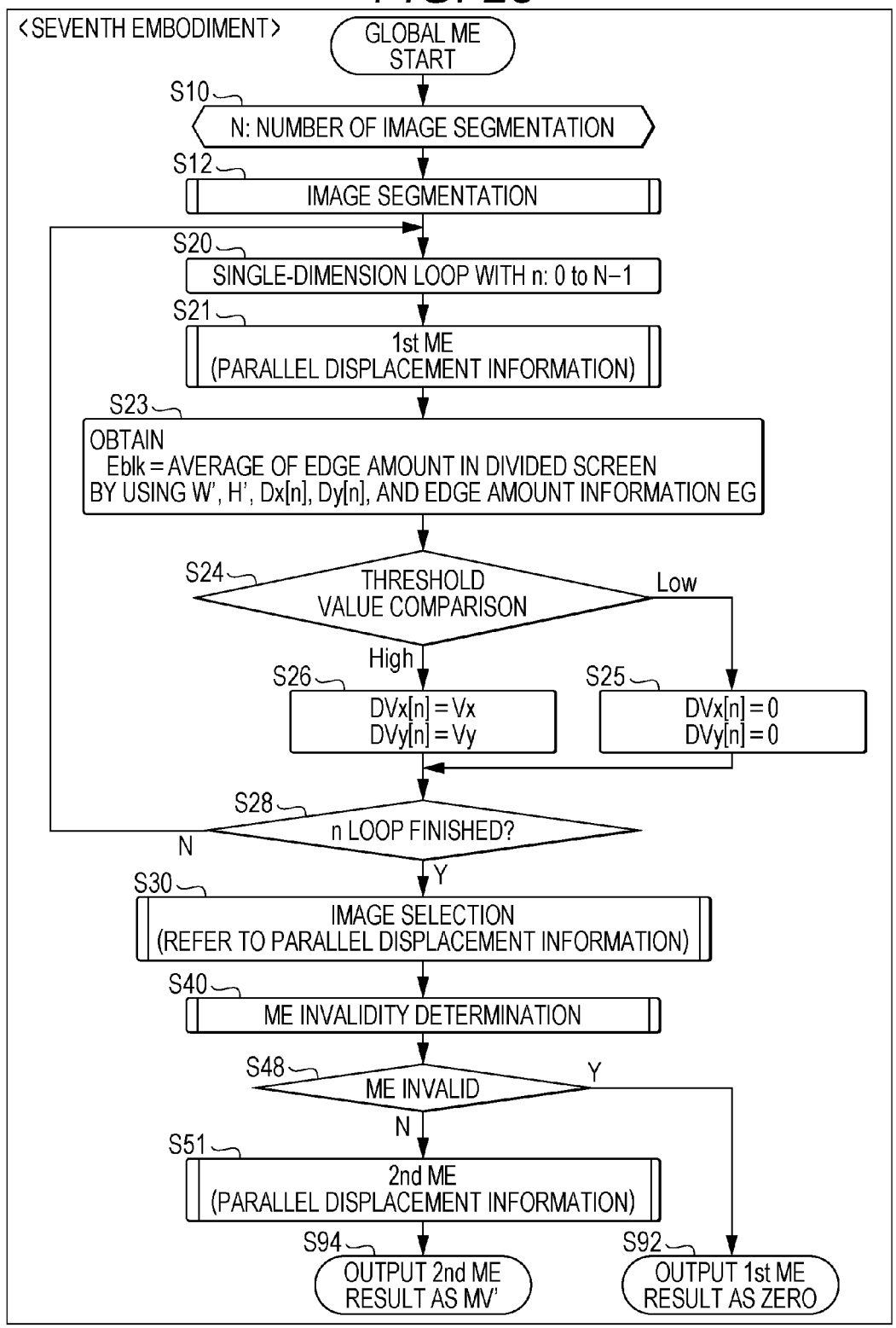
FIG. 25 is a flowchart explaining a validity determination process of a motion search process by a motion search determination unit according to the seventh embodiment.

FIG. 25 is a flowchart that explains the validity determination process of the motion search process by the motion search determination unit 70 according to the seventh embodiment. For example, the processes until the motion search process (1st ME) using the LK method is executed for the n (=0)-th divided image (S21) are the same as those in the first embodiment. The first edge determination unit 76 determines, for each divided image, whether the first motion search process by executing a threshold value comparison of the edge amount for each divided image immediately after the first motion search process (1st ME). Concretely, the first edge determination unit 76 obtains an average value Eblk of the edge amount the divided image (S23). For example, the average value Eblk is obtained by using the width W' (=W/X) and height H' (=H/Y) of the divided image (an operator n as a divided image number), the coordinate information Dx[n], Dy[n] specifying a position of the divided image to be processed, and the obtained edge amount information EG (x, y). In this case, in the two-dimensional loop of "x: Dx[n] to Dx[n]+W'−1, y: Dy[n] to Dy[n]+H'−1", the input edge amount information EG (x, y) is subsequently added and divides with the pixel number (W'−H'), which is expressed as Eblk=(sum of the edge information)/(W'−H').

Next, the motion search determination unit 70 (the first edge determination unit 76 thereof) executes a threshold value comparison of the average value Eblk with a predetermined threshold value (S24). When the average value Eblk is determined to be smaller than the threshold value as a result of the threshold value comparison by the first edge determination unit 76, it is determined that the first motion search process (1st ME) by the first motion search processing unit 10 is invalid and the first motion search processing unit 10 stores the motion vectors MV (Vx, Vy) which is a process result executed with the "n" in the storage unit 50 as the motion vector MDV (DVx[n]=0, DVy[n]=0) (S25). The average value Eblk being smaller than the threshold value means there is a few edges in the divided image and there is a high possibility that a mistaken is made in the motion search process. Thus, the first edge determination unit 76 calculates the edge amount of the divided image, and determines the first motion search process (1st ME) is invalid when there are a few edges in the divided image. Similarly to the sixth embodiment, this is to prevent an erroneous correction in the subsequent process.

On the other hand, when it is determined that the average value Eblk is not smaller (higher) than the threshold value as a result of the threshold value comparison by the motion search determination unit 70, the first motion search processing unit 10 stores the motion vector MV (Vx, Vy) which is a result of a process executed with the "n" in the storage unit 50 as motion vectors MDV (DVx[n], DVy[n]) (S26), similarly to the first embodiment. Then, the first motion search processing unit 10 increments the operator n by "1," and repeats the same process until the process, in which operator n=N−1, is completed (S20, S28-N).

According to such motion search validity determination process of the seventh embodiment, since the edge amount information EG of an image is input in addition to two images and the reliability of the motion estimation is determined from the input edge amount, a second motion search process including an accurate image selection and outlier elimination can be executed. In other words, in the seventh embodiment, edge amount information of the image is obtained, edge amount is calculated for each divided image based on the edge information, and determines whether the result of the first motion search process is invalid or not. The edge amount is calculated for each divided image and, when there are a few edges in the divided image, the motion search process result of the divided image is made invalid. In response to the result, since the divided image selection unit 66 executes a selection of a divided image and the standard deviation determination unit 72 and pixel value variation determination unit 74 execute final validation determinations, the image selection using a wrong motion search process result will not be executed so that assured image selection can be executed and a motion search process including an outlier elimination with a high accuracy can be executed in the second or subsequent motion search process. Thus, when the global motion search processing device 3G of the seventh embodiment is applied to the image processing device 1 or the imaging device 5, an erroneous correction will not be performed and a further stabilized image sequence can be output as a result.

For example, by setting the motion vector MV to zero in a divided image with a small edge amount, a divided image having a large difference from the divided image with a small edge amount is corrected as that the difference from zero is large (that is, the motion vector MV is large), a divided image having a small difference from the divided image with a small edge amount is corrected as that the difference from zero is small (that is, the motion vector MV is small). In other words, by setting the motion vector MV of a divided image having a small edge amount to zero, a difference from a divided image having a large vector becomes large. According to the present embodiment, since divided images are selected in increasing order of difference, divided images with a smaller motion vector MV will firstly be selected. Thus, it is tend to select a divided image with the motion vector MV being close to zero, which is assured, not a divided image with a large motion vector MV. By setting the motion vector MV of a divided image with a small edge amount to zero, an assured process is executed although the difference between the divided images varies (is corrected).

As describe above, a technique which discloses this description has been explained with an embodiment; however, the technical range of the description of the claims are not limited to the scope described by the embodiment. Various changes or modification may be added to the embodiment within the range of the scope of the technique disclosed in this description, and embodiments added with such a change or modification are included in the technical range of the technique disclosed in this description. The embodiments do not limit the technique according to the claims and all of the combination of characteristics explained in the embodiments are not always essential for the solving means of the object as a target of the technique disclosed in this description. The above described embodiments include various steps of techniques and various techniques can be extracted in any combinations of plural disclosed constituent features. Even when some of the constituent features disclosed in this embodiment may be removed, as long as an effect corresponding to an object aimed by the technique disclosed in this description, a configuration in which those constituent features are removed can be extracted as a technique disclosed in this description.

For example, the technique of the global motion search process GME according to this description can be realized by software by using an electric computer (computer) having a CPU, RAM, ROM, and the like, and a program therefor and a storage medium storing the program may be extracted as an invention. Since a configuration of the electric computer itself that realizes various signal processing with software is widely known, it is not illustrated. By applying the above mentioned global motion search process GME as the "various signal processing," the technique of the global motion search process GME according to this disclosure can be realized by software.

The program may be stored and provided in a storage medium which is readable by a computer (for example, semiconductor memory, a magnetic disk, an optical disk or the like), or may be provided by delivering via a wired or wireless communication method. For example, a program which causes a computer to execute a global motion search process function is distributed and provided via a portable storage medium, for example. For example, the program may be distributed and provided as being stored in a CD-ROM (Compact Disc Read Only Memory) or an FD (flexible disk). Further, an MO (Magneto Optical Disk) drive may be provided and the program may be stored in the MO, or the program may be stored in other storage medium including a card-type storage medium or the like using non-volatile semiconductor memory such as flash memory to distribute and provide. The program constituting software may be distributed and provided via a communication method (wired or wireless) in addition to distributing and providing via a recording medium. For example, the program may be obtained by downloading from another server or the like via a network or the Internet. The program is provided as a file including a program code which realizes a function to execute the global motion search process GME; however, in this case, it is not limited to be provided as a corrective program file and it may be provided as individual program modules according to a hardware configuration of a system composed of a computer.

According to the description of the embodiments, a technique described in the claims is an example and the following techniques are extracted, for example. Those are listed as follows.

[Additional Remark 1]

An image processing device including:
an image segmentation unit configured to make an image to be processed into plural divided images;
a divided image selection unit configured to select, from plural divided images, a divided image selecting a divided image in which reliability of a motion search process is equal to or greater than a threshold value or reliability is relatively high;
a first motion search processing unit configured to execute a motion search process for each divided image; and
a second motion search processing unit configured to execute a motion search process for an entire image, on which an image segmentation is not executed, based on information of the motion search process by the first motion search processing unit for a selected divided image.

[Additional Remark 2]

The image processing device according to additional remark 1, in which the divided image selection unit selects a divided image based on information of the motion search process by the first motion search processing unit for each divided image.

[Additional Remark 3]

The image processing device according to additional remark 1 or additional remark 2, further including
a representative characteristic value calculation unit, in which
the divided image selection unit selects plural divided images;
the representative characteristic value calculation unit calculates a representative characteristic value related to the motion search process based on information of the motion search process by the first motion search processing unit for the selected plural divided images; and
the second motion search processing unit executes a motion search process on the entire image, in which an image segmentation is not executed, based on the representative characteristic value calculated by the representative characteristic value calculation unit for the selected plural divided images.

[Additional Remark 4]

The image processing device according to one of additional remarks 1 to 3, including
a determination unit configured to determine whether the motion search result by the first motion search processing unit is invalid or not, in which
the determination unit determines whether the motion search result is invalid or not by determining whether difficulty of a global motion search is equal to or greater than a threshold value based on information of the motion search process by the first motion search processing unit for each divided image.

[Additional Remark 5]

The image processing device according to additional remark 4, in which
as information of the motion search process by the first motion search processing unit for each divided image, the determination unit
obtains, for all divided images,
an adding calculation result for an entire divided image based on a calculation formula expressed by at least one of pieces of information related to a horizontal direction pixel value variation amount, a vertical direction pixel value variation amount, and time direction pixel value variation amount in a pixel, and
motion information calculated based on an adding calculation result for the entire divided image, and
determines whether difficulty of the global motion search is equal to or greater than the threshold value according to a conditional expression expressed by the respective obtained values.

[Additional Remark 6]

The image processing device according to one of additional remarks 1 to 5, including
a third motion search processing unit configured to execute a motion search process for each divided image as determining whether each pixel has reliability equal to or greater than a threshold value based on information of the motion search process by the first motion search processing unit for each divided image, in which the second motion search processing unit executes the motion search process for the entire image, on which an image segmentation is not performed, based on information of the motion search process by the third motion search processing unit for the divided image.

[Additional Remark 7]

The image processing device according to one of additional remarks 1 to 6, including a third motion search processing unit configured to execute a motion search process for an entire image, on which an image segmentation is not performed, based on information of the motion search process by the second motion search processing unit for the entire image.

[Additional Remark 8]

The image processing device according to one of additional remarks 1 to 7, in which the image segmentation and/or motion search process are executed based on an image characteristic value of the image to be processed.

[Additional Remark 9]

The image processing device according to additional remark 8, in which the image segmentation unit is able to unevenly divide the image to be processed into plural divided images based on object information in the image as an image characteristic value.

[Additional Remark 10]

The image processing device according to one of additional remarks 8 and 9, including a determination unit configured to determine whether the motion search result by the first motion search processing unit is invalid or not, in which the determination unit determines whether the motion search result by the first motion search processing unit is invalid or not by determining whether difficulty of the global motion search is equal to or greater than the threshold value based on edge information as the image characteristic value.

[Additional Remark 11]

The image processing device according to one of additional remarks 8 to 10, including a determination unit configured to determine whether the motion search result by the first motion search processing unit is invalid or not, in which the determination unit determines, for each image, whether the motion search result by the first motion search processing unit is invalid or not based on edge information as an image characteristic value and, when invalid, invalidates the motion search process result of the divided image by the first motion search processing unit.

[Additional Remark 12]

The image processing device according to one of additional remarks 1 to 11, in which the respective motion search processing units calculate motion information related to a parallel displacement of an image and/or calculate motion information related to a rotational displacement of an image.

[Additional Remark 13]

The image processing device according to one of additional remarks 1 to 12, in which at least one of the respective motion search processing units executes the motion search process using Lucas-Kanade method.

[Additional Remark 14]

The image processing device according to additional remark 13, in which the first motion search processing unit executes an adding calculation based on a calculation formula, which is expressed by at least one of pieces of information related to a horizontal direction pixel value variation amount, a vertical direction pixel value variation amount, and a time direction pixel value variation amount in a pixel of each divided image for the entire divided image, and calculates motion information based on the adding calculation result.

[Additional Remark 15]

The image processing device according to additional remark 13 or 14, in which when adding calculation based on a calculation formula, which is expressed by at least one of pieces of information related to a horizontal direction pixel value variation amount, a vertical direction pixel value variation amount, and a time direction pixel value variation amount in each pixel, is performed for the entire image, the second motion search processing unit determines whether each pixel has reliability equal to or greater than the threshold value according to a setting condition based on information of the motion search process for the selected divided image by the first motion search processing unit and executes an adding calculation in a case the setting condition is satisfied.

[Additional Remark 16]

The image processing device according to additional remark 15, in which the second motion search processing unit obtains, regarding the selected divided image, an adding calculation result, for the entire divided image, based on a calculation formula, which is expressed by at least one of pieces of information related to the horizontal direction pixel value variation amount, the vertical direction pixel value variation amount, and the time direction pixel value variation amount in each pixel, and the motion information calculated based on the adding calculation result for the entire divided image, as information to determine whether the motion search process result has reliability being equal to or greater than the threshold value, and executes whether or not to execute the addition in each pixel according to the setting condition expressed by the respective obtained value.

[Additional Remark 17]

An image processing method, including:

an image segmentation step making an image to be processed into plural divided images;

a divided image selecting method selecting a divided image selecting a divided image, in which reliability of a motion search process is equal to or greater than a threshold value or reliability is relatively high, from the plural divided images;

a first motion search process step executing a motion search process for each divided image; and a second motion search process step executing a motion search process for an entire image, in which an image segmentation is not performed, based on information of the motion search process for the selected divided image by the first motion search processing unit.

[Additional Remark 18]

An imaging device including:

a solid imaging device;

an optical system configured to form an image of a subject image obtained in an imaging area of the solid imaging device;

a first storage unit configured to store the image obtained by the solid imaging device;

a first signal processing unit configured to execute a predetermined signal processing to the image obtained by the solid imaging device;

a second storage unit configured to store the image processed in the first signal processing unit;

an image segmentation unit configured to make the image read from the second storage unit into plural divided images;

a divided image selection unit configured to select a divided image, in which reliability of a motion search process is equal to or greater than a threshold value or reliability is relatively high, from the plural divided images;

a first motion search processing unit configured to execute a motion search process for each divided image;

a second motion search processing unit configured to execute a motion search process for an entire image, in which an image segmentation is not executed, based on information of the motion search process for the selected divided image by the first motion search processing unit; and a second signal processing unit configured to a correction process for the image read from the first storage unit, by referring to a result of the motion search process by the second motion search processing unit.

[Additional Remark 19]

An imaging device including:

a solid imaging device;

an optical system configured to form an image of a subject image obtained in an imaging area of the solid imaging device;

a first storage unit configured to store the image obtained by the solid imaging device;

a first signal processing unit configured to execute a predetermined signal processing to the image obtained by the solid imaging device;

a second storage unit configured to store the image processed in the first signal processing unit;

an image segmentation unit configured to make the image read from the second storage unit into plural divided images;

a divided image selection unit configured to select a divided image, in which reliability of a motion search process is equal to or greater than a threshold value or reliability is relatively high, from the plural divided images;

a first motion search processing unit configured to execute a motion search process for each divided image;

a second motion search processing unit configured to execute a motion search process for an entire image, in which an image segmentation is not executed, based on information of the motion search process for the selected divided image by the first motion search processing unit; and a second signal processing unit configured to a correction process for the image read from the first storage unit, by referring to a result of the motion search process by the second motion search processing unit.

[Additional Remark 20]

A program causing a computer to function as:

an image segmentation unit configured to make an image to be processed into plural divided images;

a divided image selection unit configured to select a divided image, in which reliability of a motion search process is equal to or greater than a threshold value or reliability is relatively high, from the plural divided images;

a first motion search processing unit configured to a motion search process for each divided image; and a second motion search processing unit configured to execute a motion search process for an entire image, in which an image segmentation is not performed, based on information of the motion search process for the selected divided image by the first motion search processing unit.

REFERENCE SIGNS LIST 1 image processing device
10 first motion search processing unit
140 pre-stage signal processing device
142 first storage unit
144 second storage unit
146 reducing and smoothing unit
150 post-stage signal processing device
152 motion vector filter
154 image cutout unit
20 motion search determination unit
22 standard deviation determination unit
24 pixel value variation determination unit
3 global motion search processing device
30 second motion search processing unit
32 second motion search processing unit
38 representative characteristic value calculation unit
40 third motion search processing unit
42 third motion search processing unit
5 imaging device
50 storage unit
60 image segmentation and selection processing unit
62 image segmentation unit
66 divided image selection unit
68 representative characteristic value calculation unit
7 solid imaging device
70 motion search determination unit
72 standard deviation determination unit
74 pixel value variation determination unit
76 first edge determination unit
78 second edge determination unit

The invention claimed is:

1. An image processing device comprising: an image segmentation circuitry configured to segment an image to be processed into plural divided images;
   a divided image selection circuitry configured to select, from plural divided images, a divided image in which reliability of a motion search process is equal to or greater than a threshold value;
   a first motion search processing circuitry configured to execute a motion search process for each divided image; and
   a second motion search processing circuitry configured to execute a motion search process for an entire image, on which an image segmentation is not executed, based on information of the motion search process by the first motion search processing circuitry for the selected divided image without weighting the selected divided image.

2. The image processing device according to claim 1, wherein the divided image selection circuitry is configured to select a divided image based on information of the motion search process by the first motion search processing circuitry for each divided image.

3. The image processing device according to claim 1, further comprising
   a representative characteristic value calculation circuitry, wherein
   the divided image selection circuitry is configured to select plural divided images;
   the representative characteristic value calculation circuitry is configured to calculate a representative characteristic value related to the motion search process based on information of the motion search process by the first motion search processing circuitry for the selected plural divided images; and
   the second motion search processing circuitry is configured to execute a motion search process on the entire image, in which an image segmentation is not executed, based on the representative characteristic value calculated by the representative characteristic value calculation circuitry for the selected plural divided images.

4. The image processing device according to claim 1, comprising
a determination circuitry configured to determine whether the motion search result by the first motion search processing circuitry is invalid or not, wherein
the determination circuitry is configured to determine whether the motion search result is invalid or not by determining whether difficulty of a global motion search is equal to or greater than a threshold value based on information of the motion search process by the first motion search processing circuitry for each divided image.

5. The image processing device according to claim 4, wherein
as information of the motion search process by the first motion search processing circuitry for each divided image, the determination circuitry is configured to
obtain, for all divided images,
an adding calculation result for an entire divided image based on a calculation formula expressed by at least one of pieces of information related to a horizontal direction pixel value variation amount, a vertical direction pixel value variation amount, and time direction pixel value variation amount in a pixel, and motion information calculated based on an adding calculation result for the entire divided image, and
determine whether difficulty of the global motion search is equal to or greater than the threshold value according to a conditional expression expressed by the respective obtained values.

6. The image processing device according to claim 1, comprising
a third motion search processing circuitry configured to execute a motion search process for each divided image as determining whether each pixel has reliability equal to or greater than the threshold value based on information of the motion search process by the first motion search processing circuitry for each divided image,
wherein the second motion search processing circuitry executes the motion search process for the entire image, on which an image segmentation is not performed, based on information of the motion search process by the third motion search processing unit for the divided image.

7. The image processing device according to claim 1, comprising a third motion search processing circuit configured to execute a motion search process for an entire image, on which an image segmentation is not performed, based on information of the motion search process by the second motion search processing circuitry for the entire image.

8. The image processing device according to claim 1, wherein the image segmentation and/or motion search process are executed based on an image characteristic value of the image to be processed.

9. The image processing device according to claim 8, wherein the image segmentation circuitry is able to unevenly divide the image to be processed into plural divided images based on object information in the image as an image characteristic value.

10. The image processing device according to claim 8, comprising
a determination circuitry configured to determine whether the motion search result by the first motion search processing circuitry is invalid or not,
wherein the determination circuitry is configured to determine whether the motion search result by the first motion search processing circuitry is invalid or not by determining whether difficulty of the global motion search is equal to or greater than the threshold value based on edge information as the image characteristic value.

11. The image processing device according to claim 8, comprising
a determination circuitry configured to determine whether the motion search result by the first motion search processing circuitry is invalid or not,
wherein the determination circuitry is configured to determine, for each image, whether the motion search result by the first motion search processing circuitry is invalid or not based on edge information as an image characteristic value and, when invalid, to invalidate the motion search process result of the divided image by the first motion search processing circuitry.

12. The image processing device according to claim 1, wherein the first and second motion search processing circuitry respectively are configured to calculate motion information related to a parallel displacement of an image and/or calculate motion information related to a rotational displacement of an image.

13. The image processing device according to claim 1, wherein at least one of the first and second motion search processing circuitry is configured to execute the motion search process using Lucas-Kanade method.

14. The image processing device according to claim 13, wherein the first motion search processing circuitry configured to execute an adding calculation based on a calculation formula, which is expressed by at least one of pieces of information related to a horizontal direction pixel value variation amount, a vertical direction pixel value variation amount, and a time direction pixel value variation amount in a pixel of each divided image for the entire divided image, and to calculate motion information based on the adding calculation result.

15. The image processing device according to claim 13, wherein
when adding calculation based on a calculation formula, which is expressed by at least one of pieces of information related to a horizontal direction pixel value variation amount, a vertical direction pixel value variation amount, and a time direction pixel value variation amount in each pixel, is performed for the entire image,
the second motion search processing circuitry is configured to determine whether each pixel has reliability equal to or greater than the threshold value according to a setting condition based on information of the motion search process for the selected divided image by the first motion search processing unit and to execute an adding calculation in a case the setting condition is satisfied.

16. The image processing device according to claim 15, wherein the second motion search processing circuitry configured to
regarding the selected divided image,
an adding calculation result, for the entire divided image, based on a calculation formula, which is expressed by at least one of pieces of information related to the horizontal direction pixel value variation amount, the vertical direction pixel value variation amount, and the time direction pixel value variation amount in each pixel, and
the motion information calculated based on the adding calculation result for the entire divided image,
as information to determine whether the motion search process result has reliability being equal to or greater than the threshold value, and execute whether or not to execute the addition in each pixel according to the setting condition expressed by the respective obtained value.

17. An image processing method, comprising:
segmenting an image to be processed into plural divided images;
selecting a divided image, in which reliability of a motion search process is equal to or greater than a threshold value, from the plural divided images;
executing a first motion search process for each divided image; and
executing a second motion search process for an entire image, in which an image segmentation is not performed, based on information of the first motion search process for the selected divided image without weighting the selected divided image.

18. An imaging device comprising:
a solid imaging device;
an optical system configured to form an image of a subject image obtained in an imaging area of the solid imaging device;
a first memory configured to store the image obtained by the solid imaging device;
a first signal processing circuitry configured to execute a predetermined signal processing to the image obtained by the solid imaging device;
a second memory configured to store the image processed in the first signal processing circuitry;
an image segmentation circuitry configured to segment the image read from the second memory into plural divided images;
a divided image selection circuitry configured to select a divided image, in which reliability of a motion search process is equal to or greater than a threshold value, from the plural divided images;
a first motion search processing circuitry configured to execute a motion search process for each divided image;
a second motion search processing circuitry configured to execute a motion search process for an entire image, in which an image segmentation is not executed, based on information of the motion search process for the selected divided image by the first motion search processing unit circuitry without weighting the selected divided image; and
a second signal processing circuitry configured to a correction process for the image read from the first memory, by referring to a result of the motion search process by the second motion search processing circuitry.

19. An electronic equipment, comprising:
a first memory configure to store an image which is input;
a first signal processing circuitry configured to execute a predetermined signal processing for the input image;
a second memory configured to store the image processed in the first signal processing circuitry;
an image segmentation circuitry configured to segment the image read from the second memory into plural divided images;
a divided image selection circuitry configured to select a divided image, in which reliability of the motion search process is equal to or greater than a threshold value, from plural divided images;
a second motion search processing circuitry configured to execute a motion search process for an entire image, in which an image segmentation is not executed, based on information of the motion search process for the selected divided image by the first motion search processing circuitry without weighting the selected divided image; and
a second signal processing circuitry configured to execute a motion correction process for the image read from the first memory, by referring to a result of the motion search process by the second motion search processing circuitry.

20. A non-transitory computer-readable medium storing thereon a program that, when executed by a processor of a computer, causes the computer to execute operations comprising:
segmenting an image to be processed into plural divided images;
selecting a divided image, in which reliability of a motion search process is equal to or greater than a threshold value, from the plural divided images;
executing a first motion search process for each divided image; and
executing a second motion search process for an entire image, in which an image segmentation is not performed, based on information of the first motion search process for the selected divided image without weighting the selected divided image.

* * * * *